US012804416B2

(12) United States Patent
Kumagai et al.

(10) Patent No.: US 12,804,416 B2
(45) Date of Patent: Nov. 17, 2026

(54) WIRELESS RELAY DEVICE AND COMMUNICATION METHOD

(71) Applicant: NTT DOCOMO, INC., Tokyo (JP)

(72) Inventors: Shinya Kumagai, Tokyo (JP); Haruhi Echigo, Tokyo (JP); Yuki Takahashi, Tokyo (JP); Shohei Yoshioka, Tokyo (JP); Daisuke Kurita, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 249 days.

(21) Appl. No.: 18/726,012

(22) PCT Filed: Jan. 17, 2022

(86) PCT No.: PCT/JP2022/001476
§ 371 (c)(1),
(2) Date: Jul. 1, 2024

(87) PCT Pub. No.: WO2023/135823
PCT Pub. Date: Jul. 20, 2023

(65) Prior Publication Data
US 2025/0133416 A1 Apr. 24, 2025

(51) Int. Cl.
*H04W 16/26* (2009.01)
*H04W 24/10* (2009.01)

(52) U.S. Cl.
CPC ........... *H04W 16/26* (2013.01); *H04W 24/10* (2013.01)

(58) Field of Classification Search
CPC ....... H04W 16/26; H04W 24/10; H04W 8/24; Y02D 30/70
See application file for complete search history.

(56) References Cited

U.S. PATENT DOCUMENTS

2010/0323614 A1* 12/2010 Yu ......................... H04W 48/18 455/7
2013/0208653 A1 8/2013 Morioka
(Continued)

FOREIGN PATENT DOCUMENTS

JP 2012100169 A 5/2012

OTHER PUBLICATIONS

3GPP TS 38.300 V16.8.0; "3rd Generation Partnership Project; Technical Specification Group Radio Access Network; NR; NR and NG-RAN Overall Description; Stage 2 (Release 16)"; Dec 2021 (152 pages).

(Continued)

*Primary Examiner* — Dady Chery
(74) *Attorney, Agent, or Firm* — Osha Bergman Watanabe & Burton LLP

(57) ABSTRACT

A wireless relay device includes: a receiver unit configured to receive a signal from each of a plurality of base stations; a control unit configured to be connected to a base station for which a received quality of the signal is equal to or greater than a threshold value; and a relay unit configured to perform relaying of a signal between the base station to be connected to and a terminal. The receiver unit receives control information from the base station to be connected to, the control unit activates or deactivates a relay function of the relay unit, based on the control information, and the control unit determines a wireless resource used by the relay unit, based on the control information.

5 Claims, 29 Drawing Sheets

(56) References Cited

U.S. PATENT DOCUMENTS

| | | | | |
|---|---|---|---|---|
| 2017/0141860 | A1* | 5/2017 | Furuichi ................ | H04B 17/40 |
| 2021/0037522 | A1 | 2/2021 | Li et al. | |

OTHER PUBLICATIONS

NTT DOCOMO, “White Paper 5G Evolution and 6G” (Feb. 2021, Version 3.0); Retrieved from the Internet<URL:https://www.nttdocomo.co.jp/binary/pdf/corporate/technology/whitepaper_6g/DOCOMO_6G_White_PaperJP_20210203.pdf; Feb. 2021 (73 pages).

3GPP TS 38.331 V16.6.0; “3rd Generation Partnership Project; Technical Specification Group Radio Access Network; NR; Radio Resource Control (RRC) protocol specification (Release 16)”; Sep. 2021 (961 pages).

International Search Report issued in corresponding International Application No. PCT/JP2022/001476, mailed on Aug. 9, 2022 (5 pages).

Written Opinion issued in corresponding International Application No. PCT/JP2022/001476, mailed on Aug. 9, 2022 (3 pages).

Office Action issued in Japanese Patent Application No. 2023-573818, dated Sep. 2, 2025 (5 pages).

3GPP TSG RAN Meeting #94-e; RP-213490; ZTE; “Moderator’s summary for discussion [94e-10-R18- SmartRepeater]”; Electronic Meeting, Dec. 6-17, 2021 (48 pages).

* cited by examiner

EXAMPLE OF X=4 AND Y=4

| SSB INDEX | 〈0〉〜〈X−1〉 | | | | 〈X〉〜〈X+Y−1〉 | | | |
|---|---|---|---|---|---|---|---|---|
| BS | 0 | 1 | 2 | 3 | a | a | a | a |
| RIS | | | | | 4 | 5 | 6 | 7 |

→ TIME

WIRELESS RELAY DEVICE AND COMMUNICATION METHOD

FIELD OF THE INVENTION

The present invention relates to a wireless relay device and a communication method in a wireless communication system.

BACKGROUND OF THE INVENTION

In 3GPP (3rd Generation Partnership Project), in order to realize further larger system capacity, further faster data transmission speed, further lower latency in a wireless communication section, etc., a wireless communication method called "5G" or "NR (New Radio)" has been discussed (hereinafter, the wireless communication method is referred to as "NR"). In 5G, various wireless technologies and network architectures are being discussed to satisfy the requirement of a radio link delay of 1 ms or less while achieving throughput of 10 Gbps or more (e.g., non-patent document 1).

In the next generation communication, the high frequency band is expected to be used. From the viewpoint of the reduced number of scatterers, reduced shadowing effects, increased distance attenuation, or the like, due to the characteristics of the high frequency band, the communication quality is required to be improved. The beam control, environment, and the like, for ensuring the communication quality are expected to be required.

For example, there is a problem of easily created dead zones because of the radio waves' strong tendency of traveling straight in the high frequency band. Accordingly, methods of improving the communication quality under the multi-path environment have been discussed, the methods using a passive repeater or an active type reflector (RIS: Reconfigurable Intelligent Surface), a smart repeater that receives and amplifies a signal to be re-radiated, and the like (for example, Non-Patent Document 2).

CITATION LIST

Non-Patent Document

Non-Patent Document 1: 3GPP TS 38.300 V16.8.0 (2021-12)

Non-Patent Document 2: NTT DOCOMO, "White Paper 5G Evolution and 6G" (20 21-02, Version 3.0), Internet<URL: https://www.nttdocomo.co.jp/binary/pdf/corporate/technology/whitepaper_6g/DOCOMO_6G_White_PaperJP_20210203.pdf>

Non-Patent Document 3: 3GPP TS 38.331 V16.6.0 (2021-09)

SUMMARY OF THE INVENTION

Technical Problem

A control operation related to a relay function of a wireless relay device is required to be clarified in a case where a wireless relay device such as a reflector or a smart repeater, which relays radio waves by reflecting or transparently transmitting the radio waves from a radio wave generation source such as a base station to a destination to receive a radio wave such as a terminal, relays signals of a plurality of base stations.

The present invention has been made in view of the above points, and it is an object of the present invention to relay signals of a plurality of base stations via a wireless relay device in a wireless communication system.

Solution to Problem

According to the disclosed technique, a wireless relay device is provided. The wireless relay device includes: a receiver unit configured to receive a signal from each of a plurality of base stations; a control unit configured to be connected to a base station for which a received quality of the signal is equal to or greater than a threshold value; and a relay unit configured to perform relaying of a signal between the base station to be connected to and a terminal. The reception unit receives control information from the base station to be connected to, the control unit activates or deactivates a relay function of the relay unit, based on the control information, and the control unit determines a wireless resource used by the relay unit, based on the control information.

Advantageous Effects of Invention

According to the disclosed technique, signals of a plurality of base stations can be relayed in a wireless communication system via a wireless relay device.

DETAILED DESCRIPTION OF THE PREFERRED EMBODIMENTS

Figure 1:
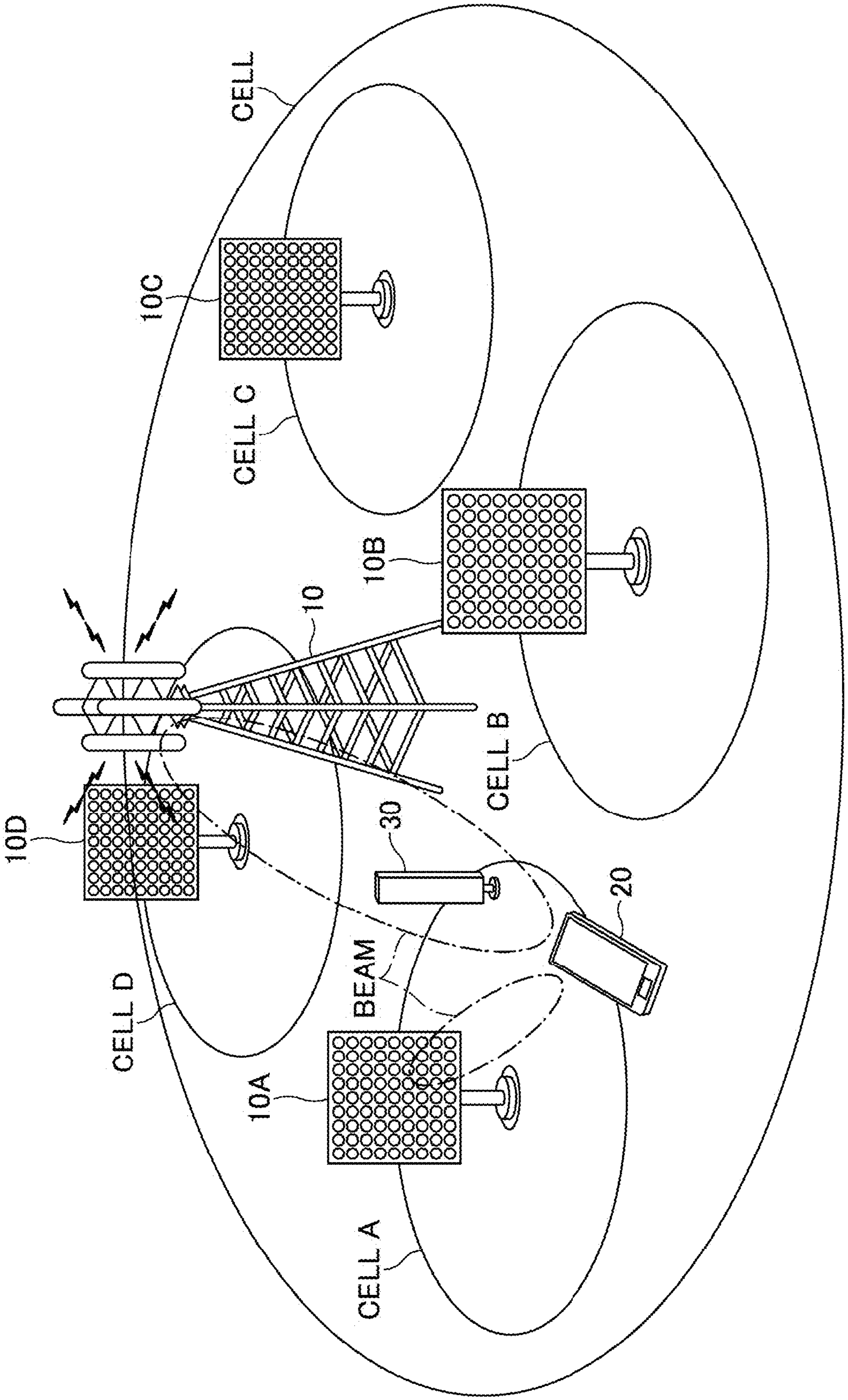
FIG. 1 is a drawing for describing a wireless communication system in an embodiment of the present invention.

In the following, referring to the drawings, one or more embodiments of the present invention will be described. It should be noted that the embodiments described below are examples. Embodiments of the present invention are not limited to the following embodiments.

In operations of a wireless communication system according to an embodiment of the present invention, a conventional technique will be used when it is appropriate. With respect to the above, for example, the conventional techniques are related to, but not limited to, the existing LTE. Further, it is assumed that the term "LTE" used in the present specification has, unless otherwise specifically mentioned, a broad meaning including a scheme of LTE-Advanced and a scheme after LTE-Advanced (e.g., NR).

Furthermore, in one or more embodiments described below, terms that are used in the existing LTE are used, such as SS (Synchronization signal), PSS (Primary SS), SSS (Secondary SS), PBCH (Physical broadcast channel), PRACH (Physical random access channel), PDCCH (Physical Downlink Control Channel), PDSCH (Physical Downlink Shared Channel), PUCCH (Physical Uplink Control Channel), PUSCH (Physical Uplink Shared Channel), etc. The above-described terms are used for the sake of description convenience. Signals, functions, etc., which are similar to the above-described terms, may be referred to as different names. Further, terms, which are used in NR and correspond to the above-described terms, are NR-SS, NR-PSS, NR-SSS, NR-PBCH, NR-PRACH, etc. However, even when a signal is used for NR, there may be a case in which the signal is not referred to as "NR-".

In addition, in an embodiment of the present invention, the duplex method may be a TDD (Time Division Duplex) method, an FDD (Frequency Division Duplex) method, or any other method (e.g., Flexible Duplex, or the like). Further, in an embodiment of the present invention, the expression, radio (wireless) parameters are "configured (set)" may mean that a predetermined value is pre-configured, or may mean that a radio parameter indicated by a base station 10 or a terminal 20 is configured.

FIG. 1 is a drawing illustrating a wireless communication system according to an embodiment of the present invention. As illustrated in FIG. 1, a wireless communication system according to an embodiment of the present invention includes a base station 10 and a terminal 20. There may be a plurality of base stations 10 and a plurality of terminals 20.

The base station 10 is a communication device that provides one or more cells and performs wireless communication with the terminal 20. Physical resources of radio signals may be defined in the time domain and the frequency domain, the time domain may be defined by the number of OFDM (Orthogonal Frequency Division Multiplexing) symbols, and the frequency domain may be defined by the number of sub-carriers or resource blocks. In addition, a TTI (Transmission Time Interval) in the time domain may be a slot or a sub-slot, or the TTI may be a subframe.

The base station 10 can perform carrier aggregation to communicate with the terminal 20 by bundling a plurality of cells (multiple CCs (component carriers)). In carrier aggregation, one primary cell (PCell) and one or more secondary cells (SCells) are used.

The base station 10 transmits a synchronization signal, system information, and the like, to the terminal 20. The synchronization signal is, for example, an NR-PSS and an NR-SSS. The system information may be transmitted via a NR-PBCH or a PDSCH, for example, and may be referred to as broadcast information. As shown in FIG. 1, the base station 10 transmits a control signal or data in DL (Downlink) to the terminal 20 and receives a control signal or data in UL (Uplink) from the terminal 20. Note that, here, what is transmitted via a control channel such as PUCCH and PDCCH is called a control signal, and what is transmitted via a shared channel such as PUSCH and PDSCH is called data. These names are merely examples.

The terminal 20 may be a communication apparatus that includes a wireless communication function such as a smartphone, a mobile phone, a tablet, a wearable terminal, a communication module for M2M (Machine-to-Machine), or the like. As shown in FIG. 1, the terminal 20 uses various communication services provided by the wireless communication system by receiving control signals or data in DL from the base station 10 and transmitting control signals or data in UL to the base station 10. Note that the terminal 20 may be referred to as a UE, and the base station 10 may be referred to as a gNB.

The terminal 20 can perform carrier aggregation to communicate with the base station 10 by bundling a plurality of cells (a plurality of CCs). In carrier aggregation, one primary cell and one or more secondary cells are used. In addition, PUCCH-SCell having PUCCH may be used.

In addition, in a wireless communication system in an embodiment of the present invention, the base station 10 is a wireless base station deployed in 5G or 6G as an example, and forms a cell. It is to be noted that the cell is a cell of a relatively large size and is referred to as a macro cell.

The base stations 10A to 10D are base stations deployed in 5G or 6G. The base stations 10A to 10D respectively form cells CA to D whose size is smaller than the macro cell. The cells A to D may be referred to as small cells, macro cells, or the like. As illustrated in FIG. 1, the cells A to D may be formed to be included in the macro cell.

The macro cell may be generally interpreted as an area with a radius of several hundred meters to tens of kilometers covered by a single base station in which communications are available. In addition, the small cell may be interpreted as a generic name of a cell that covers a smaller area compared with the macro cell.

It is to be noted that the base station 10 and the base stations 0A to 10D may be described as a gNodeB (gNB), BS (Base Station), or the like. In addition, the terminal 20 may be described as a UE, MS, or the like. Furthermore, a specific configuration of a wireless communication system including the numbers and types of base stations and terminals is not limited to an example illustrated in FIG. 1.

In addition, the wireless communication system is not necessarily limited to a wireless communication system according to 5G or 6G. For example, the wireless communication system may be a wireless communication system of the next generation of 6G, or may be a wireless communication system according to LTE.

The base station 10 and the base stations 10A to 10D perform wireless communications according to 5G or 6G with the terminal 20, as an example. The base station 10, the base stations 10A to 10D, and the terminal 20 may support: a massive MIMO in which highly directional beams are generated by controlling a wireless signal transmitted from a plurality of antenna elements; a carrier aggregation (CA) in which a plurality of component carriers (CCs) are bundled to be used; a dual connectivity (DC) in which communications are simultaneously performed between the terminal 20 and each of two NG-RAN nodes; an IAB (Integrated Access and Backhaul) in which the wireless backhaul between wireless communication nodes such as gNBs is integrated with the wireless access to the terminal 20; and the like.

In addition, the wireless communication system may also support the high frequency band that is higher than the following frequency ranges (FRs) that are specified in the 3GPP release 15. For example, a band between 410 MHz to 7.125 GHz may be supported as FR1, and a band between 24.25 GHz to 52.6 GHz may be supported as FR2. Furthermore, the wireless communication system may support a frequency band that is higher than 52.6 GHz up to 114.25 GHZ. The frequency band may be referred to as a millimeter wave band.

Here, the base station 10 that supports the massive MIMO can transmit beams. In general, the massive MIMO means a MIMO communication in which an antenna with more than 100 antenna elements is used and enables a wireless communication faster than the conventional wireless communication according to the multiplexing effects of a plurality of streams. In addition, advanced beamforming is also available. The beam width can be dynamically changed in accordance with the used frequency band, the state of the terminal 20, etc. In addition, an increase in received signal power can be achieved according to the beamforming gain obtained by using narrower beams. Furthermore, good effects such as reduced interference generation and effective utilization of wireless resources are expected.

In addition, the wireless communication system may include a wireless relay device 30. In an embodiment of the present invention, as an example, the wireless relay device 30 may be a reflector (RIS), a phase control reflector, a passive repeater, an IRS (Intelligent Reflecting Surface), or the like. As a specific example, the reflector (RIS: Reconfigurable Intelligent Surface) may be what is called a metamaterial reflector, a dynamic meta surface, a meta-surface lens, or the like (for example, Non-Patent Document 2).

In an embodiment of the present invention, the wireless relay device 30 relays a wireless signal transmitted from a base station 10A, for example. In the description of an embodiment of the present invention, "relay" may mean at least one of "reflect", "transparently transmit", "aggregate (collect the radio waves approximately to a point)", or "diffract". The terminal 20 can receive a wireless signal relayed by the wireless relay device 30. In addition, the wireless relay device 30 may relay a wireless signal transmitted from the terminal 20 or may relay a wireless signal transmitted from the base station 10.

As an example, the wireless relay device 30 can change the phase of a wireless signal to be relayed to the terminal 20. From the above-described viewpoint, the wireless relay device 30 may be referred to as a phase variable reflector. It is to be noted that, in an embodiment of the present invention, the wireless relay device 30 may be, but is not limited to, a device having a function of changing the phase of a wireless signal to be relayed. In addition, the wireless relay device 30 may be referred to as a repeater, relay device, reflection array, IRS, transmission array, or the like.

In addition, in an embodiment of the present invention, the wireless relay device 30 including an RIS may be referred to as a battery-less device, meta-material function device, intelligent reflecting surface, smart repeater, or the like. As an example, the wireless relay device 30 including the RIS, smart repeater, or the like, may be defined as a device having a function as described in 1) to 5) below.

1) The device may have a function of receiving a signal transmitted from the base station 10. The signal may be a DL signal such as an SSB (SS/PBCH block), PDCCH, PDSCH, DM-RS (Demodulation Reference Signal), PT-RS (Phase Tracking Reference Signal), CSI-RS (Channel Status Information Reference Signal), RIS dedicated signal, or the like. The device may have a function of receiving a signal carrying information related to a meta-material function. It is to be noted that the device may have a function of transmitting the signal to the terminal 20. An SSB may be a signal including a synchronization signal and broadcast information.

2) The device may have a function of transmitting a signal to the base station 10. The signal may be a UL signal such as a PRACH, PUCCH, PUSCH, DM-RS, PT-RS, SRS, RIS dedicated signal, or the like. The device may have a function of transmitting information related to a meta-material function. It is to be noted that the device may have a function of receiving the signal from the terminal 20.

3) The device may have a function of frame synchronization with the base station 10. It is to be noted that the device may have a function of frame synchronization with the terminal 20.

4) The device may have a function of reflecting a signal transmitted from the base station 10 or the terminal 20. For example, the reflecting function may be a function related to the phase change, or a function related to beam control (for example, a function related to control of TCI (Transmission Configuration Indication)-state, or QCL (Quasi Co Location), selection and application of beams, and selection and application of spatial filters/precoding weights).

5) The device may have a function of changing power of a signal transmitted from the base station 10 or the terminal 20. For example, the function of changing power may be power amplification.

In addition, "receive to transmit" or "relay" in the wireless relay device 30 including a RIS, smart repeater, or the like, may mean to perform transmission including the function A described below but not including the function B described below.

Function A: Applying a phase shifter.

Function B: Not including compensation circuit (for example, amplifying, filtering).

As a different example,

Function A: Applying a phase shifter and compensation circuit.

Function B: Not including frequency conversion.

It is to be noted that the amplitude may be amplified when the phase is changed in the wireless relay device 30 such as an RIS, or the like. In addition, "relaying" in the wireless relay device 30 such as an RIS, or the like, may mean transmitting a received signal as it is without performing a process of layer 2 or layer 3 level, may mean transmitting a received signal as it is in the physical layer level, or may mean transmitting a received signal as it is without interpreting the signal (changing the phase or amplifying the amplitude may be performed).

(Device Configuration)

Next, examples of functional configurations of the base station 10, the terminal 20, and the wireless relay device 30 that perform processing and operations in an embodiment of the present invention will be described. The base station 10, the terminal 20, and the wireless relay device 30 include functions of performing embodiments to be described below. With respect to the above, each of the base station 10, the terminal 20, and the wireless relay device 30 may include only one function among the embodiments.

<Base Station 10>

Figure 2:
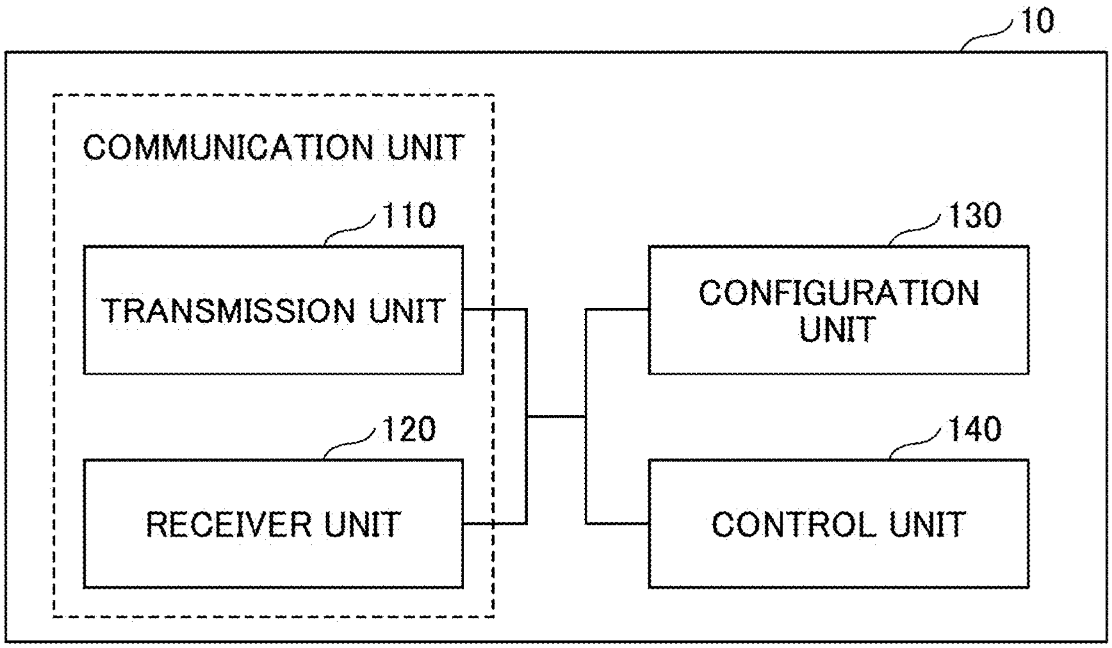
FIG. 2 is a drawing illustrating an example of a functional configuration of a base station 10 in an embodiment of the present invention.

FIG. 2 is a diagram illustrating an example of a functional configuration of the base station 10. As shown in FIG. 2, the base station 10 includes a transmission unit 110, a receiver unit 120, a configuration unit 130, and a control unit 140. The functional configuration illustrated in FIG. 2 is merely an example. Functional divisions and names of functional units may be anything as long as operations according to an embodiment of the present invention can be performed. The transmission unit 110 and the receiver unit 120 may be referred to as a communication unit.

The transmission unit 110 includes a function for generating a signal to be transmitted to the terminal 20 side and transmitting the signal wirelessly. The receiver unit 120 includes a function for receiving various signals transmitted from the terminal 20 and acquiring, for example, information of a higher layer from the received signals. Further, the transmission unit 110 has a function of transmitting NR-PSS, NR-SSS, NR-PBCH, DL/UL control signals, the DL data, and the like, to the terminal 20. In addition, the transmission unit 110 transmits configuration information, or the like, described in the embodiments.

The configuration unit 130 stores preset configuration information and various configuration information items to be transmitted to the terminal 20 in a storage apparatus and reads the preset configuration information from the storage apparatus as necessary. The control unit 140 performs, for example, resource allocation and control of the entire base station 10. Note the functional unit related to signal transmission in the control unit 140 may be included in the transmission unit 110, and the functional unit related to signal receiving in the control unit 140 may be included in the receiver unit 120. Further, the transmission unit 110 and the receiver unit 120 may be referred to as a transmitter and a receiver, respectively.

<Terminal 20>

Figure 3:
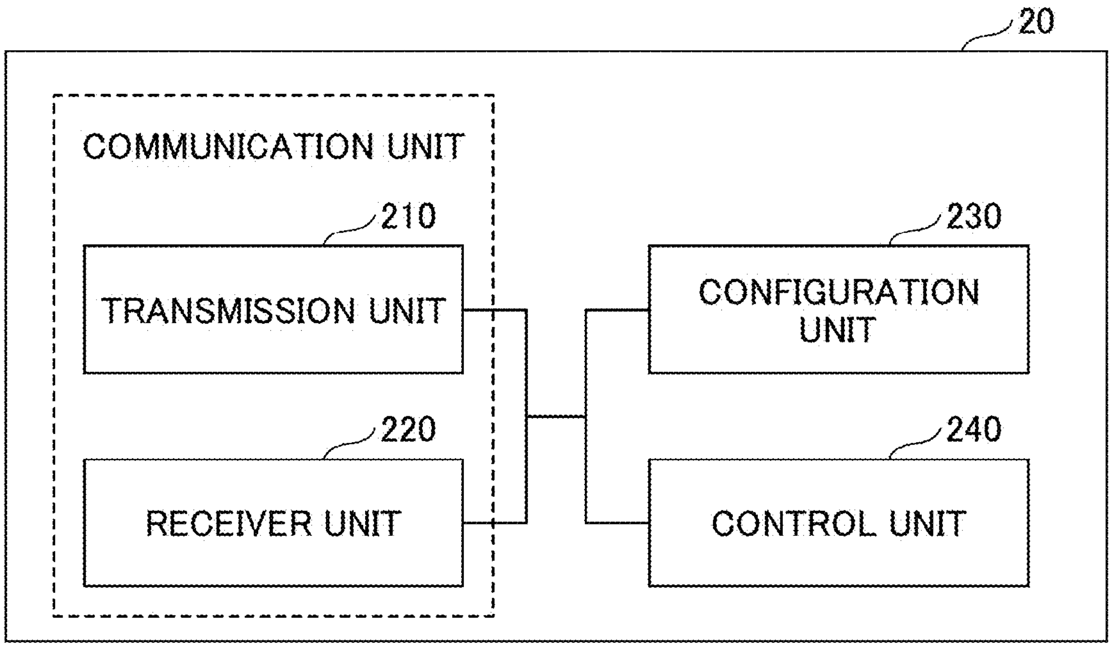
FIG. 3 is a drawing illustrating an example of a functional configuration of a terminal 20 in an embodiment of the present invention.

FIG. 3 is a diagram illustrating an example of a functional configuration of the terminal 20. As shown in FIG. 3, the terminal 20 includes a transmission unit 210, a receiver unit 220, a configuration unit 230, and a control unit 240. The functional configuration illustrated in FIG. 3 is merely an example. Functional divisions and names of functional units may be anything as long as operations according to an embodiment of the present invention can be performed. The transmission unit 210 and the receiver unit 220 may be referred to as a communication unit.

The transmission unit 210 generates a transmission signal from transmission data and transmits the transmission signal wirelessly. The receiver unit 220 receives various signals wirelessly and obtains upper layer signals from the received physical layer signals. In addition, the transmission unit 210 transmits a HARQ-ACK, and the receiver unit 220 receives configuration information described in an embodiment of the present invention.

The configuration unit 230 stores, in a storage device, various configuration information items received from the base station 10 via the receiver unit 220, and reads them from the storage device as necessary. In addition, the configuration unit 230 also stores pre-configured configuration information. The control unit 240 controls the entire terminal 20. Note the functional unit related to signal transmission in the control unit 240 may be included in the transmission unit 210, and the functional unit related to signal receiving in the control unit 240 may be included in the receiver unit 220. Further, the transmission unit 210 and the receiver unit 220 may be referred to as a transmitter and a receiver, respectively.

<Wireless Relay Device 30>

Figure 4:
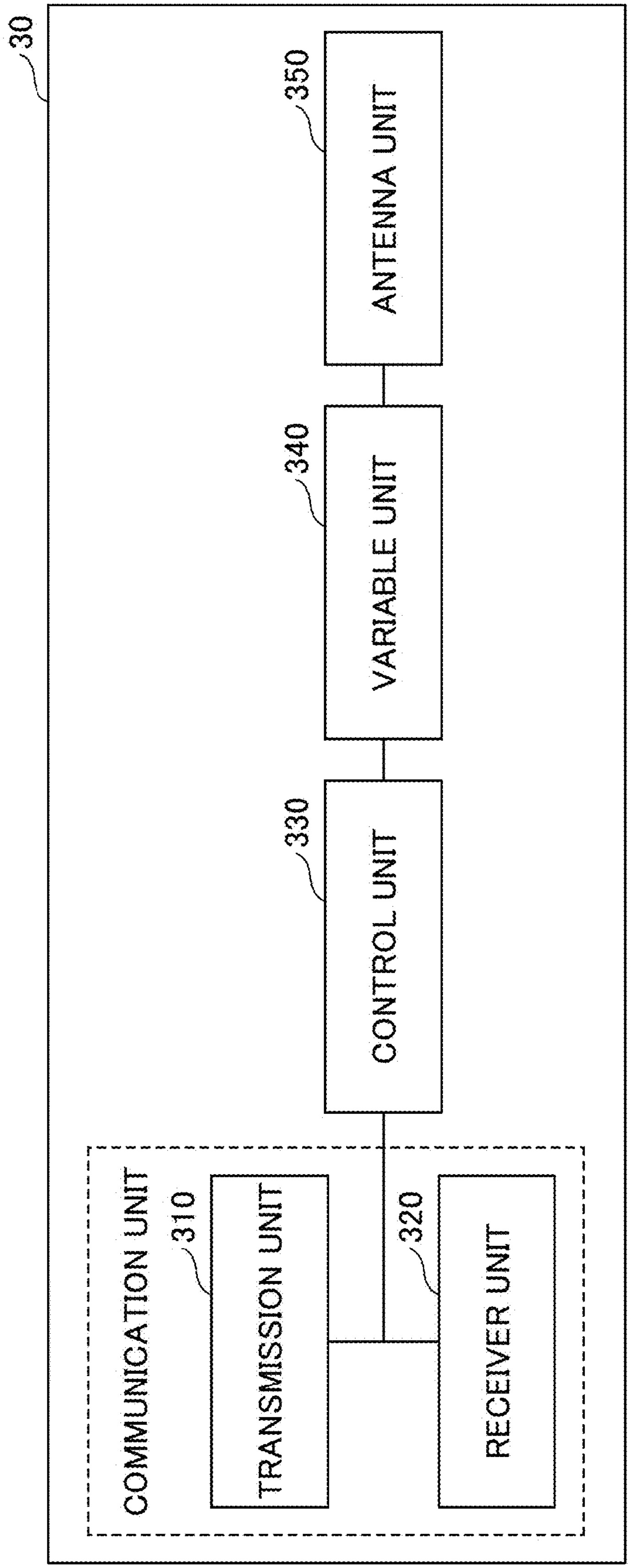
FIG. 4 is a drawing illustrating an example of a functional configuration of a wireless relay device 30 in an embodiment of the present invention.

FIG. 4 is a drawing illustrating an example of a functional configuration of a wireless relay device 30 in an embodiment of the present invention. As shown in FIG. 4, the Wireless relay device 30 includes a transmission unit 310, a receiver unit 320, a control unit 330, a variable unit 340, and an antenna unit 350. Functional divisions and names of functional units may be anything as long as operations according to an embodiment of the present invention can be performed. The transmission unit 310 and the receiver unit 320 may be referred to as a communication unit.

The antenna unit 350 includes at least one antenna that is connected to the variable unit 340. For example, the antenna unit 350 may be arranged as an array antenna. In an embodiment of the present invention, the antenna unit 350 may be specifically referred to as a relay antenna. It is to be noted that the variable unit 340 and the antenna unit 350 may be referred to as a relay unit.

The variable unit 340 is connected to the antenna unit 350, and is capable of changing the phase, load, amplitude, or the like. For example, the variable unit 340 may be a variable phase shifter, a phase shifter, an amplifier, or the like. For example, the direction of the radio waves or beams can be changed by changing the phase of the radio waves transmitted from the generation source of the radio waves to the relay antenna.

The control unit 330 is a control means for controlling the variable unit 340. In an embodiment of the present invention, the control unit 330 functions as a control unit for controlling the relaying states at the time of relaying of radio waves received from the base station 10 or the terminal 20 without signal interpretation. Here, the control unit 330 may change the relaying state based on the control information received from the base station 10 or the terminal 20 via the communication unit, or may change the relaying state based on the receiving state of the radio waves received from the base station 10 or the terminal 20. For example, the control unit 330 may select appropriate (directions of) signal-receiving beams and transmission beams and may control the variable unit 340, based on the control information such as an SSB, or the like. Similarly, the control unit 330 may select an appropriate combination of reception direction and transmission direction, according to the receiving state, based on the criteria such as the best received quality or the largest received power and may control the variable unit 340.

In addition, in an embodiment of the present invention, the control unit 330 can control the variable unit 340, based on, for example, the information related to the propagation math between the terminal 20 or the base station 10A and the antenna unit 350 (hereinafter, including information estimated from the receiving state and the control information). For example, the control unit 330 can relay the radio waves received from the base station 10A towards a specific direction of the recipient of the radio waves (in this case, the terminal 20) by using a known method including an active repeater, RIS, or the like, to change the phase without using the transmission power. Specifically, the control unit 330 controls the phase of the wireless signal to be relayed towards the terminal 20 or the base station 10A, based on the estimated propagation path information, $H_{PT}$ and $H_{RP}$. In other words, according to the same principle as the beamforming, etc., the radio waves can be relayed towards a specific direction by changing the phase of the array antenna, etc. It is to be noted that the wireless relay device 30 only controls (changes) the phase of the wireless signal (radio waves) via the control unit 330, and thus, may perform the relaying without power supply and without performing the power amplification of the wireless signal to be relayed.

In addition, the control unit 330 may obtain the information according to the receiving state in an embodiment of the present invention. In addition, the receiver unit 320 may obtain control information from the base station 10A or the terminal 20. For example, the receiver unit 320 may receive, as the control information, various signals including SSB (including various signals described as an example in the above-described functions) transmitted from the base station 10A or the terminal 20.

In addition, the control unit 330 may estimate the propagation path information ($H_{PT}$ and $H_{RP}$) between the generation source of the radio waves (for example, the base station 10A or the terminal 20) and the antenna unit 350, based on the receiving state (for example, the change of the received power, or the like) at the time of controlling the variable unit 340.

The propagation path information related to each propagation path (propagation channel information) is specifically information of amplitude or phase and is estimated information with respect to the propagation path of the radio waves arriving at the antenna unit 350 in an embodiment of the present invention. As an example, according to the same principle as the I/Q (In-phase/Quadrature) detection, the control unit 330 may estimate the propagation path information of the antenna unit 350, based on the change of the received power at the time when the phase of the variable unit 340 of the array-shaped antenna unit 350 is orthogonally switched.

Figure 5:
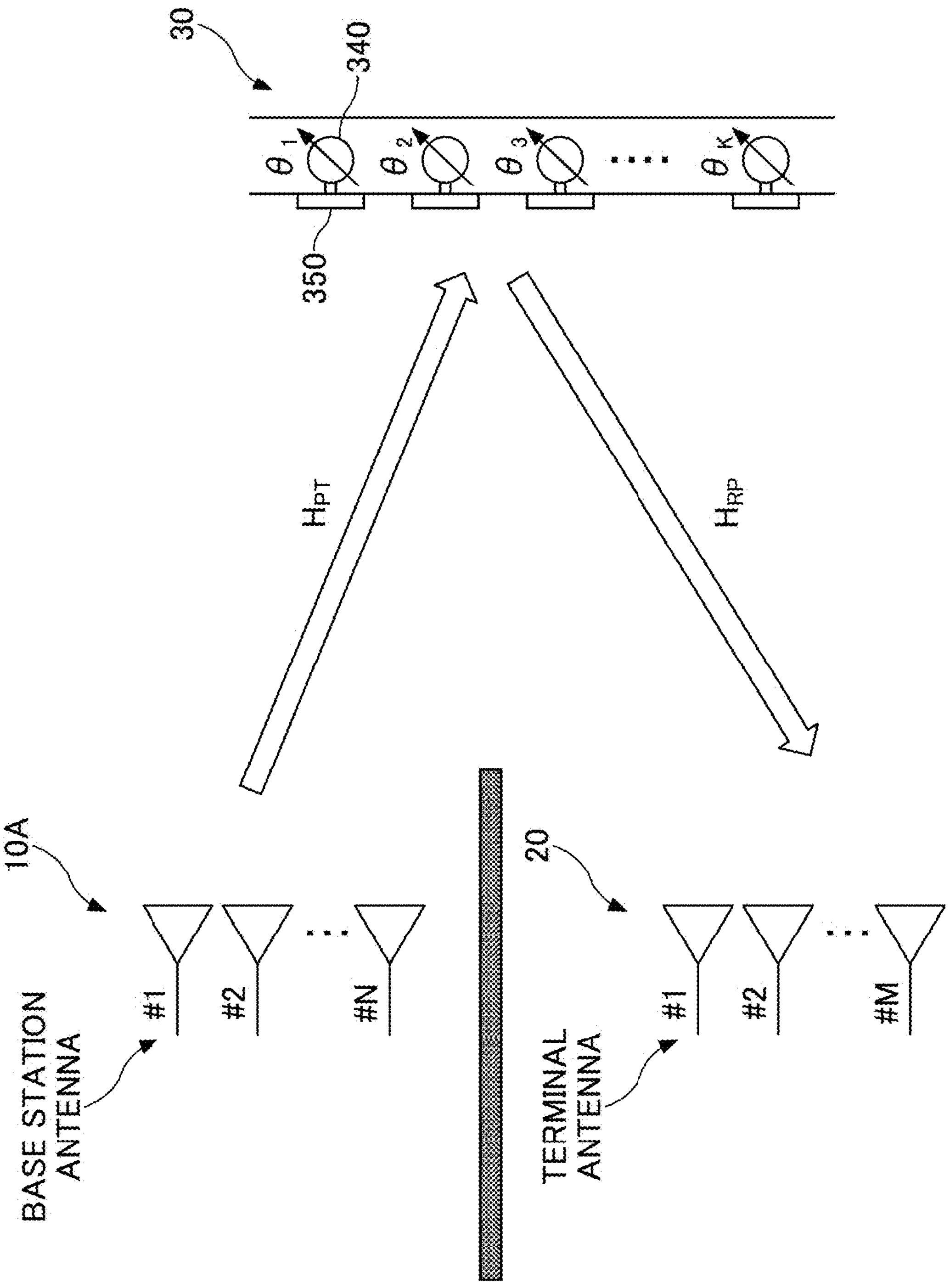
FIG. 5 is an operation example of a wireless relay device 30 in an embodiment of the present invention.

FIG. 5 is an operation example of a wireless relay device 30 in an embodiment of the present invention. As illustrated in FIG. 5, as an example, the wireless relay device 30 is located between the base station 10A (may be another base station 10, or the like) and the terminal 20, and relays (reflects, transparently transmits, collects, diffracts) a wireless signal transmitted and received between the base station 10A and the terminal 20.

As a specific example, in a case where the wireless quality is good, the base station 10A and the terminal 20 directly transmit and receive a wireless signal without using relaying by the wireless relay device 30. On the other hand, in a case where the wireless quality is degraded, for example, where there is a shielding object between the base station 10A and the terminal 20, the wireless relay device 30 relays a wireless signal transmitted and received between the base station 10A and the terminal 20.

Specifically, the wireless relay device 30 estimates the propagation path information, HPT and HRT, between the generation source such as the base station 10A or the terminal 20 and the relay antenna, based on the change of the received power at the time of controlling the variable unit 340 such as a variable phase shifter. In addition, the wireless relay device 30 relays a wireless signal towards the recipient of the radio waves such as the terminal 20, by controlling the variable unit 340 such as a variable phase shifter, based on the estimated propagation path information. It is to be noted that the wireless relay device 30 may relay a wireless signal towards the recipient of the radio waves such as the base station 10A or the terminal 20 by controlling the variable unit 340 such as a variable phase shifter based on the control information received from the base station 10A or the terminal 20 without limiting the case to a case of estimating the propagation path information, $H_{PT}$ and $H_{RT}$.

Here, the propagation path or the propagation channel is each of the communication paths of the wireless communication, and is a communication path between each of the transmission antennas and each of reception antennas (for example, base station antennas and terminal antennas in the figure).

As an example, the wireless relay device 30 includes: an antenna unit 350 including a small multi-element antenna corresponding to the massive MIMO; and a variable unit 340 including a variable phase shifter or a phase shifter that changes the phase of a wireless signal, which is substantially the radio waves, to a specific phase, and controls the phase of the radio waves to be relayed towards the terminal 20 or the base station 10A by using the variable unit 340.

Figure 6:
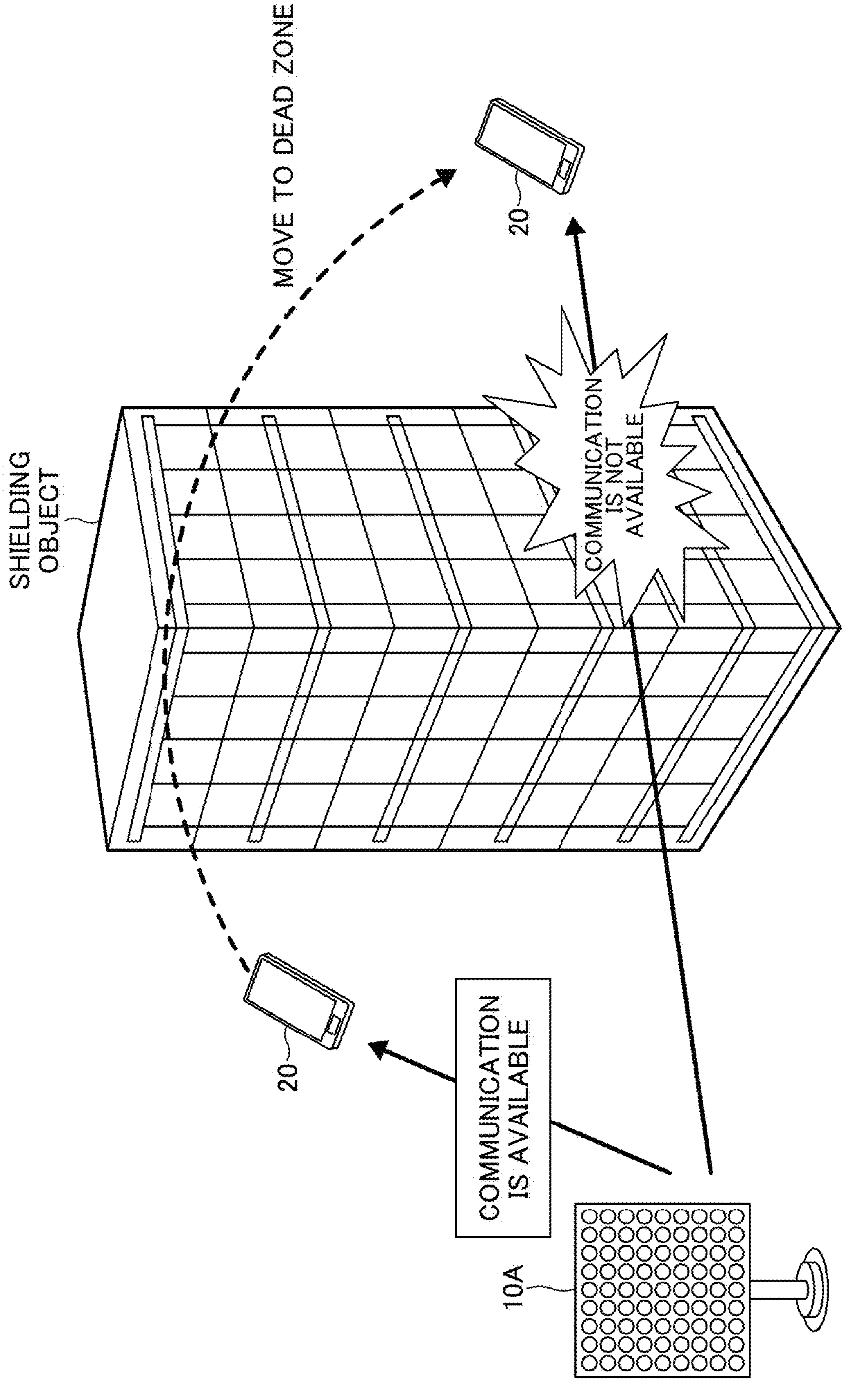
FIG. 6 is a drawing illustrating an example of a communication in the high frequency band.

FIG. 6 is a drawing illustrating an example of a communication in the high frequency band. As illustrated in FIG. 6, in a case of using the high frequency band that is equal to or higher than several GHz to several dozens of GHz, dead zones are easily created because of the radio waves' strong tendency of traveling straight. If the line of sight between the base station 10A and the terminal 20 is not blocked, the wireless communication between the base station 10A and the terminal 20 is not affected even in a case where the high frequency band is used. On the other hand, for example, if the line of sight between the base station 10A and the terminal 20 is blocked by a shielding object such as a building or a tree, the wireless quality is significantly degraded. In other words, when the terminal 20 moves to a dead zone in which the line of sight is blocked by a shielding object, the communication can be interrupted.

Considering the fact that there is an application that utilizes high data rate/high capacity and low latency characteristics, it is important to resolve the dead zones to ensure the connection between the base station and the terminal without a communication interruption within the wireless communication system.

Accordingly, technologies of the radio wave propagation control device such as an RIS or smart repeater that can relay the radio waves between the base station 10A and the terminal 20 are being developed. In this way, communication characteristics can be improved by controlling the propagation characteristics of the base station signals, and thus, the coverage enhancement without using a signal source and the reduction of the installation and deployment cost due to the addition of base stations can be achieved.

Conventionally, there are a passive type and an active type in the radio wave propagation control device. The passive type has an advantage of not requiring control information, but is not capable of following the mobile body, environmental change, or the like. On the other hand, the active type has a disadvantage of increased overhead requiring the control information, but has an advantage of being capable of variably controlling the propagation characteristics of the radio waves by changing the load (phase) state of the control antennas and being capable of following the mobile body, environment change, etc.

There are two types including a feedback (FB) type and a propagation path information type in the active type radio wave propagation control device and control method. In the FB type, the variable type radio wave propagation control device searches an optimal condition by having the feedback of the communication state when the load (phase) state is randomly changed performed by the terminal 20, etc. On the other hand, in the propagation path information type, the optimal radio wave propagation control can be performed by determining the load state based on the propagation path information between the base station and the radio wave propagation control device. In an embodiment of the present invention, either type can be applied.

In addition, with respect to the relay method, there are types of reflection, transparent transmission, diffraction, collection, etc. In an embodiment of the present invention, as an example, configuration examples of a reflection type and a transparent transmission type will be described below (refer to Non-Patent Document 2 with respect to the diffraction type and the collection type).

Figure 7:
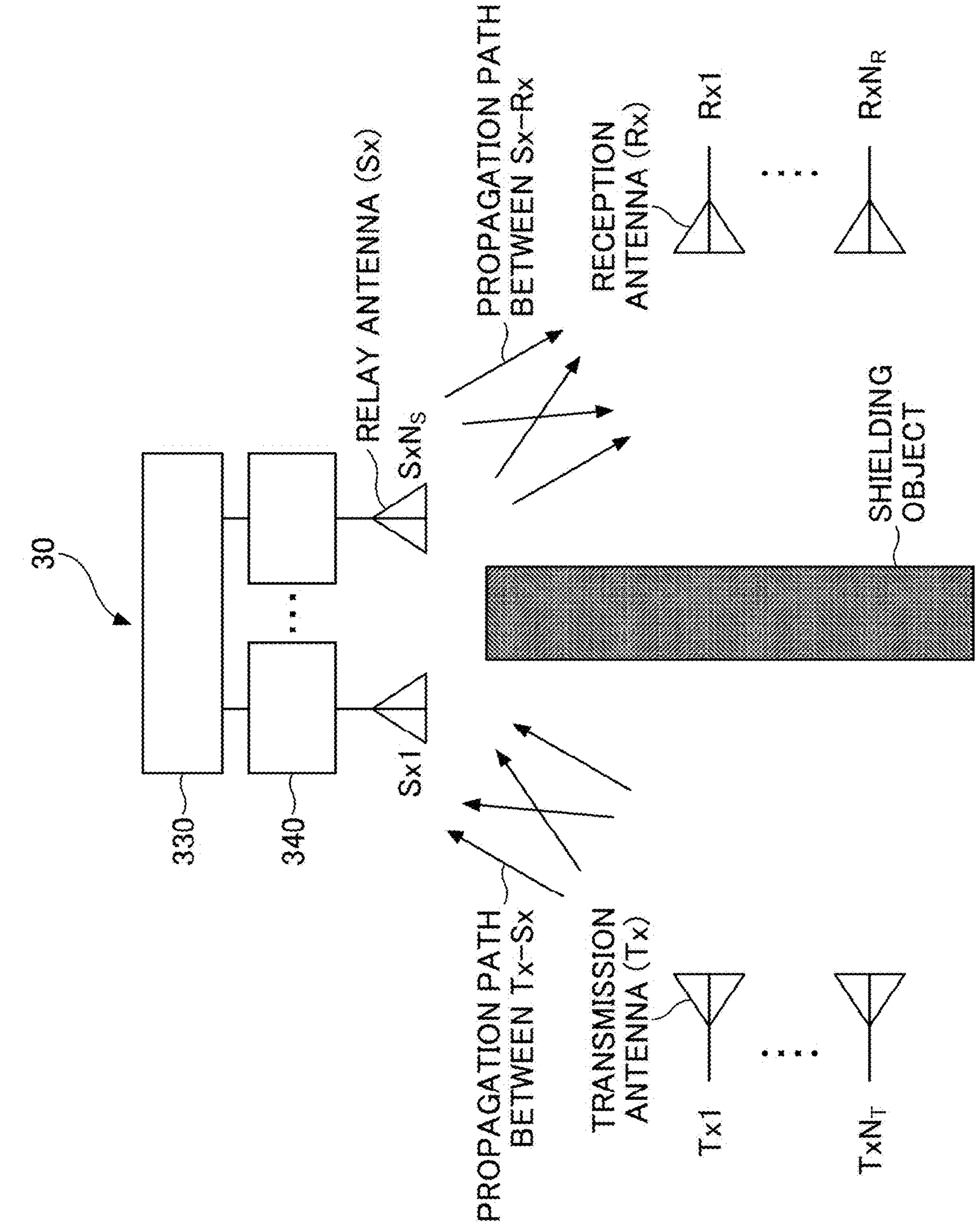
FIG. 7 is a drawing illustrating an example of a reflection type wireless relay device 30 in an embodiment of the present invention.

FIG. 7 is a drawing illustrating an example of a reflection type wireless relay device 30 in an embodiment of the present invention. FIG. 7 will be used for describing an example of a system structure of a reflection type wireless relay device 30. FIG. 7 is a drawing illustrating relationships among the transmission antenna Tx of the base station 10A or the like, the relay antenna Sx of the transparent transmission type wireless relay device 30, and the reception antenna Rx of the terminal 20 or the like. As illustrated in FIG. 7, in an embodiment of the present invention, MIMO is used as an example, there are multiple propagation paths between Tx and Sx and multiple propagation paths between Sx and Rx, and the wireless relay device 30 relays the radio waves by controlling the variable unit 340 that includes a variable phase shifter of the relay antenna Sx, or the like.

As illustrated in FIG. 7, in a case of the reflection type, the array-shaped relay antenna is arranged in a manner in which antennas face the same direction. According to the above, propagation paths of the relay antenna can be estimated based on the receiving states that are observed when multiple phase conditions of the relay antenna are changed.

Figure 8:
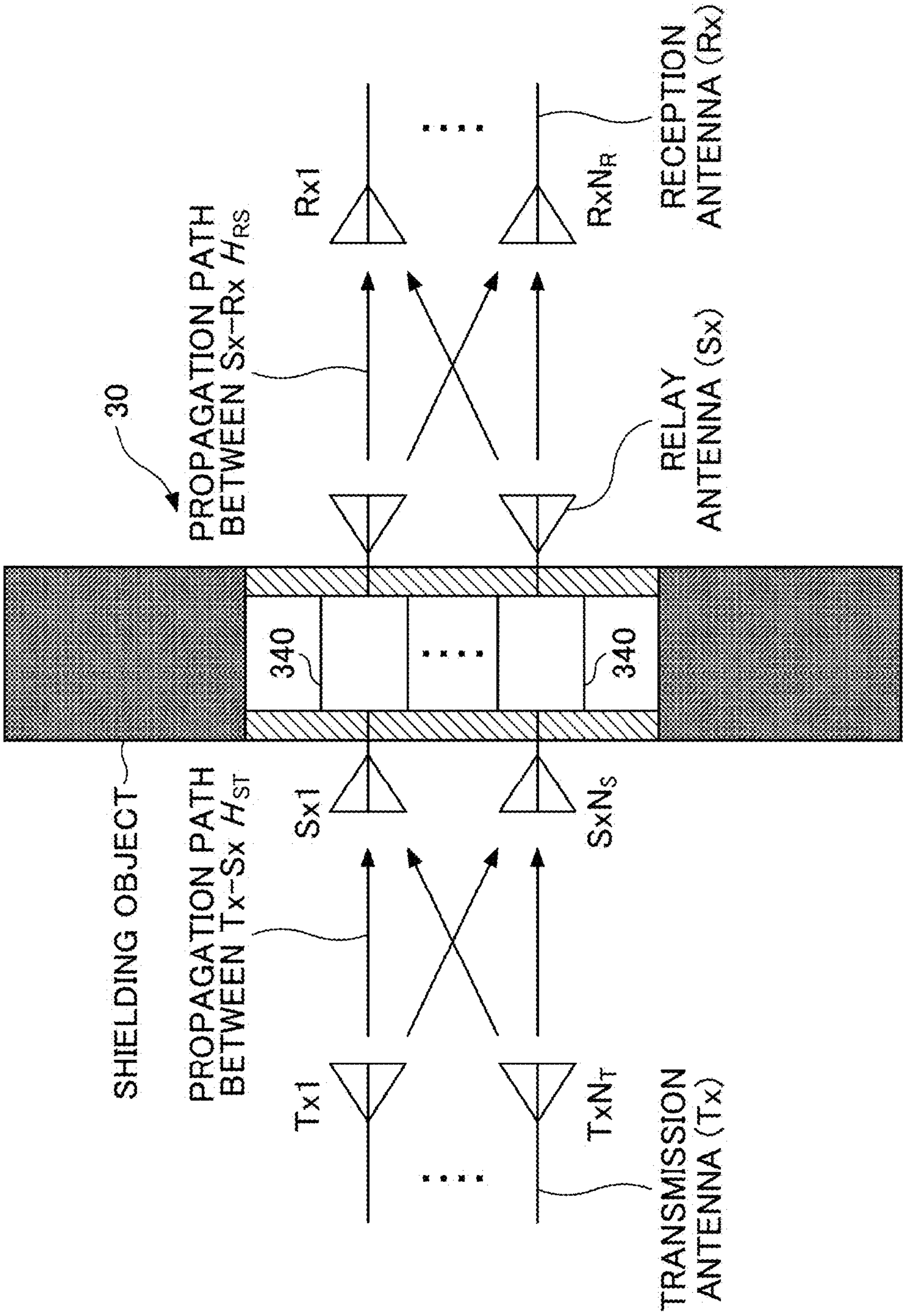
FIG. 8 is a drawing illustrating an example of a transparent-type wireless relay device 30 in an embodiment of the present invention.

FIG. 8 is a drawing illustrating an example of a transparent transmission type wireless relay device 30 in an embodiment of the present invention. FIG. 8 will be used for describing an example of a system structure of a transparent transmission type wireless relay device 30. FIG. 8 is a drawing illustrating relationships among the transmission antenna Tx of the base station 10A or the like, the relay antenna Sx of the transparent transmission type wireless relay device 30, and the reception antenna Rx of the terminal 20 or the like. As illustrated in FIG. 8, in an embodiment of the present invention, MIMO is used as an example, there are multiple propagation paths between Tx and Sx and multiple propagation paths between Sx and Rx, and the wireless relay device 30 relays the radio waves received from one side to the other side via the variable unit 340 of the relay antenna Sx such as a variable phase shifter as illustrated in the figure. As described above, in a case of the transparent transmission type, reference antennas on the left side of the figure and relay antennas on the right side of the figure are arranged as pairs respectively facing the opposite directions in a manner in which the radio waves received from one side can be relayed to the other side. Regardless of the transparent transmission type or the reflection type, the receiving state may be measured by detecting the power arrived at the relay antennas by using the power detection device, or the like. In addition, propagation paths of the relay antennas can be estimated based on the received signals that are observed when multiple phase conditions of the relay antennas are changed.

For example, in the future network such as 6G, even higher quality is required as compared with 5G. For example, the tera-bps order of ultra-high speed, the optical-communication level of high reliability and low latency, and the like, are required. In addition, the ultra-coverage enhancement, the ultra-long-distance communication, the ultra-reliability communication, the virtual cell, the flexible network, the mesh network, the sidelink enhancement, the design in which RIS or smart repeater is taken into account will be required.

In order to achieve the above-described quality, the utilization of very high frequencies such as tera-Hz waves is expected. For example, in a case of using the very high frequencies such as tera-Hz waves, while there are advantages of the faster speed by utilization of ultra-wide band and the lower latency by utilization of shorter symbol length, disadvantages of the narrower coverage due to the larger attenuation rate, the reduced reliability due to the higher tendency of traveling straight are expected. Discussions are required on how to provide redundancy to each point for which 6G communications are required, that is, how to increase the number of transmission points of the communication.

As described above, the RIS reflects or transparently transmits a beam transmitted from the base station 10 or the terminal 20 in a predetermined direction to be transmitted to the terminal 20 or the base station 10. The passive-type RIS is a device that does not change the control of the reflection angle, beam width, or the like, in accordance with the position of the mobile station, and thus, control information is not required but precise beam control is difficult. The active-type RIS is a device that changes the control of the reflection angle, beam width, or the like, in accordance with the position of the mobile station, and thus, precise beam control is available but control information is required and the overhead increases. The number of transmission points of communications can be increased by the RIS.

It is to be noted that the RIS may be referred to, but is not limited to, the names described in 1) to 5) below.

1) Battery-less device
2) Meta-material function device
3) Intelligent reflecting surface
4) Smart repeater
5) Network-controlled repeater The RIS may be a device with a predetermined function, and the predetermined function may be at least one of 1) or 2) described below, for example.

1) UE Function

The receiving function of a signal transmitted from the base station 10 (for example, DL signal, SSB, PDCCH, PDSCH, DM-RS, PT-RS, CSI-RS, RIS dedicated signal). According to the above-described receiving function, information related to the meta-material function described in 2) below may be received. The transmission function of a signal transmitted to the base station 10 (for example, UL signal, PRACH, PUCCH, PUSCH, DM-RS, PT-RS, SRS, RIS dedicated signal). According to the above-described transmission function, information related to the meta-material function described in 2) below may be transmitted. The frame synchronization function with the base station 10.

2) Meta-Material Function

The reflecting function of a signal transmitted from the base station 10 or the terminal 20 (for example, phase change). The signal reflection may be performed by performing phase change by each of a plurality of reflecting elements included in the RIS, or the signal reflection may be performed by performing the common phase change by the plurality of reflecting elements. The function related to beam control (for example, a function related to control of TCI-state or QCL, application of beam selection, application of spatial filter/precoding weight selection). The power change function of a signal transmitted from the base station 10 or the terminal 20 (for example, power amplification). Each of the reflecting elements included in the RIS may perform different power change, or the plurality of reflecting elements may perform common power change.

"Receive to transmit" by the RIS may mean to reflect radio waves/signal. Hereinafter, the terms of "base station" and "terminal" will be used. However, the terms are not limited to "base station" and "terminal", and may be replaced with a communication device. The RIS may be replaced with a smart repeater, a relay device, or the like.

For example, the RIS may operate by assuming 1) to 6) described below.

1) The network operator configures the RIS
2) The RIS is fixed and does not move
3) The RIS relays a signal from a single base station alone
4) The RIS is capable of receiving and transmitting a control signal
5) The RIS operates by using the half duplex communication
6) Single RIS environment As described above, the RIS, smart repeater, or the like, may be used for the sake of flexible and low-cost enhancement of the communication area of a wireless communication network. As a big difference between the RIS or smart repeater and the IAB node, the IAB node performs the base band signal processing, but the RIS or smart repeater does not perform base band processing. The RIS or smart repeater performs control of transmission directions, transmission beams, or the like, and thus, the connection may be established between the base station 10 and the RIS or smart repeater, and configuration information may be defined in advance.

Here, it is necessary to specify an operation in a case where the terminal 20 uses signals via a plurality of wireless relay devices 30 such as the RISs or smart repeaters. It is to be noted that, in the following descriptions, the RIS may be replaced with a smart repeater.

Figure 9:
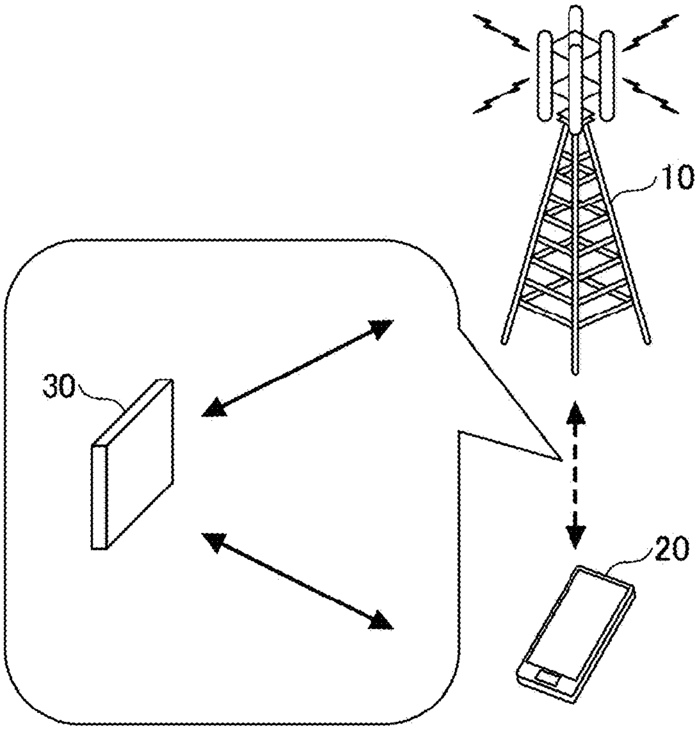
FIG. 9 is a drawing illustrating an example (1) of a communication in an embodiment of the present invention.

FIG. 9 is a drawing illustrating an example (1) of a communication in an embodiment of the present invention. As illustrated in FIG. 9, a case 1 is expected in which the existence of the RIS 30 is transparent and the base station 10 and the terminal 20 do not recognize that the communication is performed via the RIS 30.

Figure 10:
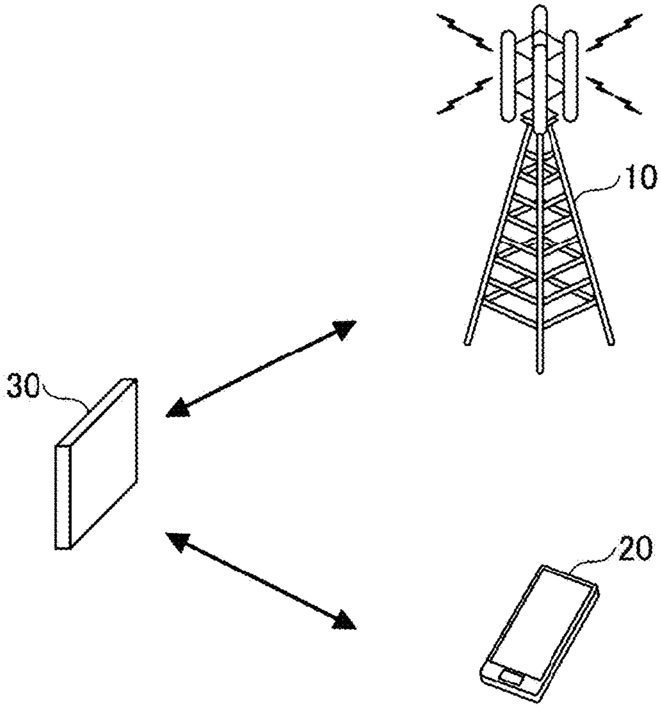
FIG. 10 is a drawing illustrating an example (2) of a communication in an embodiment of the present invention.

FIG. 10 is a drawing illustrating an example (2) of a communication in an embodiment of the present invention. As illustrated in FIG. 10, a case 2 is expected in which the existence of the RIS 30 is non-transparent and the base station 10 and the terminal 20 recognize that the communication is performed via the RIS 30.

Figure 11:
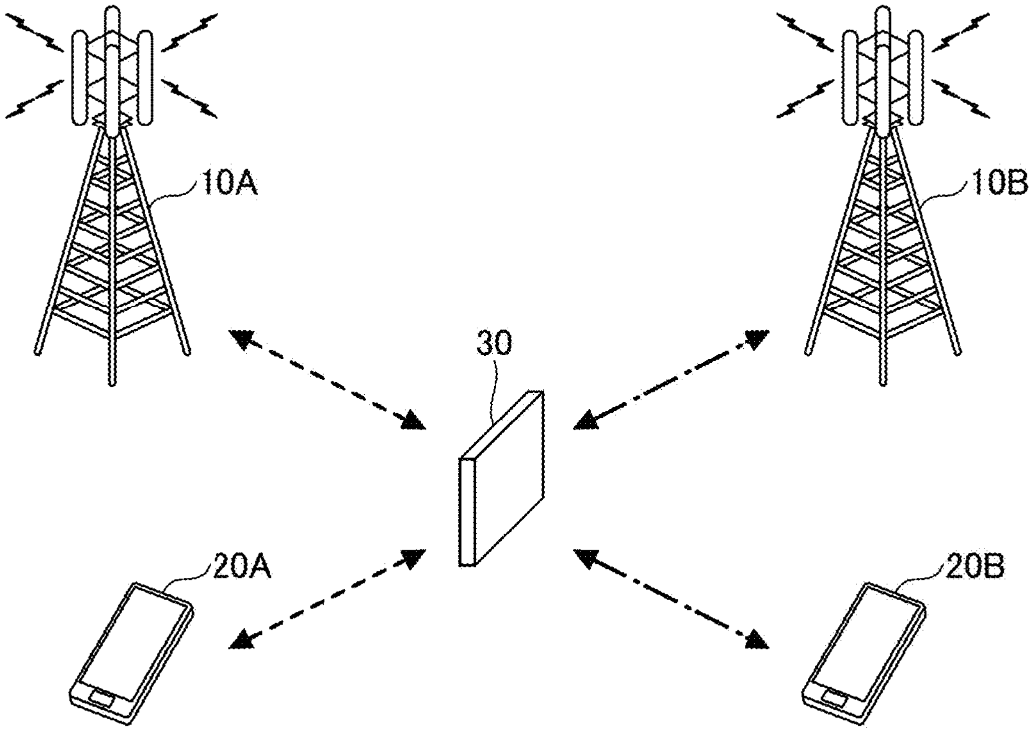
FIG. 11 is a drawing illustrating an example (3) of a communication in an embodiment of the present invention.

FIG. 11 is a drawing illustrating an example (3) of a communication in an embodiment of the present invention. As illustrated in FIG. 11, a case 3 is expected in which the existence of the RIS 30 is non-transparent, and communications between a plurality of base stations 10 and a plurality of terminals 20 are relayed by the RIS 30.

In an embodiment of the present invention, the above-described case 3 is mainly assumed, but the assumed case is not limited to the case 3. An embodiment of the present invention may be applied to the above-described case 1 or 2.

Throughout the above-described cases 1, 2, and 3, scenarios described in 1) to 7) below may be applied, but the applied scenario is not limited to the scenarios described in 1) to 7) below.

1) The installer is an operator.
2) The RIS 30 is installed in a fixed manner, and is not expected to move.
3) The number of base stations 10 connected to the RIS 30 is equal to or greater than one (1).
4) The number of hops is one (1).
5) The RIS 30 has a transmission and receiving function of a control signal.
6) The duplex method is a half duplex method. In other words, DL and UL are not required to be simultaneously relayed by the RIS 30.
7) The number of RISs that are present between the base station and the terminal may be plural.

Here, as illustrated in FIG. 11, an operation of the terminal 20 related to the RIS function under the environment in which a plurality of base stations 10 exist is required to be clarified. In addition, discussions are required on how to avoid the resource collision with respect to signals from/to a plurality of base stations 10.

Accordingly, when the received quality of a predetermined signal (for example, discovery RS) from a plurality of base stations 10 is equal to or greater than a predetermined value, the RIS 30 may perform operations described in 1) to 3) below.

1) The RIS 30 may establish a connection with only one of the base stations 10 for which the received quality is equal to or greater than the predetermined value. In other words, the RIS 30 may reflect or radiate only DL signal from the said base station 10 and UL signal from the said base station 10. The said base station 10 may be a base station 10 for which the received quality is best. For example, the said base station 10 may be a base station 10 that is selected based on a predetermined priority. The said priority may be specified in advance, or may be indicated by each base station 10. For example, the said priority may be determined based on the sequence of the signal for the received quality measurement from the base station 10. For example, which base station 10 is to be connected may be determined based on the implementation of the RIS 30.
2) The RIS 30 may establish connections with a plurality of (referred to as X) base stations 10 for which the received quality is equal to or greater than a predetermined value. For example, the RIS 30 may establish connections with X base stations 10 for which the received quality belongs to the highest X received qualities. For example, the said X base stations 10 may be base stations 10 that are selected based on a predetermined priority. The said priority may be specified in advance, or may be indicated by each base station 10. For example, the said priority may be determined based on the sequence of the signal for the received quality measurement from the base station 10. For example, which base station 10 is to be connected may be determined based on the implementation of the RIS 30. It is to be noted that X may be a value that is determined according to the capability of the RIS 30.
3) The RIS 30 may establish connections with all base stations 10 for which the received quality is equal to or greater than a predetermined value.

It is to be noted that the above-described predetermined value related to the received quality may be specified in the technical specification, or may be configured from another network node to the RIS 30. In addition, the RIS 30 may assume that the received quality is equal to or greater than a predetermined value when demodulation of a predetermined signal is successful. Information related to availability of connection with the RIS 30 may be transmitted using the predetermined signal.

It is to be noted that the establishment of the connection with a base station 10 may mean an operation of the RIS 30 of reflecting a signal from the said base station and a signal to the said base station.

Which of the above-described operations 1) to 3) is to be performed may be specified in the technical specification, or may be configured from another network node to the RIS 30.

In addition, the RIS 30 may report information related to the received quality of a predetermined signal (for example, discovery RS) from a plurality of base stations 10 to one or more base stations 10, or may perform operations described in 1) to 3) below.

1) The RIS 30 may report the information related to the received quality to one of the base stations 10. For example, the said base station 10 may be a base station 10 for which the received quality is equal to or greater than a predetermined value. For example, the said base station 10 may be a base station 10 for which the received quality is best. For example, the said base station 10 may be a base station 10 that is selected based on a predetermined priority. The said priority may be specified in advance, or may be indicated by each base station 10. For example, the said priority may be determined based on the sequence of the signal for the received quality measurement from the base station 10. For example, which base station 10 is to be connected may be determined based on the implementation of the RIS 30.
2) The RIS 30 may report the information related to the received quality to a plurality of (X) base stations 10. For example, the plurality of base stations 10 may be base stations 10 for which the received quality is equal to or greater than a predetermined value. For example, the RIS 30 may report the information related to the received quality to X base stations 10 for which the received quality belongs to the highest X received qualities. For example, the said X base stations 10 may be base stations 10 that are selected based on a predetermined priority. The said priority may be specified in advance, or may be indicated by each base station 10. For example, the said priority may be determined based on the sequence of the signal for the received quality measurement from the base station 10. For example, which base station 10 is to be connected may be determined based on the implementation of the RIS 30. It is to be noted that X may be a value that is determined according to the capability of the RIS 30.
3) The RIS 30 may report the information related to the received quality to all base stations 10.

It is to be noted that the above-described predetermined value related to the received quality may be specified in the technical specification, or may be configured from another network node to the RIS 30. In addition, the RIS 30 may assume that the received quality is equal to or greater than a predetermined value when demodulation of a predetermined signal is successful. Information related to availability of connection with the RIS 30 may be transmitted using the predetermined signal.

It is to be noted that the information related to the received quality may be at least one of an identifier of the base station 10, or a value related to received quality of a predetermined signal from the base station 10. At least one of the base stations 10 that have received the information related to the received quality may transmit an indication of connection with the said base station 10 to the RIS 30.

It is to be noted that the establishment of the connection with a base station 10 may mean an operation of the RIS 30 of reflecting a signal from the said base station and a signal to the said base station.

Which of the above-described operations 1) to 3) is to be performed may be specified in the technical specification, or may be configured from another network node to the RIS 30.

Therefore, operations described in 1) to 3) below related to the initial access via the RIS may be available. It is to be noted that operations described in 1) to 3) below may be combined to be performed.

1) The SSB index may be enhanced. The SSB index may be enhanced by assuming a case in which the RIS is installed, or is not installed, within a cell, and the information related to the SSB index may be indicated from the base station 10 to the RIS.

2) DL time synchronization between the base station 10 and the RIS may be performed. The RIS may perform time synchronization with the base station 10 in order to cause the transmission pattern, the reflection pattern, the beam switching timing, and the like, to match those of the base station 10.

3) UL time synchronization between the base station 10 and the RIS may be performed. By taking into account the transmission timing of the terminal 20, the RIS may perform synchronization related to the UL switching time in order to cause the beam switching timing of UL to be earlier than DL.

Figure 12:
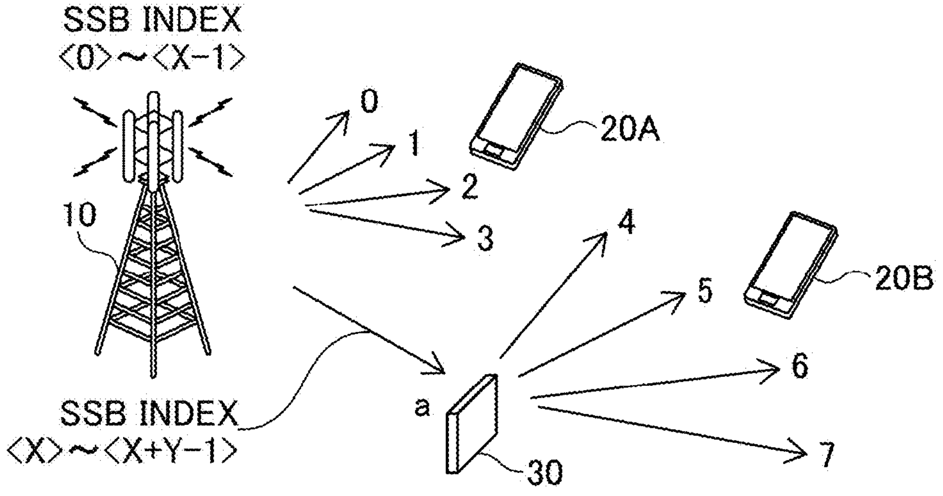
FIG. 12 is a drawing for describing an example of a signal via a wireless relay device in an embodiment of the present invention.

FIG. 12 is a drawing for describing an example of a signal via a wireless relay device in an embodiment of the present invention. As illustrated in FIG. 12, in addition to the SSBs with SSB indexes <0> to <X−1> to be transmitted in a case of the conventional cell or in a case where the RIS is not installed, the base station 10 may transmit SSBs for the RIS with SSB indexes <X> to <X+Y−1>. Y is the number of SSB indexes to be transmitted from the RIS. It is to be noted that the notation of SSB indexes <A> to <B> indicates a series of SSB indexes from SSB index A to SSB index B.

FIG. 12 is an example for X=4 and Y=4. For example, SSB indexes from 0 to 3 may be allocated for the conventional cell in which the terminal 20A performs transmission and reception, SSB indexes from 4 to 7 may be allocated for the RIS 30A with which the terminal 20B performs transmission and reception, and SSB indexes from 8 to 11 may be allocated for the RIS 30B with which the terminal 20C performs transmission and reception.

The RIS may be assumed to be installed in a free manner. There may be cases such as a case in which the RIS is installed, a case in which the RIS is not installed, and a case in which the installation location is changed after the installation of the RIS. For example, in a case where the RIS is not installed, SSB indexes 0 to X−1 are sufficient. However, in a case where the RIS is installed, there is a possibility that SSB indexes X to X+Y−1 will be required. It is to be noted that X is the number of SSB indexes allocated for SSBs that are directly transmitted from the base station 10 to the terminal 20, and Y is the number of SSB indexes allocated for SSBs that are transmitted from the RIS 30 to the terminal 20.

Figure 13:
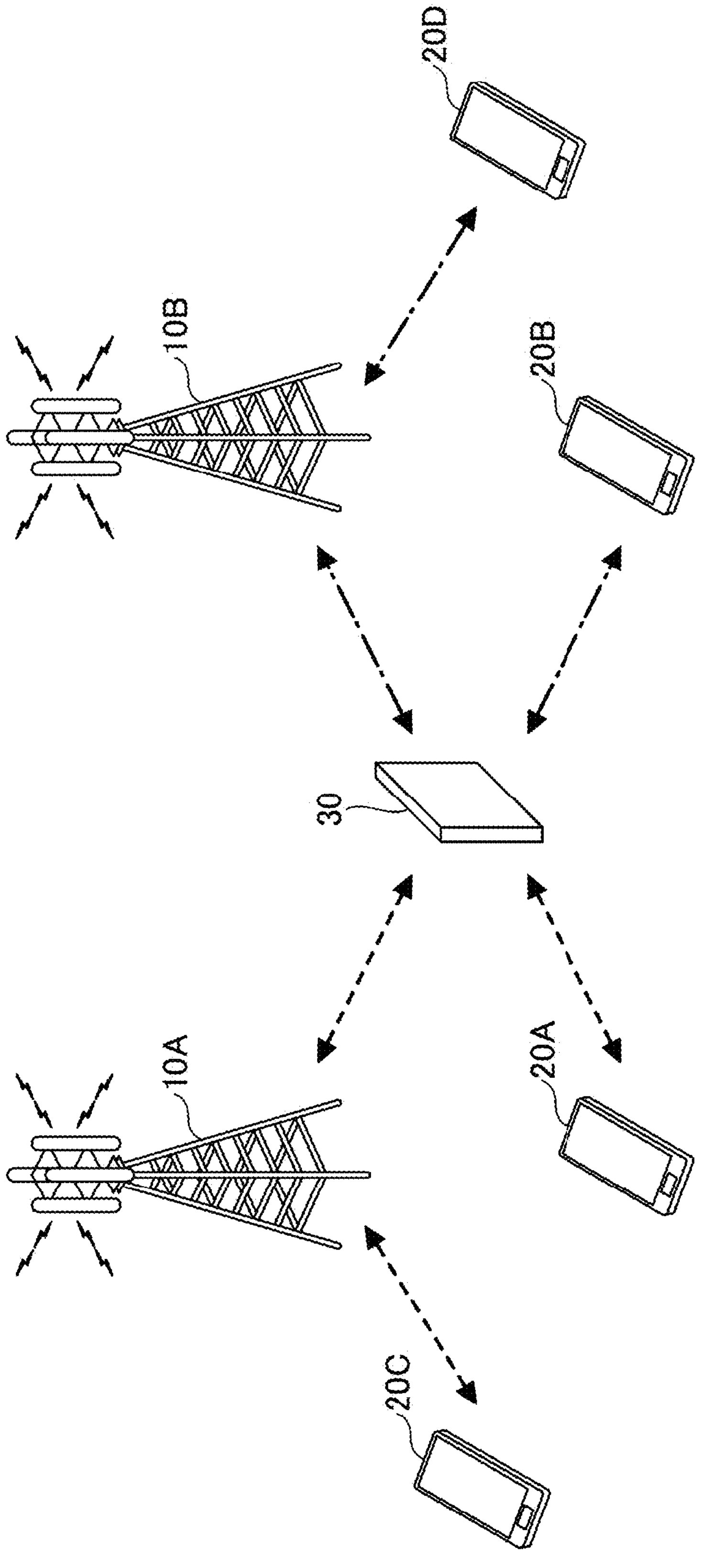
FIG. 13 is a drawing for describing an example of a communication via a wireless relay device in an embodiment of the present invention.

FIG. 13 is a drawing for describing an example of a communication via a wireless relay device in an embodiment of the present invention. When the RIS 30 operates in an environment illustrated in FIG. 13, the RIS 30 is not required to assume that SSBs of a plurality of base stations 10 are to be simultaneously reflected or radiated. For example, in a case where an SSB is transmitted from the base station 10A to the RIS 30 and is relayed to the terminal 20A, an SSB is not required to be transmitted simultaneously from the base station 10B to the RIS 30. In addition, for example, in a case where an SSB is transmitted from the base station 10B to the RIS 30 and is relayed to the terminal 20B, an SSB is not required to be transmitted simultaneously from the base station 10A to the RIS 30.

The base station 10 may configure the SSB indexes as described in an option 1) to an option 3) below.

Option 1) SSB indexes <0> to <X−1> and SSB indexes allocated to the RIS 30, for example, <X> to <X+Y−1> may be always configured.

For example, in a case where there is a connection for control between the RIS 30 and the base station 10, the base station 10 may start SSB beam transmission corresponding to SSB indexes <X> to <X+Y−1> at the time of establishment of a connection with the RIS 30 (for example, completion of a random access procedure, RRC connection establishment, or the like).

When connecting to the base station 10, the RIS 30 may report at least one of the transmission pattern, reflection pattern, or the number of beams of the RIS 30 itself to the base station 10 as a capability. The base station 10 may allocate the SSBs, based on the number of reports of the RIS 30. For example, the base station 10 may additionally allocate the SSBs corresponding to the number of reports of the RIS 30. The base station 10 may explicitly indicate the number of SSBs to be allocated and/or the SSB indexes to the RIS 30, or the number of SSBs to be allocated and/or the SSB indexes may be implicitly indicated to the RIS 30 according to the decoding of SSBs with SSB indexes <X> to <X+Y−1>.

The transmission pattern, the reflection pattern, and/or the maximum number of beams (for example, 4, 8, or the like), that is, the maximum number of SSBs, of the RIS 30 may be specified by the technical specification, may be configured, or may be pre-configured. The base station 10 may allocate the SSB indexes, the number of which is equal to or less than the maximum value, to a single RIS 30.

Option 2) SSB indexes <0> to <X−1> may be always configured, and SSB indexes <x> to <X+Y−1> may be added based on presence or absence of the RIS 30. SSB indexes <0> to <X−1> are allocated to the base station 10, and SSB indexes <X> to <X+Y−1> may be added in accordance with presence or absence of the RIS 30. For example, a flag bit used for activating or deactivating SSB indexes <X> to <X+Y−1> may be included in PBCH, or the like. In a case where the flag bit indicates deactivation, the terminal 20 may determine the SSB indexes are <0> to <X−1>, and in a case where the flag bit indicates activation, the terminal 20 may determine that an a will be added to the SSB indexes <0> to <X−1>. The a may be defined by the technical specification, or may be separately indicated. For example, the a may be SSB indexes <X> to <X+Y−1>.

Option 3) SSB indexes <0> to <X−1> and SSB indexes <X> to <X+Y−1> may be always configured. In a case where the RIS 30 is capable of transmitting wide beams and narrow beams at the same time, the RIS 30 may reflect or re-radiate an SSB corresponding to an SSB index (for example, X) using a wide beam. For example, the RIS 30 may decode PBCH and SIB to obtain the transmission period and the timing of the SSB.

In addition, a plurality of CSI-RSs may be allocated to the RIS 30, and the RIS 30 may perform reflection or re-radiation by using a plurality of narrow beams. When connecting to the base station 10, the RIS 30 may report at least one of the transmission pattern, reflection pattern, or the number of beams of the RIS 30 itself to the base station 10 as a capability. The base station 10 may allocate the CSI-RSs, based on the report of the RIS 30. The base station 10 may indicate information related to the allocated CSI-RSs (for example, time resources and/or frequency resources) to the RIS 30. It is to be noted that directions of the plurality of narrow beams may be included in the direction of the above-described wide beam.

As another example, in a case where the RIS 30 is capable of transmitting only one of wide beams or narrow beams, the RIS 30 may reflect or re-radiate an SSB corresponding to an SSB index (for example, X) using a plurality of narrow beams. Here, for example, in a case where the RIS 30 performs reflection or re-radiation by using four narrow beams, the SSB transmission period in a case of using the RIS 30 is quadrupled. It is to be noted that, in a case where the RIS 30 is capable of transmitting only one of wide beams or narrow beams, the RIS 30 may reflect or re-radiate an SSB corresponding to an SSB index (for example, X) using a single wide beam. It is to be noted that directions of the plurality of narrow beams may be included in the direction of the above-described wide beam.

In the above-described operations described in 1) to 3), in a case where the sum of the number of beams for the conventional cells and the number of beams for the RIS 30 exceeds the maximum number of the conventional SSB indexes (8 for FR1 and 64 for FR2), the SSB indexes may be enhanced.

For example, the SSB index may be enhanced by using one of the reserved bits of MIB of PBCH. In addition, in a case of an operation described in the above-described option 2), SSB indexes may enhanced by using a bit used for activating the SSB indexes for the RIS 30. For example, in a case where the bit indicating activation or deactivation is zero (0), the SSB indexes may be allocated to the conventional cells and the terminal 20 may search the SSB indexes for the conventional cells, and, in a case where the bit indicating activation or deactivation is one (1), the enhanced SSB indexes may be allocated to the RIS and the terminal 20 may search for the SSB indexes for which the RIS performs reflection or re-radiation in addition to the SSB indexes for the conventional cells.

The DL time synchronization between the base station 10 and the RIS 30 may be performed as described below.

In order to match the transmission pattern, the reflection pattern, and/or the beam switching timing with the base station 10, the RIS 30 may perform time synchronization by using an external source or may perform time synchronization by using SSBs. The external source may be, for example, GNSS (Global Navigation Satellite System) or may be PTP (Precision Time Protocol). In a case of performing the time synchronization by using SSBs, the propagation delay difference between the base station 10 and the RIS may be allowed. In addition, in a case of performing the time synchronization by using SSBs, information related to the timing such as TA (Timing Advance) may be indicated to the RIS 30 and the RIS 30 may adjust the propagation delay based on the information, or the RIS 30 may estimate the propagation delay based on, for example, the positional information of the base station 10 and the RIS 30.

In addition, the RIS 30 may perform DL time synchronization with each base station 10 to be connected. The RIS 30 may use the timing of each base station 10 when reflecting or radiating the DL signal from each base station 10.

In addition, the RIS 30 may perform DL time synchronization with one of the base stations 10 to be connected. The said base station 10 may be defined by the technical specification, or may be indicated to the RIS 30 from the network node. The RIS 30 may use the timing of one base station 10 with which time synchronization has been performed when reflecting or radiating the DL signal from each base station 10.

The UL time synchronization between the base station 10 and the RIS 30 may be performed as described below.

The RIS 30 is required to perform DL time synchronization with the base station 10, and, at the same time, the RIS 30 is required to cause the UL beam switching timing to be earlier than the DL beam switching timing by taking into account the transmission timing of the terminal 20.

For example, in a case where the positions and the propagation paths of the base station 10 and the RIS 30 are always the same and the timings are always the same, the RIS 30 may recognize the TDD pattern and cause the beam switching time to be earlier with respect to the UL slot. For example, the beam switching timing may be caused to be earlier at the timing of a flexible symbol of a special slot. The said TDD pattern may be indicated by the base station 10, may be pre-configured, or may be specified by the technical specification. For example, the switching timing of UL pattern and/or beams may be a timing in accordance with the propagation delay according to the RIS 30, may be a timing in accordance with the TA that is configured from the base station 10 to the RIS 30, or information related to the timing may be indicated by the base station 10 or the terminal 20. For example, information related to a different timing may be indicated to a different RIS 30. By indicating information related to a different timing to a different RIS 30, in a case of a plurality of RISs, the propagation delay between the base station and RIS is different for each RIS 30, and thus, the UL/DL collision can be more accurately avoided by applying different timings.

For example, in a case where fluctuations occur with respect to the positions and propagation paths of the base station 10 and the RIS 30, and thus, the timings are changed, the timings may be changed in accordance with the fluctuations of the propagation path between the base station 10 and the RIS 30. For example, the switching timing of UL pattern and/or beams may be a timing that is dynamically switched in accordance with TA that is configured from the base station 10 to the RIS 30, or information related to the timing may be indicated to the RIS 30 from the base station 10 or the terminal 20.

In addition, the RIS 30 may perform UL time synchronization with each base station 10 to be connected. The RIS 30 may use the timing of each base station 10 when reflecting or radiating the UL signal from each base station 10.

In addition, the RIS 30 may perform UL time synchronization with one of the base stations 10 to be connected. The said base station 10 may be defined by the technical specification, or may be indicated to the RIS 30 from the network node. The RIS 30 may use the timing of a base station 10 with which UL time synchronization is performed when reflecting or radiating the UL signal from each base station 10.

According to an embodiment of the present invention, the base station 10 and the terminal 20 can improve reliability of initial access using the RIS or smart repeater.

In other words, the initial access using the wireless relay device can be improved in the wireless communication system.

Hereinafter, an example will be described in which information related to beams transmitted by the wireless relay device 30 is specified for each resource.

Figure 14:
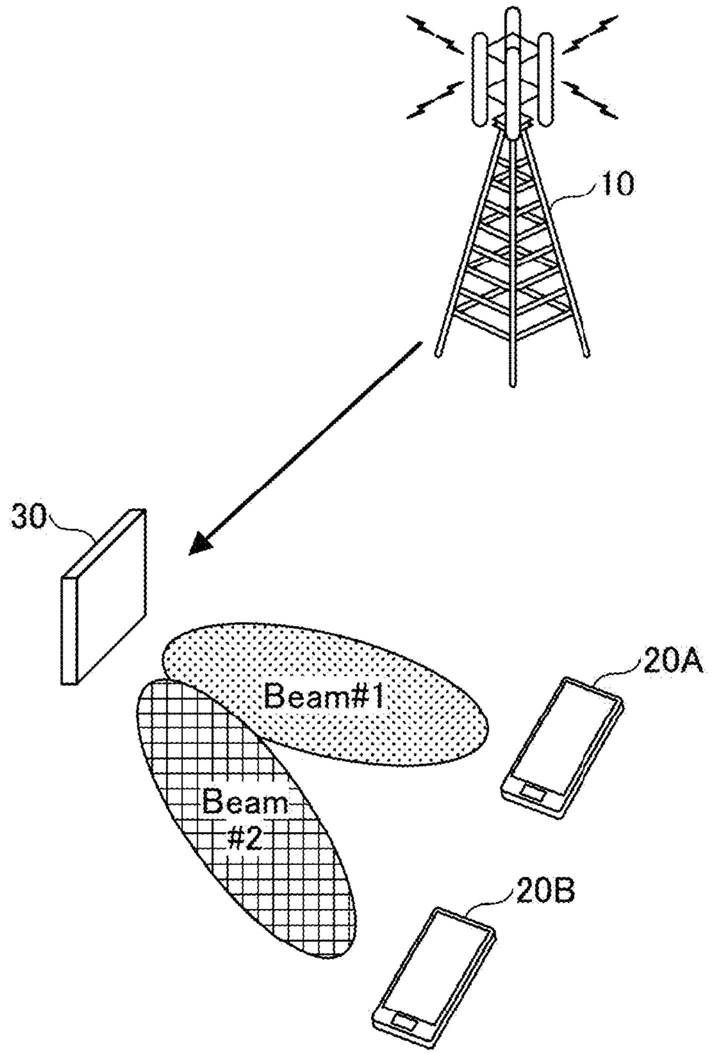
FIG. 14 is a drawing illustrating an example of indicating control information to a wireless relay device in an embodiment of the present invention.

FIG. 14 is a drawing illustrating an example of indicating control information to a wireless relay device in an embodiment of the present invention. As illustrated in FIG. 14, the wireless relay device 30 may receive information related to beams from the base station 10 and may determine beams to be used when transmitting signals to the terminal 20A and the terminal 20B based on the information. In FIG. 14, the base station 10 may indicate to the wireless relay device 30 that the beam #1 and the beam #2 are to be used.

It is to be noted that the wireless relay device 30 may receive information related to beam selections described in at least one of the following options in any one of the embodiments below.

<Option 1>

The wireless relay device 30 may receive information indicating an uplink RS of a specific terminal 20 having a spatial relation.

<Option 2>

The wireless relay device 30 may receive information related to a direction of a beam to be applied.

<Option 3>

The wireless relay device 30 may receive information related to a beam index to be applied.

<Option 4>

The wireless relay device 30 may receive information related to a terminal 20 for which a beam is directed.

In addition, the RIS 30 may receive information related to beams from each base station 10 to be connected and determine a beam to be applied at the time of signal transmission, based on the information. For example, when reflecting or radiating the DL signal to each base station 10, the beam indicated by each base station 10 may be applied.

In addition, the RIS 30 may receive information related to beams from one of the base stations 10 to be connected and may determine a beam to be applied at the time of signal transmission, based on the information. For example, when reflecting or radiating the DL signal to each base station 10, the beam indicated by the said one base station 10 may be applied.

Hereinafter, an example will be described in which the wireless relay device 30 assumes that a beam applied to a resource for which the scheduling is configured is to be indicated.

The wireless relay device 30 may receive information related to resources of a periodical signal and a beam for each of the resources from the base station 10 and may apply a beam for each of the resources, based on the received information.

The resources of a periodical signal may be, for example, SSB, Periodic CSI-RS, Periodic SRS, PDCCH, Periodic PUCCH, PUSCH with type 1 configured grant, or the like.

The minimum time gap and the minimum frequency gap in which different beams can be applied may be determined in accordance with a predetermined rule or a capability of the wireless relay device 30.

For example, the rule may be a rule that the frequency gap that is equal to or greater than X RBs or X REs must be present between different beams. In addition, the rule may be a rule that the time gap that is equal to or greater than Y symbols, Y slots, or Y ms must be present between different beams.

The wireless relay device 30 may assume that control information does not include an indication of different beams within the minimum time gap or the minimum frequency gap.

Figure 15:
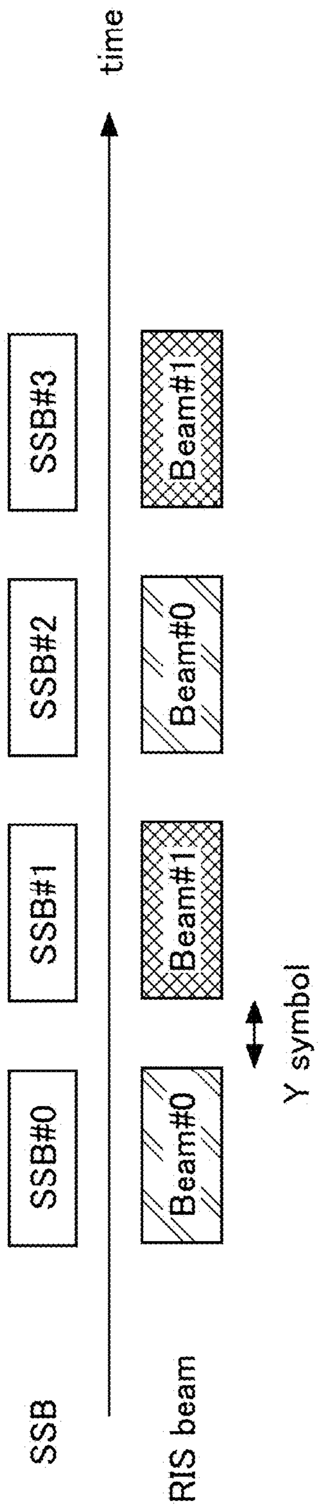
FIG. 15 is a drawing for describing a beam for each resource in an embodiment of the present invention.

FIG. 15 is a drawing for describing a beam for each resource in an embodiment of the present invention. As illustrated in FIG. 15, SSB #0 and SSB #2 are associated with Beam #0, and SSB #1 and SSB #3 are associated with Beam #1. In addition, the time gap that is equal to or greater than Y symbols must be present between different beams Beam #0 and Beam #1.

The beam information for each resource may be different or may be the same for each wireless relay device 30. In a case where the beam information for each resource is the same, the beam information for each resource may be configured by the same upper layer parameter, or the beam information for each resource may be configured by a different parameter.

According to the above-described operation, in a case where the best beam is different for each resource of the RIS with respect to a plurality of RISs, the reliability can be improved by configuring different beam information for each RIS.

The wireless relay device 30 may determine the priority of the beam to be applied according to the following options or a combination thereof in a case where the distance between resources associated with applied different beams is equal to or less than (or is less than) the minimum time/frequency gap.

<Option A>

The wireless relay device 30 may determine the priority in accordance with the type of the resource channel. For example, the wireless relay device 30 may determine the priority in accordance with the order of SSB, Periodic CSI-RS, Periodic PUCCH, PUSCH with type1 configured grant, PDCCH, and Periodic SRS.

Figure 16:
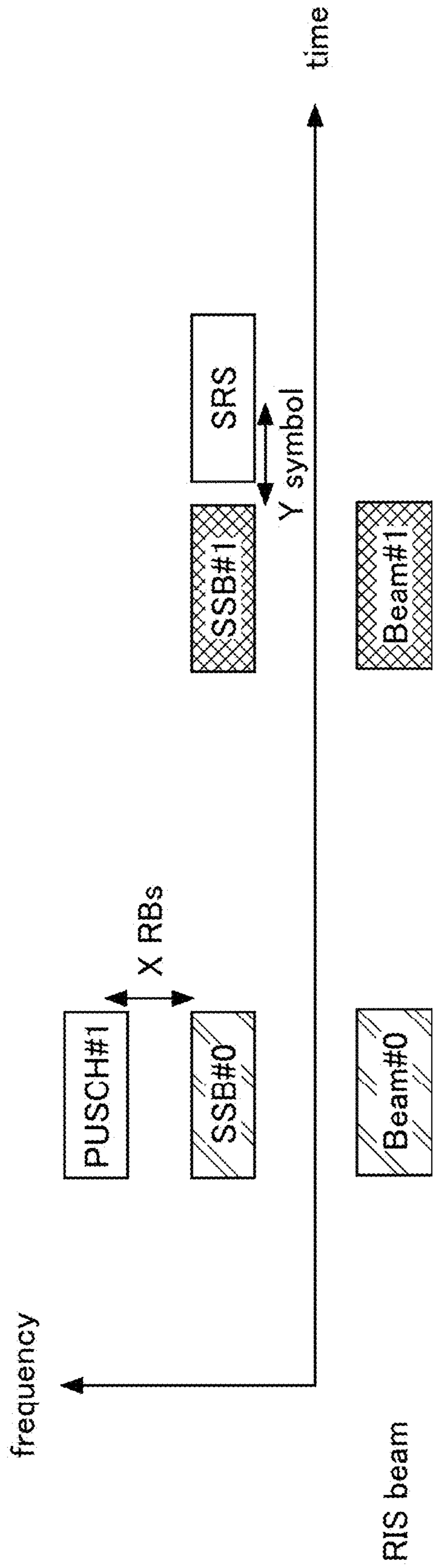
FIG. 16 is a drawing for describing a beam for each resource in an embodiment of the present invention.

FIG. 16 is a drawing for describing a beam for each resource in an embodiment of the present invention. As illustrated in FIG. 16, there is a frequency gap that is less than X RBs between SSB #0 and PUSCH #1, and thus, different beams cannot be applied. Accordingly, the wireless relay device 30 determines to prioritize SSB #0 according to the priority and applies the beam corresponding to SSB #0.

In addition, there is a time gap that is less than Y symbols between SSB #1 and SRS, and thus, different beams cannot be applied. Accordingly, the wireless relay device 30 determines to prioritize SSB #1 according to the priority and applies the beam corresponding to SSB #1.

<Option B>

The wireless relay device 30 may determine the priority based on the index of each resource. For example, the wireless relay device 30 may determine the priority by prioritizing the lower value of "configuration index" or "SSB index" of each resource.

<Option C>

The wireless relay device 30 may determine the priority based on the priority of each resource. For example, the wireless relay device 30 may determine the priority based on the "priority index" of a channel that is allocated to each resource.

In a case where the distance between resources associated with applied different beams is equal to or less than (or is less than) the minimum time/frequency gap, the wireless relay device 30 may determine whether or not a beam for a resource with lower priority is to be applied, in accordance with the capability of the wireless relay device 30. For example, the wireless relay device 30 may determine whether or not a beam for a resource with lower priority is to be applied, according to one of the following options.

<Option 1>

The wireless relay device 30 may apply a beam that is associated with a resource with a low priority that is located outside the minimum time gap or frequency gap of a resource with a high priority.

Figure 17:
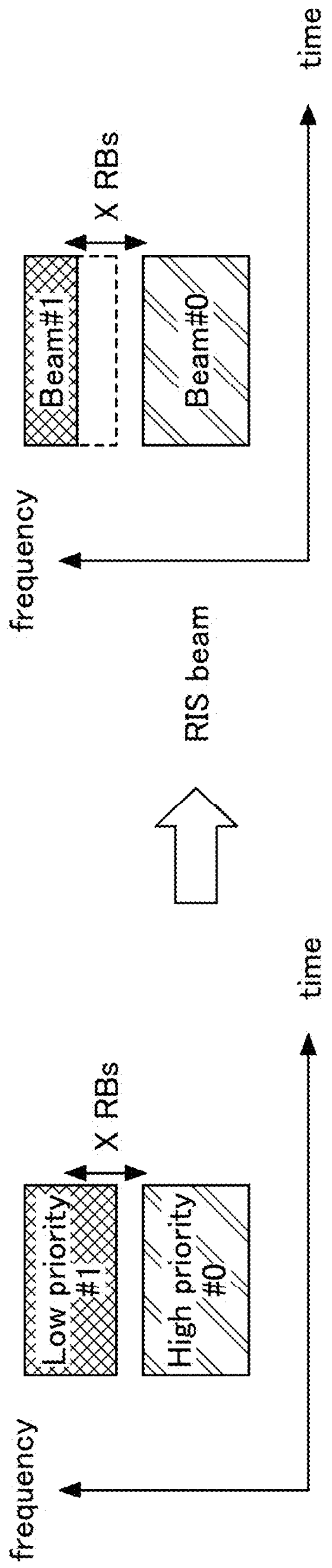
FIG. 17 is a drawing illustrating an example in which a beam for a resource with low priority is applied in an embodiment of the present invention.

FIG. 17 is a drawing illustrating an example in which a beam for a resource with low priority is applied in an embodiment of the present invention. As illustrated in FIG. 17, in a case where different beams cannot be applied because the frequency gap between the resource of #0 with a high priority and the resource of #1 with a low priority is less than X RBs, the wireless relay device 30 may apply Beam #0 corresponding to the resource of #0 with a high priority, and may apply Beam #1 corresponding to the resource of #1 with a low priority only to a range of a frequency gap that is equal to or greater than X RBs. It is to be noted that “apply” may mean to relay or reflect a signal.

<Option 2>

The wireless relay device 30 is not required to apply a beam that is associated with a resource with a low priority that overlaps with the minimum time gap or frequency gap of a resource with a high priority.

Specifically, in a case where the wireless relay device 30 does not apply a beam that is associated with a resource with a low priority, a signal of a resource with a low priority is not required to be relayed (or reflected), or the wireless relay device 30 may apply a beam that is associated with a resource with a high priority and may relay (or reflect) a signal of a resource with a low priority.

Figure 18:
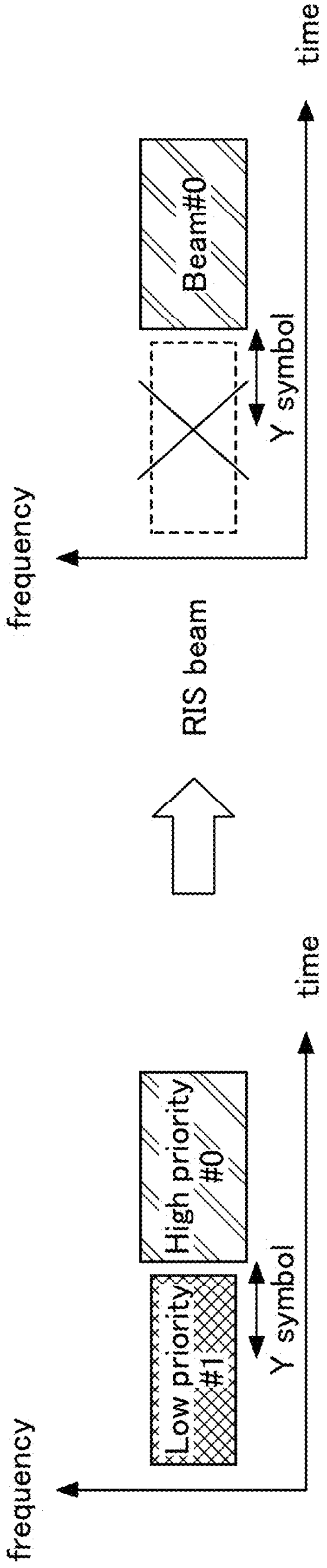
FIG. 18 is a drawing illustrating an example in which a beam for a resource with low priority is not applied in an embodiment of the present invention.

FIG. 18 is a drawing illustrating an example in which a beam for a resource with low priority is not applied in an embodiment of the present invention. As illustrated in FIG. 18, in a case where different beams cannot be applied because the time gap between the resource of #0 with a high priority and the resource of #1 with a low priority is less than Y symbols, the wireless relay device 30 may apply Beam #0 corresponding to the resource of #0 with a high priority and is not required to apply a beam corresponding to the resource of #1 with a low priority.

The wireless relay device 30 may receive semi-persistent resources and information related to a beam for each of the resources from the base station 10 and may apply a beam for each of the resources based on the received information.

The semi-persistent resources may be, for example, CSI-RS, SPS (Semi-Persistent Scheduling) SRS, PUSCH with type2 configured grant, SPS PDSCH, or the like.

The wireless relay device 30 may receive a signal indicating activation of the semi-persistent resource allocation, and may apply a beam for each resource. For example, the wireless relay device 30 may determine the activation of the semi-persistent resources based on the received DCI or MAC-CE, and may apply a beam for each resource.

The beam information for each resource may be different or may be the same for each wireless relay device 30. In a case where the beam information for each resource is the same, the beam information for each resource may be configured by the same upper layer parameter, or the beam information for each resource may be configured by a different parameter.

Figure 19:
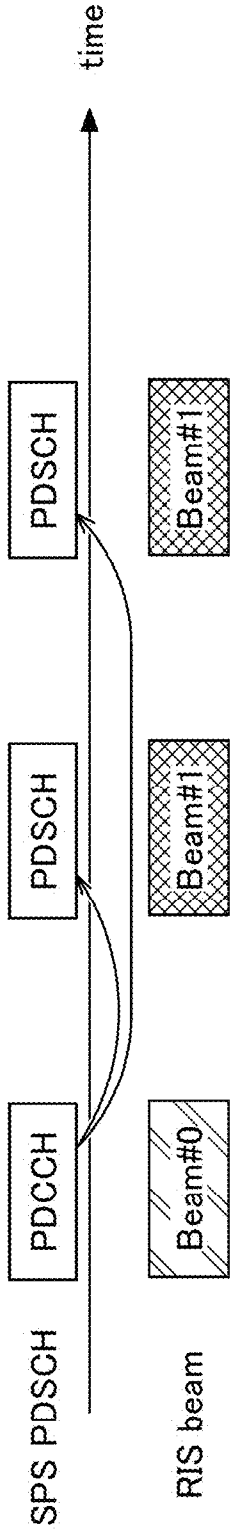
FIG. 19 is a drawing for describing a beam that is applied to semi-persistent resources in an embodiment of the present invention.

FIG. 19 is a drawing for describing a beam that is applied to semi-persistent resources in an embodiment of the present invention. As illustrated in FIG. 19, the wireless relay device 30 may receive PDCCH indicating an activation of the semi-persistent resource allocation, and may apply Beam #1 to each resource of PCSCH that is a semi-persistent resource.

The beam information for each resource may be different or may be the same for each wireless relay device 30. In a case where beam information is different for each resource, the beam information for each resource may be configured based on the different DCI or MAC-CE. In a case where beam information for each resource is the same, the beam information for each resource may be configured based on the same DCI or MAC-CE.

The wireless relay device 30 may determine the activation of the semi-persistent resources based on a signal that is transmitted according to the following options and may apply a beam for each resource.

<Option 1>

The wireless relay device 30 may determine the activation of the semi-persistent resources based on a signal that is transmitted to the wireless relay device 30 (for example, DCI or MAC-CE).

For example, the wireless relay device 30 may determine whether a signal (DCI or MAC-CE on PUSCH) is addressed to the wireless relay device 30 itself according to RNTI used for scrambling CRC (Cyclic Redundancy Check).

Specifically, the wireless relay device 30 may determine whether a signal is addressed to the wireless relay device 30 itself based on an RNTI for identifying a single wireless relay device 30 (for example, CS-RNTI).

In addition, the wireless relay device 30 may determine whether a signal is addressed to the wireless relay device 30 itself based on an RNTI for identifying a plurality of wireless relay devices 30. Here, the wireless relay device 30 may determine which of the fields included in DCI is to be addressed to the wireless relay device 30 itself based on the configuration in the upper layer.

In addition, the wireless relay device 30 may determine that a field included in DCI is addressed to the wireless relay device 30 itself according to one of the following options.

<Option 1-A>

The wireless relay device 30 may determine that a field included in DCI that is scrambled by an RNTI corresponding to a group that is configured by an upper layer is addressed to the wireless relay device 30 itself.

<Option 1-B>

The wireless relay device 30 may determine that a field included in DCI that is scrambled by an RNTI corresponding to each DCI format that is configured by an upper layer is addressed to the wireless relay device 30 itself.

<Option 2>

The wireless relay device 30 may determine the activation of the semi-persistent resources based on a signal that is transmitted to a specific terminal 20 (for example, DCI or MAC-CE).

The wireless relay device 30 may store information indicating an RNTI that is allocated to a specific terminal 20, and may determine whether a signal is addressed to the said terminal 20 (DCI or MAC-CE on PUSCH).

Each wireless relay device 30 may report the maximum number of RNTIs that can be stored to the base station 10. In addition, each wireless relay device 30 may report the maximum number of PDCCH candidates that can be monitored during each specific section and the maximum number of non-overlapped CCEs to the base station 10.

Hereinafter, an example will be described in which the wireless relay device 30 assumes that a beam, which is to be applied to a dynamically scheduled resource, is to be indicated.

The wireless relay device 30 may receive dynamically allocated resources and information related to a beam for each of the resources from the base station 10, and may apply a beam for each of the resources based on the received information.

The dynamically allocated resources may be, for example, PDSCH/PUSCH scheduled by DCI or RAR, AP CSI-RS, AP SRS, or the like.

The beam information for each resource may be different or may be the same for each wireless relay device 30. In a case where the beam information for each resource is the same, the beam information for each resource may be configured by the same upper layer parameter, or the beam information for each resource may be configured by a different parameter.

The wireless relay device 30 may receive information related to dynamic resource allocation for terminals 20 and may apply a beam for each resource. For example, the wireless relay device 30 may recognize the dynamic resource allocation for a specific terminal 20 based on the received DCI, and may apply a beam for each resource.

<Option A>

Here, the wireless relay device 30 may recognize the dynamic resource allocation based on the DCI that is transmitted to the wireless relay device 30 by using a method that is the same as the above-described example in which a beam, which is to be applied to a resource for which the scheduling is configured, is to be indicated.

<Option B>

In addition, the wireless relay device 30 may recognize the dynamic resource allocation based on the DCI that is transmitted to a specific terminal 20 by using a method that is the same as the above-described example in which a beam, which is to be applied to a resource for which the scheduling is configured, is to be indicated.

Each wireless relay device 30 may report the maximum number of PDCCH candidates that can be monitored during a specific section and the maximum number of non-overlapped CCEs to the base station 10.

The wireless relay device 30 may determine the priority of the beam to be applied according to the following options or a combination thereof in a case where the distance between resources associated with applied different beams is equal to or less than (or is less than) the minimum time/frequency gap.

<Option 1>

The wireless relay device 30 may determine the priority in accordance with the type of the resource channel in a similar manner as the above-described option A.

<Option 2>

The wireless relay device 30 may determine the priority based on an index of each resource in a similar manner as the above-described option B.

<Option 3>

The wireless relay device 30 may determine the priority based on the priority of each resource in a similar manner as the above-described option C.

<Option 4>

The wireless relay device 30 may determine the priority based on whether the resource is a periodic resource or an aperiodic resource. For example, the wireless relay device 30 may determine a higher priority for an aperiodic resource compared with a periodic resource.

Figure 20:
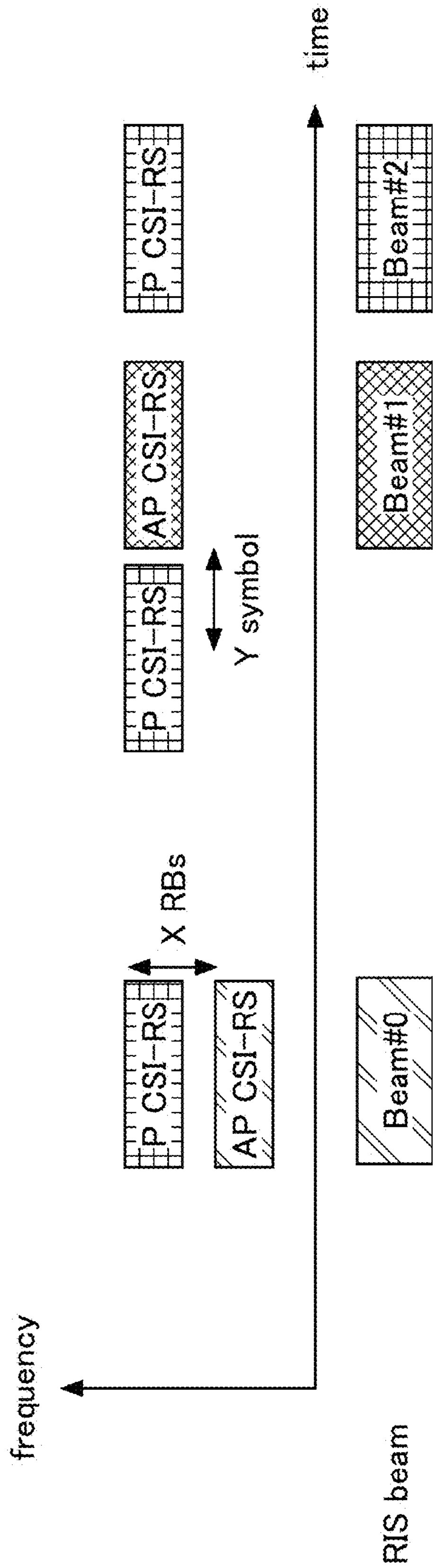
FIG. 20 is a drawing for describing a priority determination method in an embodiment of the present invention.

FIG. 20 is a drawing for describing a priority determination method in an embodiment of the present invention. Regarding the "AP CSI-RS" and "P CSI-RS" illustrated in FIG. 20, the frequency gap is less than X RBs or the time gap is less than Y symbols, and thus, different beams cannot be applied. Therefore, the wireless relay device 30 determines that the aperiodic resource "AP CSI-RS" is to be prioritized and applies a beam corresponding to the "AP CSI-RS".

The wireless relay device 30 may apply, or is not required to apply, a beam that is associated with a resource having a low priority outside the minimum time/frequency gap.

Hereinafter, an example will be described in which the beam to be applied is determined by the wireless relay device 30 based on the scheduling information.

The wireless relay device 30 may determine the beam based on the RS index that is referred to by the terminal 20 for each resource.

Specifically, the wireless relay device 30 may assume that the mapping between the referenced RS index and the beam to be applied by the wireless relay device 30 is configured by RRC, or the like.

In addition, the wireless relay device 30 may determine the referenced RS index according to one of the following options or a combination thereof.

<Option 1>

The wireless relay device 30 may determine the beam based on the RS index used for the spatial relation at the time of transmission by the terminal 20.

Figure 21:
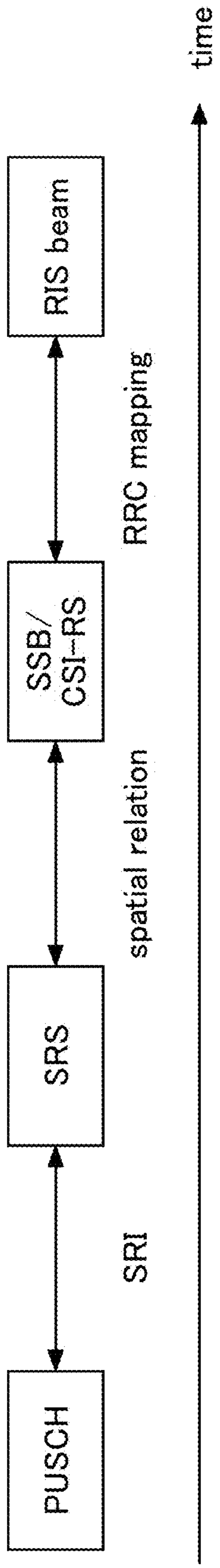
FIG. 21 is a drawing for describing a beam determination method in an embodiment of the present invention.

FIG. 21 is a drawing for describing a beam determination method in an embodiment of the present invention. As illustrated in FIG. 21, the wireless relay device 30 refers to an index of SSB/CSI-RS that is an RS having a spatial relation with an SRS (Sounding reference signal) transmitted by the terminal 20, and determines the beam.

<Option 2>

The wireless relay device 30 may determine the beam based on the RS index that has a QCL relation with a signal receiving channel of the terminal 20.

<Option 3>

The wireless relay device 30 may determine the beam based on the index of an RS transmitted using the same antenna port as the transmission signal of the terminal 20.

<Option 4>

The wireless relay device 30 may determine the beam based on an index of an RS transmitted using each resource.

According to the above-described embodiment, the appropriate beam control can be achieved by the wireless relay device based on the information related to the beam to be transmitted.

Hereinafter, an operation will be described in which the terminal 20 performs measurement of and reporting of the channel state information of a signal transmitted via the wireless relay device 30 such as an RIS or a smart repeater.

The RIS 30 may receive a configuration related to measurement and reporting of the channel state information from each base station 10 to be connected. In addition, the RIS 30 may receive the configuration related to measurement and reporting of the channel state information from one of the base stations 10 to be connected.

In addition, the RIS 30, the terminal 20, and the base station 10 may operate as described in an option 1) or an option 2) below.

Option 1) The conventional CSI measurement and reporting may be applied. The RIS 30 transmits a reference signal for measurement of the channel state (for example, CSI-RS) received from the base station 10 to the terminal 20, and transmits the report of the channel state information (for example, CSI report) received from the terminal 20 to the base station 10.

Figure 22:
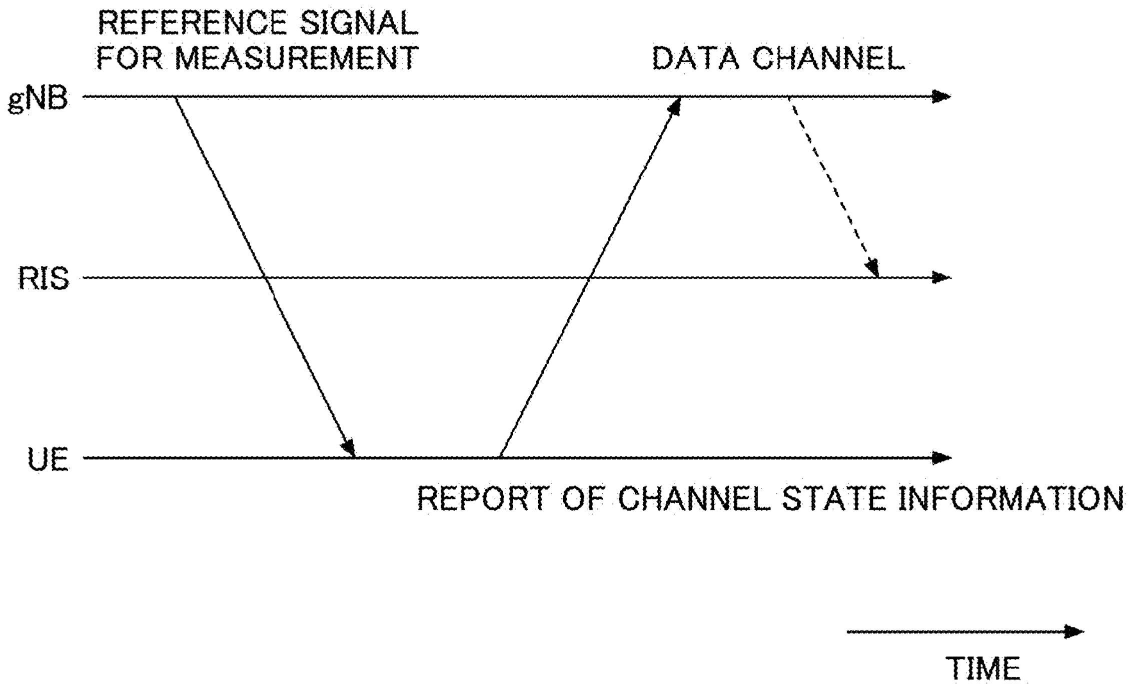
FIG. 22 is a drawing illustrating an example (1) of measurement and reporting in an embodiment of the present invention.

FIG. 22 is a drawing illustrating an example (1) of measurement and reporting in an embodiment of the present invention. FIG. 22 illustrates an operational example of the above-described option 1). As illustrated in FIG. 22, the gNB 10 that is a base station 10 transmits a reference signal for measurement to the UE 20 that is a terminal 20. The UE 20 transmits a report of the channel state information based on the measurement result of the received reference signal for measurement to the gNB 10. In FIG. 22, the RIS 30 performs only an operation of relaying a signal.

Option 2) Measurement and reporting may be separately performed between the RIS 30 and the base station 10 and between the RIS 30 and the terminal 20.

Option 2-1) Measurement and reporting may be performed between the RIS 30 and the base station 10 and between the RIS 30 and the terminal 20.

As an operation of measurement, the RIS 30 may receive CSI-RS transmitted from the base station 10, and the terminal 20 may receive CSI-RS transmitted from the RIS 30.

As an operation of reporting, the following Alt.1) and Alt.2) may be performed.

Alt. 1) The RIS 30 may separately transmit the CSI reports between the RIS 30 and the base station 10 and between the RIS 30 and the terminal 20 to the base station 10. The RIS 30 may transmit the CSI report corresponding to the CSI-RS received from the base station 10 and/or the CSI report received from the terminal 20 to the base station 10 by using separate resources that are configured and/or indicated. The terminal 20 may report the CSI report corresponding to CSI-RS received from the RIS 30 to the RIS 30 by using a separate resource that is configured and/or indicated.

Figure 23:
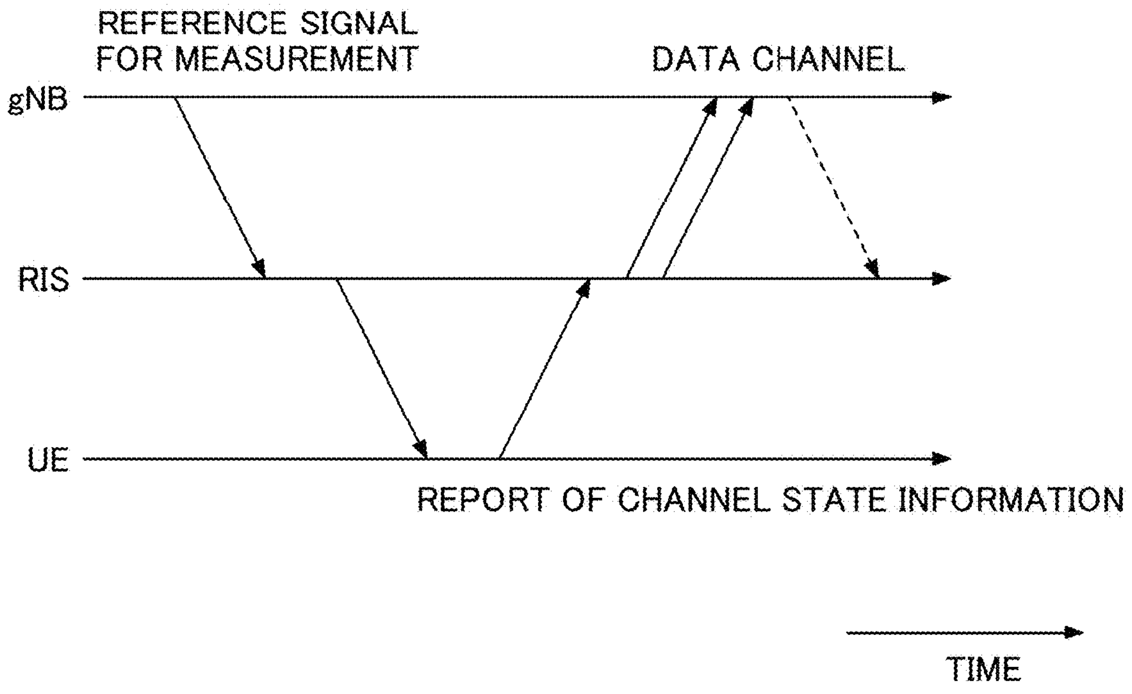
FIG. 23 is a drawing illustrating an example (2) of measurement and reporting in an embodiment of the present invention.

FIG. 23 is a drawing illustrating an example (2) of measurement and reporting in an embodiment of the present invention. FIG. 23 illustrates an operational example of Alt. 1) of an option 2-1). As illustrated in FIG. 23, the gNB 10 transmits a reference signal for measurement to the RIS 30. The RIS 30 transmits the reference signal for measurement to the UE 20. The UE 20 transmits a report of the channel state information based on the measurement result of the received reference signal for measurement to the RIS 30. The RIS 30 transmits the report of the channel state information received from the UE 20 to the gNB 10, and, separately, transmits the report of the channel state information based on the measurement result of the received reference signal for measurement to the gNB 10.

Alt.2) The RIS 30 may transmit together the CSI reports between the RIS 30 and the base station 10 and between the RIS 30 and the terminal 20 to the base station 10. The RIS 30 may multiplex the CSI report corresponding to CSI-RS received from the base station 10 with the CSI report received from the terminal 20, and may transmit the multiplexed result to the base station 10 by using a single resource that is configured and/or indicated. The processing time required for the multiplexing process by the RIS 30 may be defined. The processing time may be defined as a processing time of the UE 20. For example, it may be defined that the CSI report can be transmitted to the base station 10 at the time of or after the time of N symbols from the last symbol of the CSI report received from the terminal 20. N symbols may be determined based on the capability of the RIS 30 (may be replaced with UE capability), or may be determined based on the RRC configuration. The terminal 20 may report the CSI report corresponding to CSI-RS received from the RIS 30 to the RIS 30 by using a separate resource that is configured and/or indicated.

Figure 24:
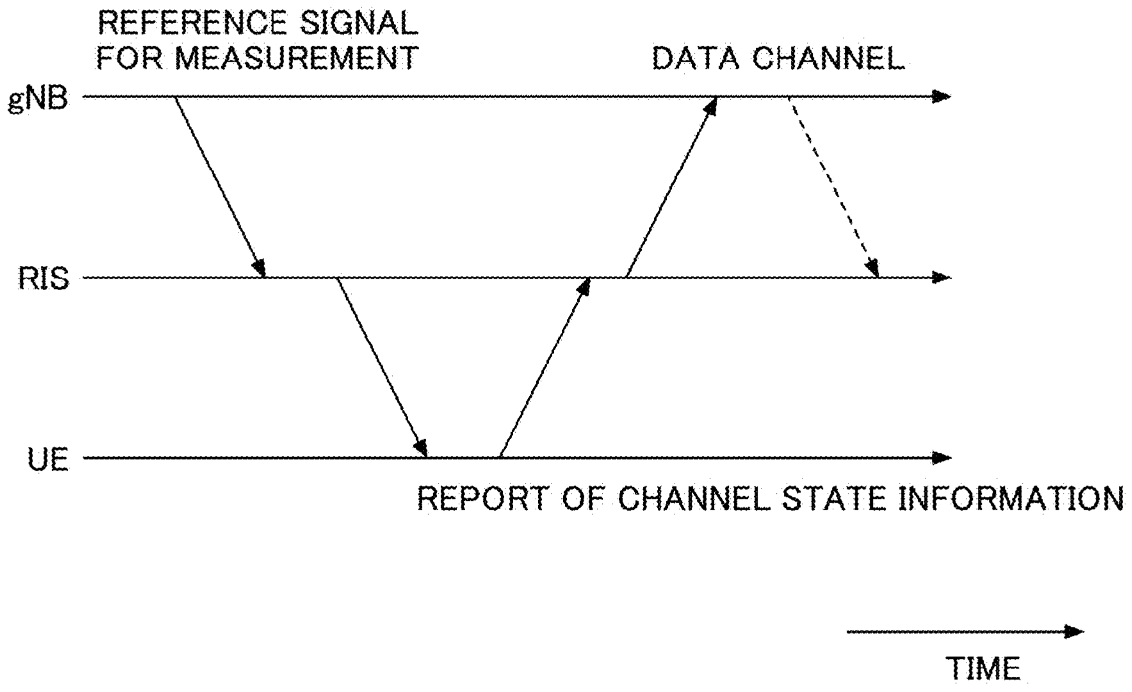
FIG. 24 is a drawing illustrating an example (3) of measurement and reporting in an embodiment of the present invention.

FIG. 24 is a drawing illustrating an example (3) of measurement and reporting in an embodiment of the present invention. FIG. 24 illustrates an operational example of Alt.2) of an option 2-1). As illustrated in FIG. 24, the gNB 10 transmits a reference signal for measurement to the RIS 30. The RIS 30 transmits the reference signal for measurement to the UE 20. The UE 20 transmits a report of the channel state information based on the measurement result of the received reference signal for measurement to the RIS 30. The RIS 30 multiplexes the report of the channel state information received from the UE 20 with the report of the channel state information based on the measurement result of the received reference signal for measurement, and transmits the multiplexed result to the gNB 10.

Option 2-2) Measurement and reporting may be performed between the RIS 30 and the base station 10 and between the base station 10 and the terminal 20.

As an operation of measurement, the RIS 30 may receive CSI-RS transmitted from the base station 10. The terminal 20 may receive CSI-RS transmitted from the base station 10 and the received CSI-RS may be relayed to the RIS 30.

As an operation of reporting, the following Alt. 1) and Alt.2) may be performed.

Alt. 1) The RIS 30 may separately transmit the CSI reports between the RIS 30 and the base station 10 and between the RIS 30 and the terminal 20 to the base station 10. The RIS 30 may transmit the CSI report corresponding to CSI-RS received from the base station 10 to the base station 10 by using a resource that is configured and/or indicated. The terminal 20 may report the CSI report corresponding to CSI-RS received from the base station 10 to the base station 10 by using a resource that is configured and/or indicated.

Figure 25:
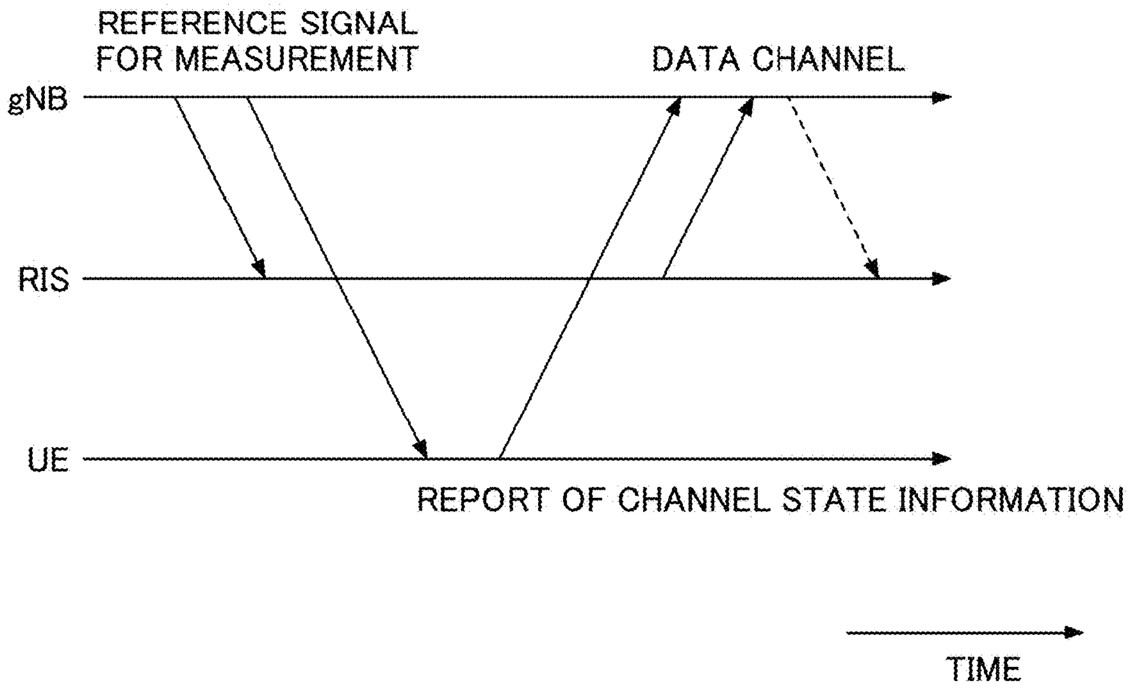
FIG. 25 is a drawing illustrating an example (4) of measurement and reporting in an embodiment of the present invention.

FIG. 25 is a drawing illustrating an example (4) of measurement and reporting in an embodiment of the present invention. FIG. 25 illustrates an operational example of Alt. 1) of an option 2-2). As illustrated in FIG. 25, the gNB 10 transmits a reference signal for measurement to the RIS 30. The gNB 10 transmits a reference signal for measurement to the UE 20. The UE 20 transmits a report of the channel state information based on the measurement result of the received reference signal for measurement to the gNB 10. The RIS 30 transmits a report of the channel state information based on the measurement result of the received reference signal for measurement to the gNB 10.

Alt.2) The RIS 30 may transmit together the CSI reports between the RIS 30 and the base station 10 and between the RIS 30 and the terminal 20 to the base station 10. The RIS 30 may multiplex the CSI report corresponding to CSI-RS received from the base station 10 with the CSI report received from the terminal 20, and may transmit the multiplexed result to the base station 10 by using a single resource that is configured and/or indicated. The terminal 20 may report a CSI report corresponding to CSI-RS received from the gNB 10 to the RIS 30 by using a separate resource that is configured and/or indicated.

Figure 26:
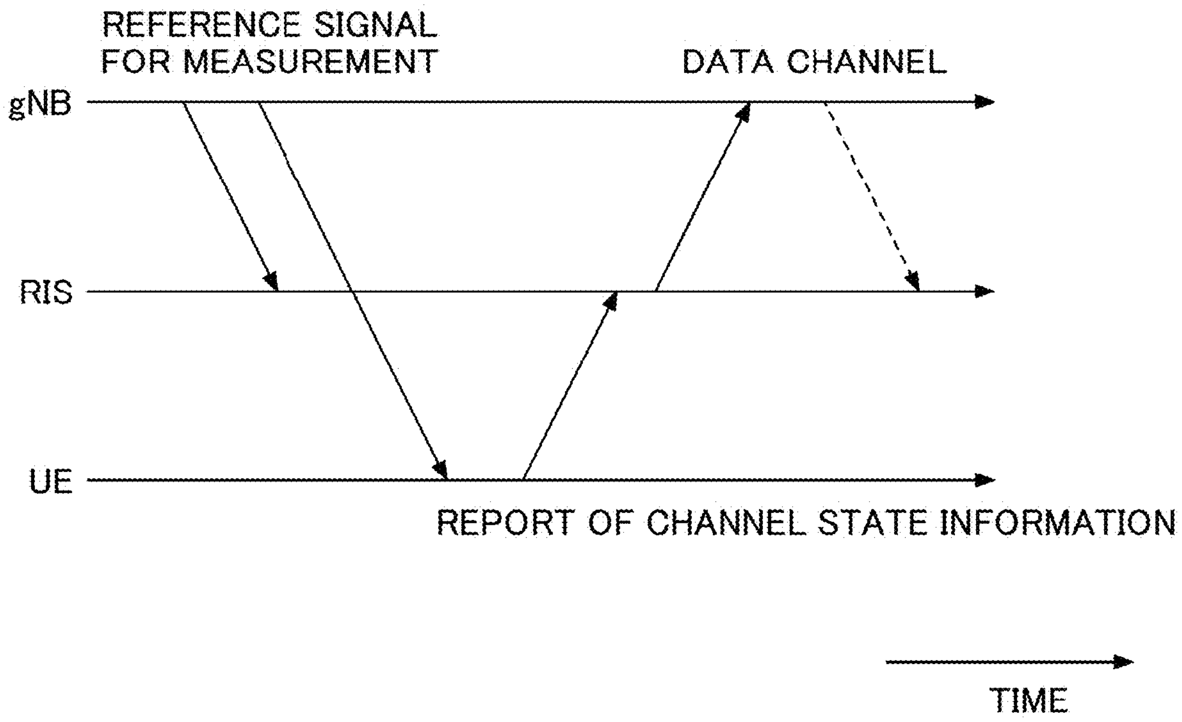
FIG. 26 is a drawing illustrating an example (5) of measurement and reporting in an embodiment of the present invention.

FIG. 26 is a drawing illustrating an example (5) of measurement and reporting in an embodiment of the present invention. FIG. 26 illustrates an operational example of Alt.2) of an option 2-2). As illustrated in FIG. 26, the gNB 10 transmits a reference signal for measurement to the RIS 30. The gNB 10 transmits a reference signal for measurement to the UE 20. The UE 20 transmits a report of the channel state information based on the measurement result of the received reference signal for measurement to the RIS 30. The report of the channel state information received from the UE 20 is multiplexed with the report of the channel state information based on the measurement result of the received reference signal for measurement, and the multiplexed result is transmitted to the gNB 10.

Regarding the measurement resource, the CSI-RS information may be configured and/or indicated by the base station 10 to the RIS 30 and the terminal 20. The information may include at least one of the following 1) to 7).

1) Identifier of the resource configuration
2) Resource transmission type, for example, periodic, semi-persistent, or aperiodic 3) Identifier of the resource set
4) Time and/or frequency resource used for transmitting a signal
5) Time period used for transmitting a signal
6) Number of ports
7) Transmission power The above-described information items that are configured and/or indicated to the RIS 30 and the terminal 20 may be the same or may be different. For example, the RIS 30 and the terminal 20 may assume that the resourceType included in the information element CSI-ResourceConfig is the same. In a case where the above-described information items that are configured and/or indicated to the RIS 30 and the terminal 20 are the same, the RIS 30 and the terminal 20 may refer to the same information element.

Regarding the reporting resource, information used for transmitting the CSI report may be configured and/or indicated by the base station 10 to the RIS 30 and the terminal 20. The said information may include at least one of the following 1) to 11).

1) Identifier of the resource configuration
2) Identifier indicating an association with CSI-RS, for example, an identifier of the above-described CSI-RS resource configuration.
3) Transmission type of reporting, for example, periodic, semi-persistent, or aperiodic
4) Report type, for example, RI (Rank indicator), LI (layer indicator), PMI (Precoding matrix indicator), CQI (Channel quality indicator), CRI (CSI-RS resource indicator), SSBRI (SSB resource indicator), L1-RSRP (Layer 1 Reference signal received power), or L1-SINR (Layer 1 Signal to interference plus noise power ratio)
5) Time and/or frequency resource
6) Time period
7) Information related to frequency hopping
8) CQI table
9) Transmission power
10) RNTI (Radio network temporary identifier)
11) Information related to RE (Resource element) mapping The above-described information items that are configured and/or indicated to the RIS 30 and the terminal 20 may be the same or may be different. For example, the RIS 30 and the terminal 20 may assume that cqi-Table included in the information element reportQuantity, the information element report ConfigType, or the information element CSI-Report Config is the same. In a case where the above-described information items that are configured and/or indicated to the RIS 30 and the terminal 20 are the same, the RIS 30 and the terminal 20 may refer to the same information element.

The above-described information that is configured and/or indicated to the terminal 20 may be configured or indicated to the RIS 30. For example, in the above-described option 2-1) and in the Alt. 2) of the above-described option 2-2), the RIS 30 is required to decode the CSI report received from the terminal 20. In order to perform the decoding, the RIS 30 may retain the required information related to the terminal 20.

According to the above-described embodiment, the RIS and the terminal can improve the communication quality by receiving the reference signal for measurement that is transmitted from the base station and by transmitting the report of the measurement result to the base station using the specified method.

In other words, measurement and report of the channel state information of communications using the wireless relay device can be performed in the wireless communication system.

For example, in order to achieve the purposes described in 1) to 3) below, a control of appropriately activating or deactivating the function of the RIS or the smart repeater may be performed.

1) To avoid an occurrence of unnecessary reflection or repetition/radiation in order to suppress interference
2) Reduced power consumption of the RIS or smart repeater
3) In order to provide a temporary coverage for a specific area (for example, for an event)

The RIS or smart repeater that is a wireless relay device 30 may control activation or deactivation of the reflection or radiation function of the device itself, based on an upper layer configuration and/or a physical layer indication from another network node. The said upper layer configuration may be RRC (Radio Resource Control) signaling, or may be MAC (Medium Access Control)-CE (Control Element). The said physical layer indication may be DCI (Downlink Control Information), or may be UCI (Uplink Control Information). The activation or deactivation may mean ON/OFF of a function, or may mean activation/deactivation of a function.

For example, the RIS 30 may receive a configuration related to activation or deactivation of a reflection or radiation function of the device itself from each of the base stations 10 or each of the terminals 20 to be connected. For example, the RIS 30 may receive a configuration related to activation or deactivation of a reflection or radiation function of the device itself from one of the base stations 10 or the terminals 20 to be connected. For example, only in a case where the RIS 30 receives the same configuration related to activation or deactivation of a reflection or radiation function of the device itself from each of the base stations 10 or each of the terminals 20 to be connected, the RIS 30 may apply the said configuration. For example, the said configuration may be limited to a specific configuration (for example, deactivation). For example, the RIS 30 may receive the specific configuration related to activation or deactivation of a reflection or radiation function of the device itself from one of the base stations 10 or the terminals 20 to be connected. The specific configuration may be, for example, activation.

For example, information element (IE) of the RRC signaling may be as follows.

```
RepeaterConfig::=SEQUENCE {
    repeaterState ENUMERATED{activated, deactivated}
        OPTIONAL, —Need M
}
```

Figure 27:
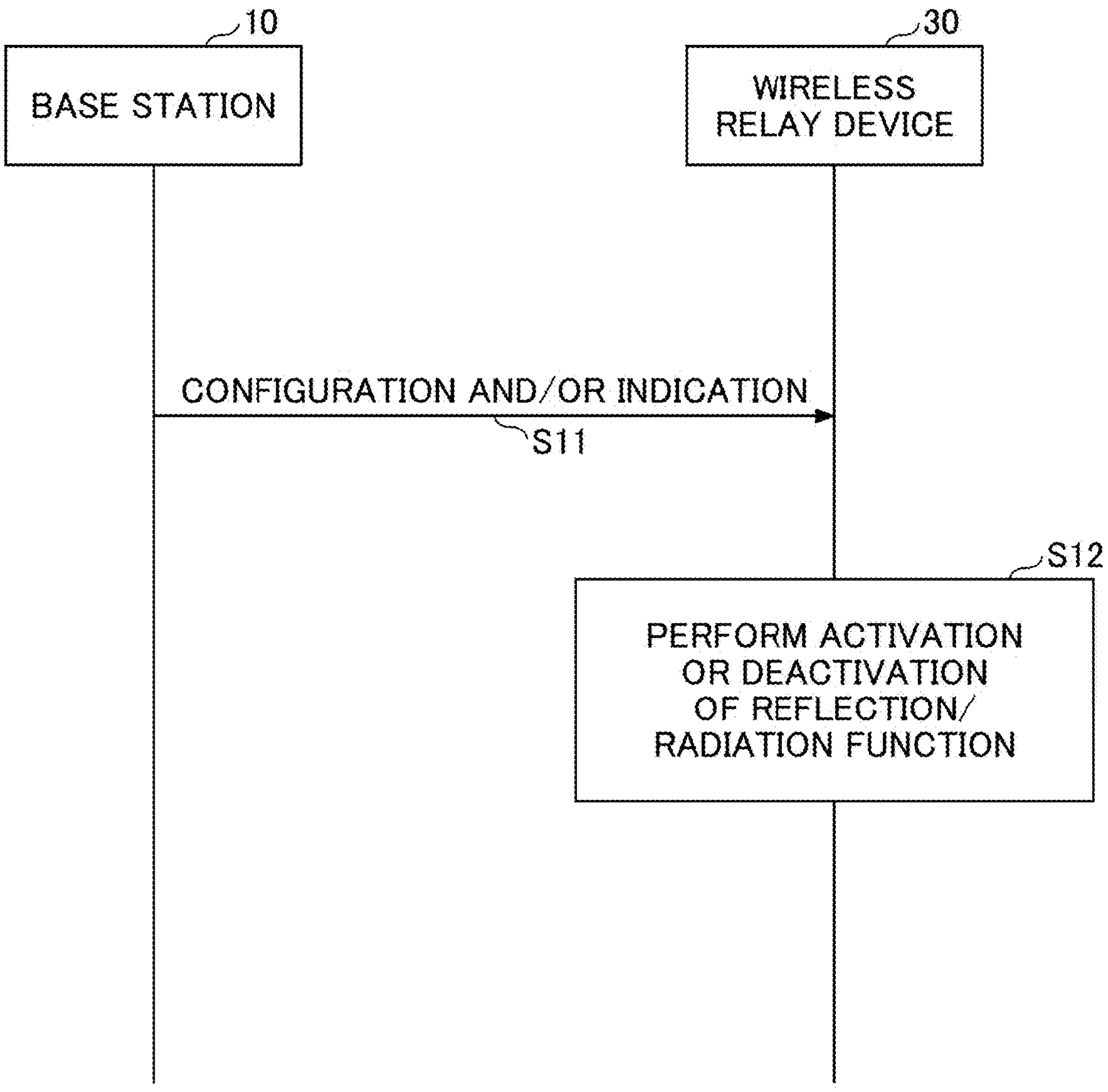
FIG. 27 is a sequence diagram for describing an example (1) of an operation of a wireless relay device 30 in an embodiment of the present invention.

FIG. 27 is a sequence diagram for describing an example (1) of an operation of a wireless relay device 30 in an embodiment of the present invention. For example, the wireless relay device 30 may perform control of activation or deactivation based on the configuration and/or indication by the base station 10. The configuration and/or indication may be the above-described upper layer configuration, or may be a physical layer indication.

In step S11, the base station 10 transmits a configuration and/or indication related to the reflection/radiation function to the wireless relay device 30. In subsequent step S12, the wireless relay device 30 performs activation or deactivation of the reflection/radiation function based on the configuration and/or indication. Hereinafter, "reflection/radiation" may mean reflection or radiation, or may mean reflection and radiation.

Figure 28:
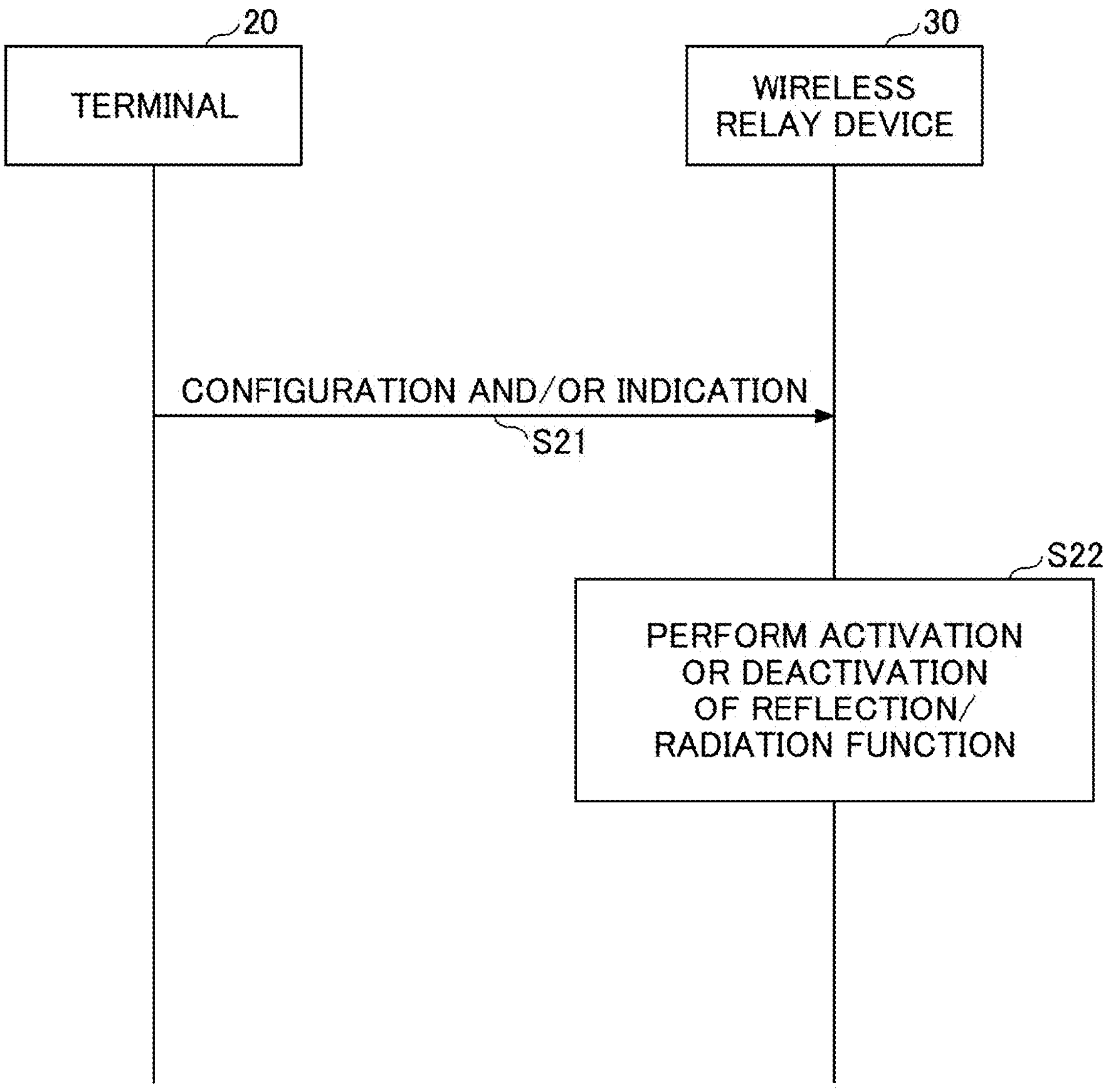
FIG. 28 is a sequence diagram for describing an example (2) of an operation of a wireless relay device 30 in an embodiment of the present invention.

FIG. 28 is a sequence diagram for describing an example (2) of an operation of a wireless relay device 30 in an embodiment of the present invention. For example, the wireless relay device 30 may perform control of activation or deactivation based on the configuration and/or indication by the terminal 20. The configuration and/or indication may be the above-described upper layer configuration, or may be a physical layer indication.

In step S21, the terminal 20 transmits a configuration and/or indication related to the reflection/radiation function to the wireless relay device 30. In subsequent step S22, the wireless relay device 30 performs activation or deactivation of the reflection/radiation function based on the configuration and/or indication.

Figure 29:
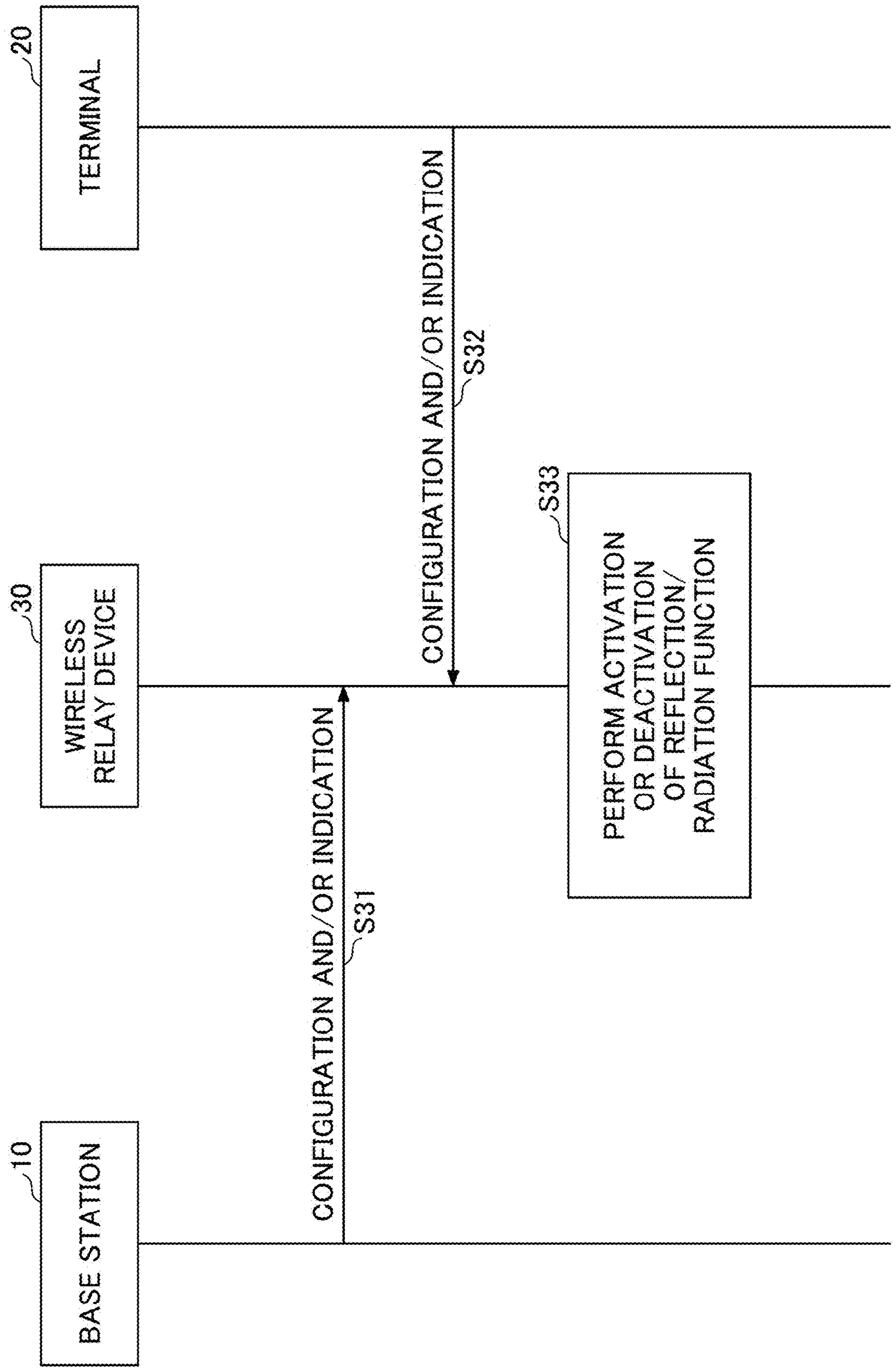
FIG. 29 is a sequence diagram for describing an example (3) of an operation of a wireless relay device 30 in an embodiment of the present invention.

FIG. 29 is a sequence diagram for describing an example (3) of an operation of a wireless relay device 30 in an embodiment of the present invention. For example, the wireless relay device 30 may perform control of activation or deactivation based on configurations and/or indications by the base station 10 and the terminal 20. The configurations and/or indications may be the above-described upper layer configuration, or may be a physical layer indication.

In step S31, the base station 10 transmits a configuration and/or indication related to the reflection/radiation function to the wireless relay device 30. In step S32, the terminal 20 transmits a configuration and/or indication related to the reflection/radiation function to the wireless relay device 30. The order of performing step S31 and step S32 may be reversed, or only one of step S31 or step S32 may be performed. In step S33, the wireless relay device 30 performs activation or deactivation of the reflection/radiation function based on the configuration and/or indication.

Here, the wireless relay device 30 may apply the configuration and/or indication only in a case where the same configuration and/or indication are (is) received from the base station 10 and the terminal 20. For example, the wireless relay device 30 may activate the reflection/radiation function in a case where the configuration and/or indication of activation is received from both the base station 10 and the terminal 20. For example, the wireless relay device 30 may deactivate the reflection/radiation function in a case where the configuration and/or indication of deactivation is received from both the base station 10 and the terminal 20.

In addition, the wireless relay device 30 may autonomously determine activation or deactivation of the reflection/radiation function. For example, the wireless relay device 30 may perform an autonomous operation that is determined in advance in a case where no configuration and/or indication related to the reflection/radiation function is received from the base station 10 and the terminal 20.

In a case where the wireless relay device 30 performs control of activation or deactivation of the reflection/radiation function based on an upper layer configuration and/or indication from the base station 10 or the terminal 20, the state of activation or deactivation may be directly configured in a semi-static manner or a period of an activated or deactivated state may be configured in a semi-static manner.

In case where the a activation or deactivation of the reflection/radiation function is dynamically indicated to the wireless relay device 30 by a physical layer control signal (for example, PDCCH or PUCCH) from the base station 10 or the terminal 20, regarding the time from receiving of the physical layer signal to the application of activation or deactivation, the time may be specified by the technical specification or may be indicated by the physical layer control signal, the minimum time may be specified, or the wireless relay device 30 is not required to assume that the time that is shorter than the minimum time is to be indicated.

In a case where the activation or deactivation of the reflection/radiation function is dynamically indicated by a physical layer control signal (for example, PDCCH or PUCCH) from the base station 10 or the terminal 20, when PDCCH including a DL grant is reflected/radiated, the wireless relay device 30 may deactivate the reflection/radiation function after the reflection/radiation of PDSCH and PUCCH scheduled by the DL grant.

In a case where the activation or deactivation of the reflection/radiation function is dynamically indicated by a physical layer control signal (for example, PDCCH or PUCCH) from the base station 10 or the terminal 20, when PDCCH including a UL grant is reflected/radiated, the wireless relay device 30 may deactivate the reflection/radiation function after the reflection/radiation of PUSCH scheduled by the UL grant.

In a case where a configured UL signal triggered by the terminal 20 is detected, the wireless relay device 30 may perform activation or deactivation of the reflection/radiation function. In other words, a UL signal from the terminal 20 may be used as a WUS (Wake up signal).

Figure 30:
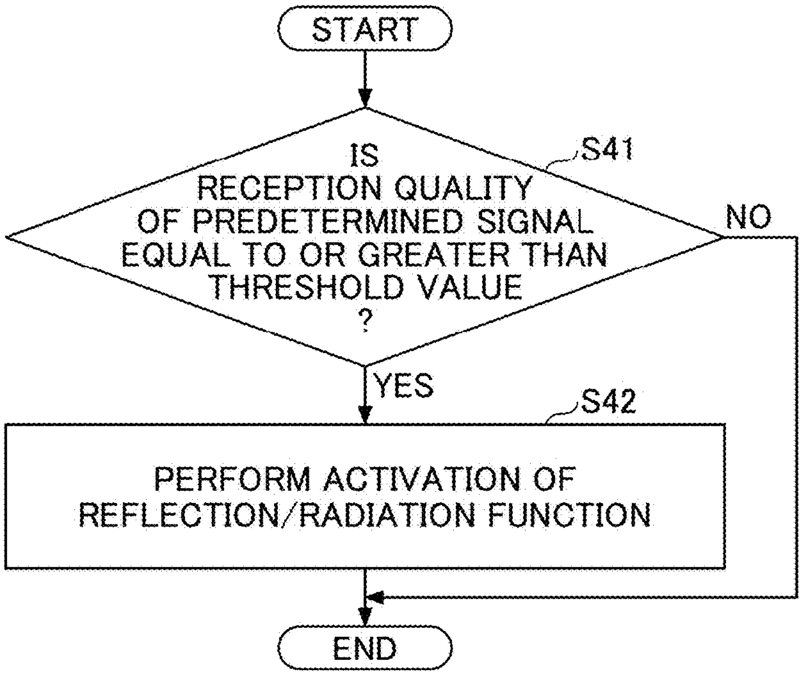
FIG. 30 is a flowchart for describing an example (4) of an operation of a wireless relay device 30 in an embodiment of the present invention.

In a case where a signal from the terminal 20 indicating activation or deactivation of the reflection/radiation function is configured to be activated by the base station 10 and/or the terminal 20, the wireless relay device 30 may perform activation or deactivation of the reflection/radiation function in response to detection of the signal. In other words, a UL signal and a WUS from the terminal 20 may be separately transmitted. The terminal 20 may always transmit the signal before performing the UL transmission, or may transmit the signal only when the wireless relay device 30 is in a state in which the reflection/radiation function is deactivated. FIG. 30 is a flowchart for describing an example (4) of an operation of a wireless relay device 30 in an embodiment of the present invention. In step S41, the wireless relay device 30 determines whether or not the receiving quality of a predetermined signal is equal to or greater than a threshold value. In a case where the receiving quality of the predetermined signal is equal to or greater than the threshold value (YES in S41), proceeds to step S42, and, in a case where the receiving quality of the predetermined signal is not equal to or greater than the threshold value (NO in S41), the flow ends. In step S42, the wireless relay device 30 may perform activation of the reflection/radiation function.

Figure 31:
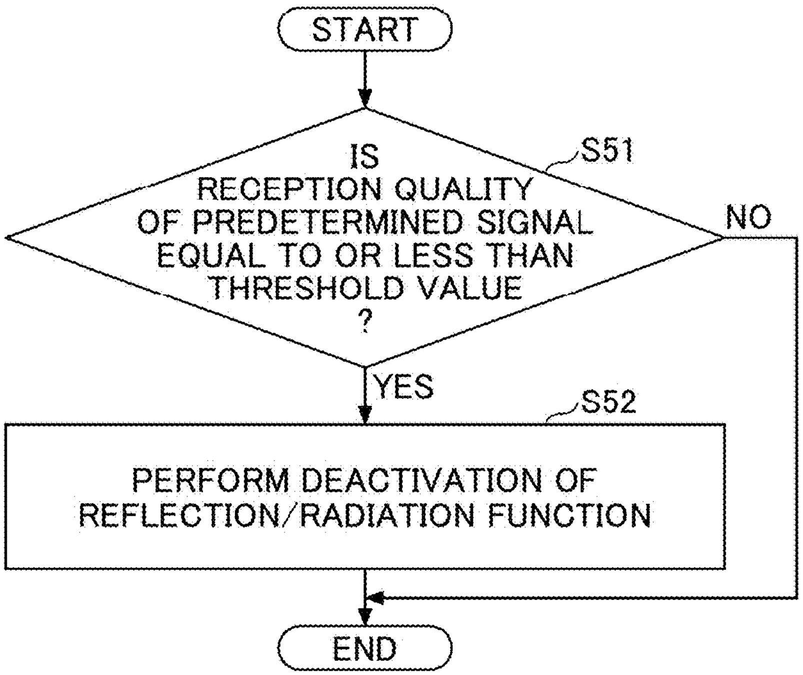
FIG. 31 is a flowchart for describing an example (5) of an operation of a wireless relay device 30 in an embodiment of the present invention.

FIG. 31 is a flowchart for describing an example (5) of an operation of a wireless relay device 30 in an embodiment of the present invention. In step S51, the wireless relay device 30 determines whether or not the receiving quality of a predetermined signal is equal to or less than a threshold value. In a case where the receiving quality of the predetermined signal is equal to or greater than the threshold value (YES in S51), proceeds to step S52, and, in a case where the receiving quality of the predetermined signal is not equal to or greater than the threshold value (NO in S51), the flow ends. In step S52, the wireless relay device 30 may perform deactivation of the reflection/radiation function.

The predetermined signal may be an SSB from the base station 10, may be a TRS from the base station 10, or may be an SRS from the terminal 20. A signal for receiving quality measurement may be specified or configured as the predetermined signal. The receiving quality may be RSRP (Reference Signal Received Power), RSRQ (Reference Signal Received Quality), or SINR (Signal to interference plus noise ratio). The threshold value may be specified in the technical specification, or may be configured by another node. In addition, regarding the threshold value, the hysteresis may be configured, or activation may be performed in a case where the threshold value is exceeded for N times in a row in the specified or configured receiving quality measurement occasions, and deactivation may be performed in a case where the threshold value is fallen below for N times in a row.

The wireless relay device 30 may commonly control activation or deactivation of the reflection/radiation function for DL and UL, or may independently control activation or deactivation of the reflection/radiation function for DL and UL Whether to commonly control, or independently control, DL and UL may be specified in the technical specification, or may be configured or indicated by another node. In a case of commonly performing the control, for example, the control may be performed commonly according to an upper layer configuration by the base station 10, the control may be performed commonly according to a physical layer control signal from the base station 10, the control may be performed commonly according to an upper layer configuration by the terminal 20, or the control may be performed commonly according to a physical layer control signal from the terminal 20.

In a case of independently performing the control, for example, DL may be controlled according to an upper layer configuration by the base station 10 and UL may be controlled according to a physical layer control signal from the terminal 20. In addition, DL may be controlled according to a physical layer control signal from the base station 10, and UL may be controlled according to a physical layer control signal from the terminal 20. In addition, DL may be controlled according to a physical layer control signal from the base station 10 and UL may be controlled according to an upper layer configuration by the terminal 20. In addition, DL may be controlled according to an upper layer configuration by the base station 10 and UL may be controlled according to an upper layer configuration by the terminal 20.

For example, the RIS 30 may perform different controls related to activation or deactivation for each of the base stations 10 and the terminals 20 to be connected.

The wireless relay device 30 may reflect/radiate all signals from the base station 10 and the terminal 20 in a state in which the reflection/radiation function is activated. The period in which the reflection/radiation function is activated may be a period in which the RRC connection state with the base station 10 is being established, or may be a period in which the RRC connection state with the terminal 20 is being established For example, similar to the CDRX (Connected mode DRX) with the base station 10, the wireless relay device 30 may maintain the activation in a case where a WUS is received in a PDCCH MO (Monitoring Occasion) and may perform deactivation until the next MO in a case where a WUS is not received.

The wireless relay device 30 is not required to reflect/radiate a signal from the base station 10 and the terminal 20 in a state in which the reflection/radiation function is deactivated. The period in which the reflection/radiation function is deactivated may be a period in which the RRC state with respect to the base station 10 is an RRC idle state or an RRC inactive state, or may be a period in which the RRC state with respect to the terminal 20 is an RRC idle state or an RRC inactive state. For example, the activation may be maintained in a case where a PEI (Paging Early Indication) that is a WUS is received by the main circuit before a PO (Paging Occasion), and the deactivation may be performed until the next PEI in a case where a PEI is not received. For example, the reflection/radiation function of the main circuit may be deactivated, and the reflection/radiation function of the main circuit may be activated in a case where a WUS is received by a passive circuit that is dedicated to the WUS-receiving.

The wireless relay device 30 may control activation or deactivation of the reflection/radiation in accordance with the RRC connection state with the base station 10 of a terminal 20, which is connected to the wireless relay device 30 itself, for which a signal is reflected/radiated.

The wireless relay device 30 may change the state of activation or deactivation of reflection/radiation according to an indication from the terminal 20, which is connected to the wireless relay device 30 itself, for which a signal is reflected/radiated. For example, in a case where a UL signal that can be transmitted when the terminal 20 is in an RRC idle or inactive mode is detected, the state of activation or deactivation of reflection/radiation may be changed, for example, activated. In other words, a UL signal from the terminal 20 may be used as a WUS.

The UL signal may be PRACH in the 4-step random access procedure, may be MsgA in the 2-step random access procedure, may be CG-PUSCH for SDT (Small data transmission), or the like. In addition, in a case where the UL signal is configured to be activated by the base station 10 and/or the terminal 20, the wireless relay device 30 may perform activation or deactivation of the reflection/radiation function in response to detection of the signal. In other words, a UL signal and a WUS from the terminal 20 may be separately transmitted. The terminal 20 may always transmit the signal before performing the UL transmission, or may transmit the signal only when the wireless relay device 30 is in a state in which the reflection/radiation function is deactivated.

According to the above-described embodiment, the wireless relay device 30 receives a control signal including a configuration or indication from the base station 10 or the terminal 20, and can activate or deactivate the reflection/radiation function based on the configuration or indication.

In other words, the wireless relay device can be appropriately activated or deactivated in the wireless communication system.

In addition, when the RIS 30 is connected to a plurality of base stations 10, a wireless resource, which can be used for reflecting a signal from/to each base station 10, may be configured or indicated by the base station 10 or the terminal 20. The configuration or indication may be indicated via control information. It is to be noted that "a signal from/to the base station 10" means "a signal from the base station 10 and a signal to the base station 10".

Figure 32:
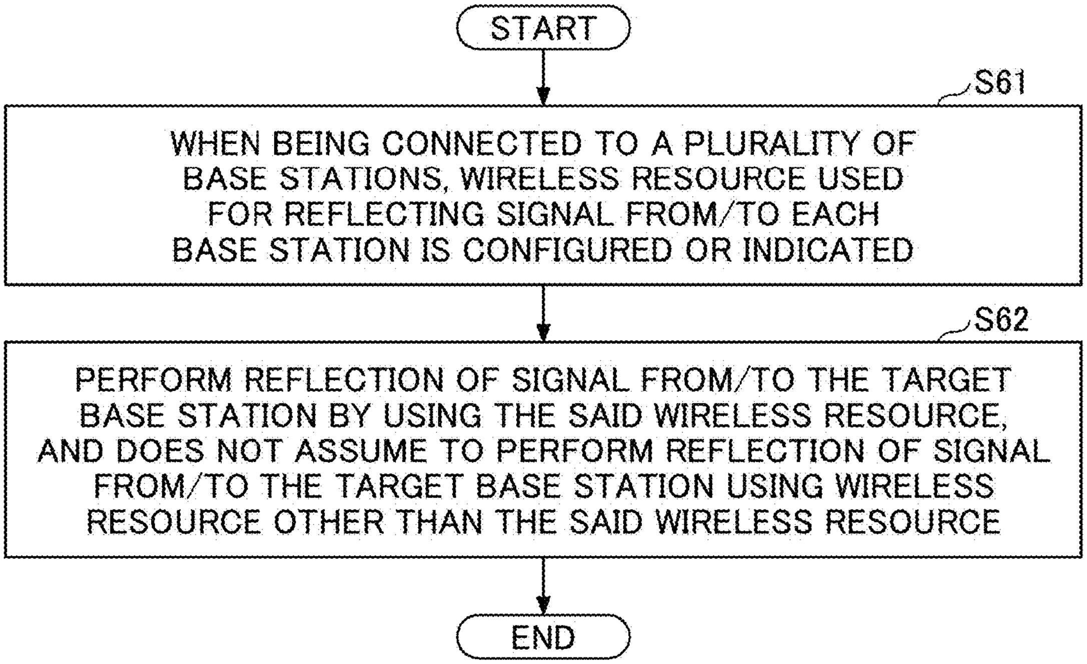
FIG. 32 is a flowchart for describing an example (1) of using wireless resources by a wireless relay device 30 in an embodiment of the present invention.

FIG. 32 is a flowchart for describing an example (1) of using wireless resources by a wireless relay device 30 in an embodiment of the present invention. In step S61, when the RIS 30 is connected to a plurality of base stations 10, a wireless resource that can be used for reflecting a signal from/to each base station 10 is configured or indicated. In subsequent step S62, the RIS 30 performs reflection from/to the target base station 10 by using the wireless resource, and does not assume to perform reflection from/to the target base station 10 by using a wireless resource other than the said wireless resource.

Figure 33:
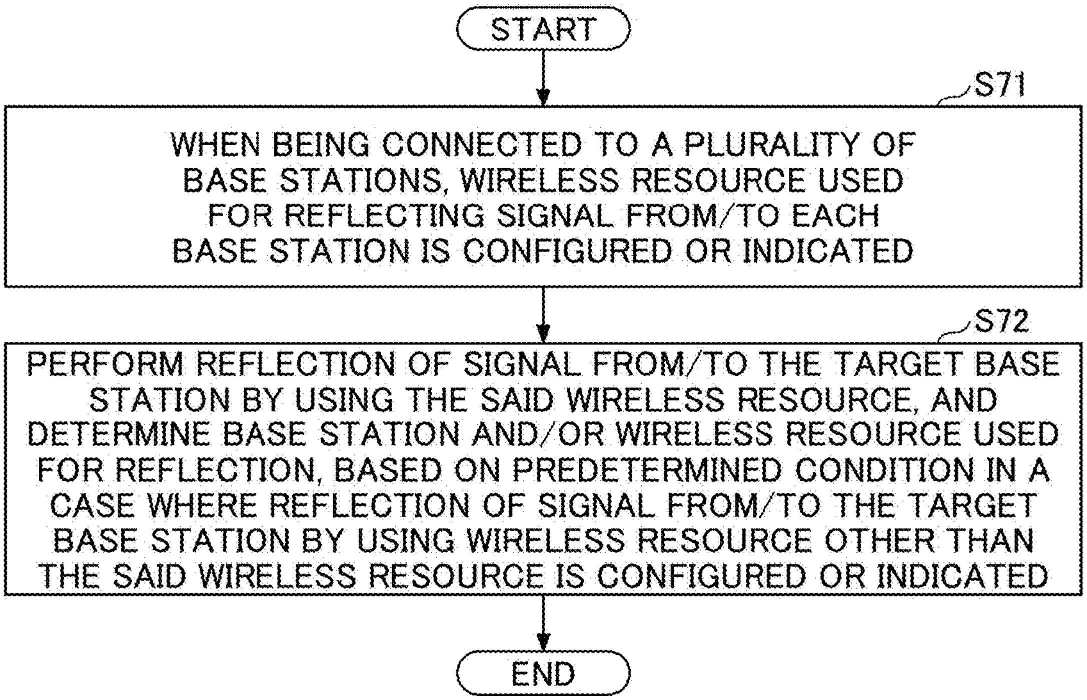
FIG. 33 is a flowchart for describing an example (2) of using wireless resources by a wireless relay device 30 in an embodiment of the present invention.

FIG. 33 is a flowchart for describing an example (2) of using wireless resources by a wireless relay device 30 in an embodiment of the present invention. In step S71, the RIS 30 is connected to a plurality of base stations 10, a wireless resource that can be used for reflecting a signal from/to each base station 10 is configured or indicated. In subsequent step S72, the RIS 30 performs reflection from/to the target base station 10 by using the wireless resource, and, in a case where reflection from/to the target base station 10 by using a wireless resource other than the said wireless resource is configured or indicated, the RIS 30 determines a base station 10 and/or a wireless resource used for the reflection based on a predetermined condition. It is to be noted that, regarding the wireless resource other than the said wireless resource, the priority of the base station 10 may be configured or indicated, and the reflection from/to the base station 10 having high priority may be performed. In addition, the RIS 30 is not required to assume to perform reflection from/to a plurality of base stations 10 with the same priority.

According to the above-described embodiment, in a case where the wireless relay device 30 is connected to a plurality of base stations 10, collision between wireless resources used for a signal from the base station 10 and a signal to the base station 10 can be avoided.

In other words, signals of a plurality of base stations can be relayed by the wireless relay device in the wireless communication system.

(Hardware Structure)

In the above block diagrams used for describing an embodiment of the present invention (FIG. 2, FIG. 3 and FIG. 4), functional unit blocks are shown. The functional blocks (function units) are realized by a freely-selected combination of hardware and/or software. Further, realizing means of each functional block is not limited in particular. In other words, each functional block may be realized by a single apparatus in which multiple elements are coupled physically and/or logically, or may be realized by two or more apparatuses that are physically and/or logically separated and are physically and/or logically connected (e.g., wired and/or wireless). The functional blocks may be realized by combining the above-described one or more apparatuses with software.

Functions include, but are not limited to, judging, determining, calculating, processing, deriving, investigating, searching, checking, receiving, transmitting, outputting, accessing, resolving, selecting, establishing, comparing, assuming, expecting, and deeming, broadcasting, notifying, communicating, forwarding, configuring, reconfiguring, allocating, mapping, and assigning, etc. For example, a functional block (component) that functions to perform transmission is called a transmitting unit or a transmitter. In either case, as described above, the implementation method is not particularly limited.

Figure 34:
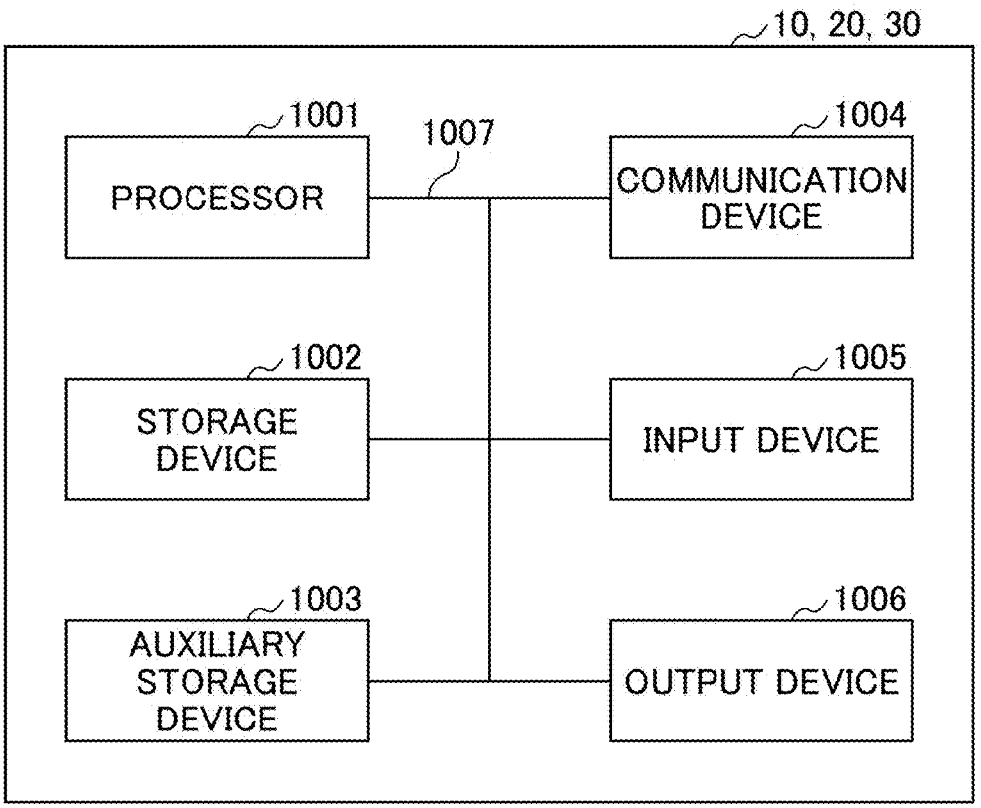
FIG. 34 is a drawing illustrating an example of a hardware structure of the base station 10, the terminal 20, or the wireless relay device 30 in an embodiment of the present invention.

For example, the base station 10, the terminal 20, and the wireless relay device 30, etc., according to an embodiment of the present invention may function as a computer for processing the wireless communication method of the present disclosure. FIG. 34 is a drawing illustrating an example of hardware structures of the base station 10, the terminal 20 and the wireless relay device 30 according to an embodiment of the present invention. Each of the above-described base station 10, the terminal 20, and the wireless relay device 30 may be a computer device including a processor 1001, a storage device 1002, an auxiliary storage device 1003, a communication device 1004, an input device 1005, an output device 1006, a bus 1007, etc.

It should be noted that, in the descriptions below, the term "device" can be read as a circuit, a device, a unit, etc. The hardware structures of the base station 10, the terminal 20 and the wireless relay device 30 may include one or more of each of the devices illustrated in the figure, or may be configured without including some of the devices.

Each function in the base station 10, the terminal 20 and the wireless relay device 30 is implemented by having the processor 1001 perform an operation by reading predetermined software (programs) onto hardware such as the processor 1001 and the storage device 1002, and by controlling communication by the communication device 1004 and controlling at least one of reading or writing of data in the storage device 1002 and the auxiliary storage device 1003.

The processor 1001 controls the entire computer by, for example, controlling the operating system. The processor 1001 may include a central processing unit (CPU) including an interface with a peripheral apparatus, a control apparatus, a calculation apparatus, a register, etc. For example, the above-described control unit 140, control unit 240, and the like, may be implemented by the processor 1001.

Further, the processor 1001 reads out onto the storage device 1002 a program (program code), a software module, or data from the auxiliary storage device 1003 and/or the communication device 1004, and performs various processes according to the program, the software module, or the data. As the program, a program is used that causes the computer to perform at least a part of operations according to an embodiment of the present invention described above. For example, the control unit 140 of the base station 10 illustrated in FIG. 2 may be realized by control programs that are stored in the storage device 1002 and are executed by the processor 1001. Further, for example, the control unit 240 of the terminal 20 illustrated in FIG. 3 may be realized by control programs that are stored in the storage device 1002 and are executed by the processor 1001. The various processes have been described to be performed by a single processor 1001. However, the processes may be performed by two or more processors 1001 simultaneously or sequentially. The processor 1001 may be implemented by one or more chips. It should be noted that the program may be transmitted from a network via a telecommunication line.

The storage device 1002 is a computer-readable recording medium, and may include at least one of a ROM (Read Only Memory), an EPROM (Erasable Programmable ROM), an EEPROM (Electrically Erasable Programmable ROM), a RAM (Random Access Memory), etc. The storage device 1002 may be referred to as a register, a cache, a main memory, etc. The storage device 1002 is capable of storing programs (program codes), software modules, or the like, that are executable for performing communication processes according to an embodiment of the present invention.

The auxiliary storage device 1003 is a computer-readable recording medium, and may include at least one of, for example, an optical disk such as a CD-ROM (Compact Disc ROM), a hard disk drive, a flexible disk, a magneto optical disk (e.g., compact disk, digital versatile disk, Blu-ray (registered trademark) disk), a smart card, a flash memory (e.g., card, stick, key drive), a floppy (registered trademark) disk, a magnetic strip, etc. The above recording medium may be a database including the storage device 1002 and/or the auxiliary storage device 1003, a server, or any other appropriate medium.

The communication device 1004 is hardware (transmission or receiving device) for communicating with computers via at least one of a wired network or a wireless network, and may be referred to as a network device, a network controller, a network card, a communication module, etc. The communication device 1004 may include a high frequency switch, duplexer, filter, frequency synthesizer, or the like, for example, to implement at least one of a frequency division duplex (FDD) and a time division duplex (TDD). For example, the transmitting/receiving antenna, the amplifier unit, the transmitting/receiving unit, the transmission line interface, and the like, may be implemented by the communication device 1004. The transmitting/receiving unit may be physically or logically divided into a transmitting unit and a receiving unit.

The input device 1005 is an input device that receives an external input (e.g., keyboard, mouse, microphone, switch, button, sensor). The output device 1006 is an output device that outputs something to the outside (e.g., display, speaker, LED lamp). It should be noted that the input device 1005 and the output device 1006 may be integrated into a single device (e.g., touch panel).

Further, the apparatuses including the processor 1001, the storage device 1002, etc., are connected to each other via the bus 1007 used for communicating information. The bus 1007 may include a single bus, or may include different buses between the apparatuses.

Further, each of the base station 10, the terminal 20 and the wireless relay device 30 may include hardware such as a microprocessor, a digital signal (DSP), an ASIC (Application Specific Integrated Circuit), a PLD processor (Programmable Logic Device), an FPGA (Field Programmable Gate Array), etc., and a part or all of each functional block may be implemented by the hardware. For example, the processor 1001 may be implemented by at least one of the above hardware elements.

In addition, the wireless relay device 30 may include a variable phase shifter, phase shifter, amplifier, antenna, antenna array, or the like, as the hardware included in the variable unit 340 and the antenna unit 350 depending on the necessity.

Figure 35:
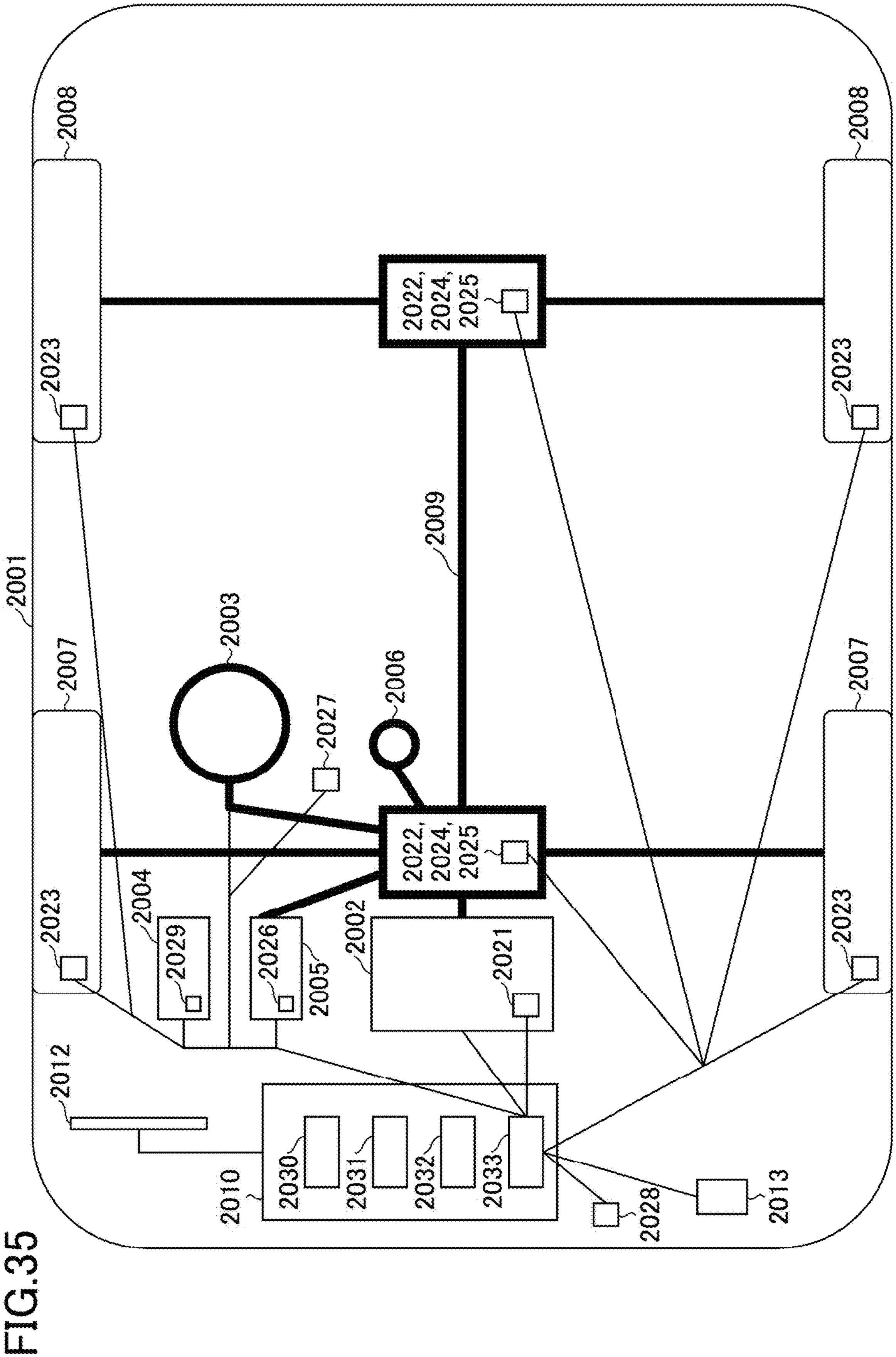
FIG. 35 is a drawing illustrating an example of a structure of a vehicle 2001 in an embodiment of the present invention.

FIG. 35 shows an example of a configuration of a vehicle 2001. As shown in FIG. 35, the vehicle 2001 includes a drive unit 2002, a steering unit 2003, an accelerator pedal 2004, a brake pedal 2005, a shift lever 2006, a front wheel 2007, a rear wheel 2008, an axle 2009, an electronic control unit 2010, various sensors 2021-2029, an information service unit 2012, and a communication module 2013. The aspects/embodiments described in the present disclosure may be applied to a communication device mounted in the vehicle 2001, and may be applied to, for example, the communication module 2013.

The drive unit 2002 may include, for example, an engine, a motor, and a hybrid of an engine and a motor. The steering unit 2003 includes at least a steering wheel and is configured to steer at least one of the front wheel or the rear wheel, based on the operation of the steering wheel operated by the user.

The electronic control unit 2010 includes a microprocessor 2031, a memory (ROM, RAM) 2032, and a communication port (IO port) 2033. The electronic control unit 2010 receives signals from the various sensors 2021-2029 provided in the vehicle 2001. The electronic control unit 2010 may be referred to as an ECU (Electronic control unit).

The signals from the various sensors 2021 to 2029 include a current signal from a current sensor 2021 which senses the current of the motor, a front or rear wheel rotation signal acquired by a revolution sensor 2022, a front or rear wheel pneumatic signal acquired by a pneumatic sensor 2023, a vehicle speed signal acquired by a vehicle speed sensor 2024, an acceleration signal acquired by an acceleration sensor 2025, a stepped-on accelerator pedal signal acquired by an accelerator pedal sensor 2029, a stepped-on brake pedal signal acquired by a brake pedal sensor 2026, an operation signal of a shift lever acquired by a shift lever sensor 2027, and a detection signal, acquired by an object detection sensor 2028, for detecting an obstacle, a vehicle, a pedestrian, and the like.

The information service unit 2012 includes various devices for providing various kinds of information such as driving information, traffic information, and entertainment information, including a car navigation system, an audio system, a speaker, a television, and a radio, and one or more ECUs controlling these devices. The information service unit 2012 provides various types of multimedia information and multimedia services to the occupants of the vehicle 2001 by using information obtained from the external device through the communication module 2013 or the like.

A driving support system unit 2030 includes: various devices for providing functions of preventing accidents and reducing driver's operating loads such as a millimeter wave radar, a LiDAR (Light Detection and Ranging), a camera, a positioning locator (e.g., GNSS, etc.), map information (e.g., high definition (HD) map, autonomous vehicle (AV) map, etc.), a gyro system (e.g., IMU (Inertial Measurement Unit), INS (Inertial Navigation System), etc.), an AI (Artificial Intelligence) chip, an AI processor; and one or more ECUs controlling these devices. In addition, the driving support system unit 2030 transmits and receives various types of information via the communication module 2013 to realize a driving support function or an autonomous driving function.

The communication module 2013 may communicate with the microprocessor 2031 and components of the vehicle 2001 via a communication port. For example, the communication module 2013 transmits and receives data via a communication port 2033, to and from the drive unit 2002, the steering unit 2003, the accelerator pedal 2004, the brake pedal 2005, the shift lever 2006, the front wheel 2007, the rear wheel 2008, the axle 2009, the microprocessor 2031 and the memory (ROM, RAM) 2032 in the electronic control unit 2010, and sensors 2021 to 2029 provided in the vehicle 2001.

The communication module 2013 is a communication device that can be controlled by the microprocessor 2031 of the electronic control unit 2010 and that is capable of communicating with external devices. For example, various kinds of information are transmitted to and received from external devices through radio communication. The communication module 2013 may be internal to or external to the electronic control unit 2010. The external devices may include, for example, a base station, a mobile station, or the like.

The communication module 2013 transmits a current signal, which is input to the electronic control unit 2010 from the current sensor, to the external devices through radio communication. In addition, the communication module 2013 also transmits, to the external devices through radio communication, the front or rear wheel rotation signal acquired by the revolution sensor 2022, the front or rear wheel pneumatic signal acquired by the pneumatic sensor 2023, the vehicle speed signal acquired by the vehicle speed sensor 2024, the acceleration signal acquired by the acceleration sensor 2025, the stepped-on accelerator pedal signal acquired by the accelerator pedal sensor 2029, the stepped-on brake pedal signal acquired by the brake pedal sensor 2026, the operation signal of the shift lever acquired by the shift lever sensor 2027, and the detection signal, acquired by the object detection sensor 2028, for detecting an obstacle, a vehicle, a pedestrian, and the like, that are input to the electronic control unit 2010.

The communication module 2013 receives various types of information (traffic information, signal information, inter-vehicle information, etc.) transmitted from the external devices and displays the received information on the information service unit 2012 provided in the vehicle 2001. In addition, the communication module 2013 stores the various types of information received from the external devices in the memory 2032 available to the microprocessor 2031. Based on the information stored in the memory 2032, the microprocessor 2031 may control the drive unit 2002, the steering unit 2003, the accelerator pedal 2004, the brake pedal 2005, the shift lever 2006, the front wheel 2007, the rear wheel 2008, the axle 2009, the sensors 2021-2029, etc., mounted in the vehicle 2001.

Embodiment Summary

As described above, according to an embodiment of the present invention, a wireless relay device is provided. The wireless relay device includes: a receiver unit configured to receive a signal from each of a plurality of base stations; a control unit configured to be connected to a base station for which a received quality of the signal is equal to or greater than a threshold value; and a relay unit configured to perform relaying of a signal between the base station to be connected to and a terminal. The reception unit receives control information from the base station to be connected to, the control unit activates or deactivates a relay function of the relay unit, based on the control information, and the control unit determines a wireless resourced used by the relay unit, based on the control information.

According to the above-described configuration, the wireless relay device 30 can receive a control signal including a configuration or an indication from the base station 10 or the terminal 20, and can activate or deactivate the reflection/radiation function, based on the configuration or indication. In addition, in a case where the wireless relay device 30 is connected to a plurality of base stations 10, the wireless relay device 30 can avoid the collision of wireless resources used for a signal from the base station 10 and a signal to the base station 10. In other words, signals of a plurality of base stations can be relayed by the wireless relay device in the wireless communication system.

The control unit may be connected to a plurality of base stations for which a received quality of the signal is equal to or greater than a threshold value or to all base stations for which a received quality of the signal is equal to or greater than a threshold value. According to the above-described configuration, signals of a plurality of base stations can be relayed by the wireless relay device in the wireless communication system.

The control unit may report information related to a received quality of the signal to a plurality of base stations for which a received quality of the signal is equal to or greater than a threshold value or to all base stations for which a received quality of the signal is equal to or greater than a threshold value. According to the above-described configuration, signals of a plurality of base stations can be relayed by the wireless relay device in the wireless communication system.

In a case where there are a plurality of base stations to be connected to, the receiver unit may receive the control information from each of the base stations to be connected to, and, in a case where all of the control information indicates deactivation, the control unit may deactivate a relay function of the relay unit. According to the above-described configuration, the wireless relay device 30 can receive a control signal including a configuration or an indication from the base station 10 or the terminal 20, and can activate or deactivate the reflection/radiation function, based on the configuration or indication.

The control unit is not required to assume that a signal between the base station to be connected to and the terminal is to be relayed by using a wireless resource other than the determined wireless resource. According to the above-described configuration, in a case where the wireless relay device 30 is connected to a plurality of base stations 10, the wireless relay device 30 can avoid the collision of wireless resourced used for a signal from the base station 10 and a signal to the base station 10.

In addition, according to an embodiment of the present invention, a communication method performed by a wireless relay device is provided. The communication method includes: receiving a signal from each of a plurality of base stations; being connected to a base station for which a receiving quality of the signal is equal to or greater than a threshold value; performing relaying of a signal between the base station to be connected to and a terminal; receiving control information from the base station to be connected to; activating or deactivating a relay function of the relay unit, based on the control information, and determining a wireless resource used by the relay unit, based on the control information.

According to the above-described configuration, the wireless relay device 30 can receive a control signal including a configuration and an indication from the base station 10 or the terminal 20, and can activate or deactivate the reflection/radiation function, based on the configuration or indication. In addition, in a case where the wireless relay device 30 is connected to a plurality of base stations 10, the wireless relay device 30 can avoid the collision of wireless resources used for a signal from the base station 10 and a signal to the base station 10. In other words, signals of a plurality of base stations can be relayed by the wireless relay device in the wireless communication system.

Supplement of Embodiment

As described above, one or more embodiments have been described. The present invention is not limited to the above embodiments. A person skilled in the art should understand that there are various modifications, variations, alternatives, replacements, etc., of the embodiments. In order to facilitate understanding of the present invention, specific values have been used in the description. However, unless otherwise specified, those values are merely examples and other appropriate values may be used. The division of the described items may not be essential to the present invention. The things that have been described in two or more items may be used in a combination if necessary, and the thing that has been described in one item may be appropriately applied to another item (as long as there is no contradiction). Boundaries of functional units or processing units in the functional block diagrams do not necessarily correspond to the boundaries of physical parts. Operations of multiple functional units may be physically performed by a single part, or an operation of a single functional unit may be physically performed by multiple parts. The order of sequences and flowcharts described in an embodiment of the present invention may be changed as long as there is no contradiction. For the sake of description convenience, the base station 10 and the terminal 20 have been described by using functional block diagrams. However, the apparatuses may be realized by hardware, software, or a combination of hardware and software. The software executed by a processor included in the base station 10 according to an embodiment of the present invention and the software executed by a processor included in the terminal 20 according to an embodiment of the present invention may be stored in a random access memory (RAM), a flash memory, a read only memory (ROM), an EPROM, an EEPROM, a register, a hard disk (HDD), a removable disk, a CD-ROM, a database, a server, or any other appropriate recording medium.

Further, information indication may be performed not only by methods described in an aspect/embodiment of the present specification but also a method other than those described in an aspect/embodiment of the present specification. For example, the information indication may be performed by physical layer signaling (e.g., DCI (Downlink Control Information), UCI (Uplink Control Information)), upper layer signaling (e.g., RRC (Radio Resource Control) signaling, MAC (Medium Access Control) signaling, broadcast information (MIB (Master Information Block), SIB (System Information Block))), other signals, or combinations thereof. Further, RRC signaling may be referred to as an RRC message. The RRC signaling may be, for example, an RRC connection setup message, an RRC connection reconfiguration message, or the like.

Each aspect/embodiment described in the present disclosure may be applied to at least one of a system using LTE (Long Term Evolution), LTE-A (LTE-Advanced), SUPER 3G, IMT-Advanced, 4G (4th generation mobile communication system), 5G (5th generation mobile communication system), 6th generation mobile communication system (6G), xth generation mobile communication system (xG) (xG(x is, for example, an integer or a decimal)), FRA (Future Radio Access), NR (new Radio), New radio access (NX), Future generation radio access (FX), W-CDMA (registered trademark), GSM (registered trademark), CDMA2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), and other appropriate systems, and a next generation system enhanced, modified, developed, or defined therefrom. Further, multiple systems may also be applied in combination (e.g., at least one of LTE or LTE-A combined with 5G, etc.).

The order of processing steps, sequences, flowcharts or the like of an aspect/embodiment described in the present specification may be changed as long as there is no contradiction. For example, in a method described in the present specification, elements of various steps are presented in an exemplary order. The order is not limited to the presented specific order.

The particular operations, that are supposed to be performed by the base station 10 in the present specification, may be performed by an upper node in some cases. In a network including one or more network nodes including the base station 10, it is apparent that various operations performed for communicating with the terminal 20 may be performed by the base station 10 and/or another network node other than the base station 10 (for example, but not limited to, MME or S-GW). According to the above, a case is described in which there is a single network node other than the base station 10. However, a combination of multiple other network nodes may be considered (e.g., MME and S-GW).

The information or signals described in this disclosure may be output from a higher layer (or lower layer) to a lower layer (or higher layer). The information or signals may be input or output through multiple network nodes.

The input or output information may be stored in a specific location (e.g., memory) or managed using management tables. The input or output information may be overwritten, updated, or added. The information that has been output may be deleted. The information that has been input may be transmitted to another apparatus.

A decision or a determination in an embodiment of the present invention may be realized by a value (0 or 1) represented by one bit, by a boolean value (true or false), or by comparison of numerical values (e.g., comparison with a predetermined value).

Software should be broadly interpreted to mean, whether referred to as software, firmware, middle-ware, microcode, hardware description language, or any other name, instructions, instruction sets, codes, code segments, program codes, programs, subprograms, software modules, applications, software applications, software packages, routines, subroutines, objects, executable files, executable threads, procedures, functions, and the like.

Further, software, instructions, information, and the like may be transmitted and received via a transmission medium. For example, in the case where software is transmitted from a website, server, or other remote source using at least one of wired line technologies (such as coaxial cable, fiber optic cable, twisted pair, digital subscriber line (DSL) or wireless technologies (infrared, microwave, etc.), at least one of these wired line technologies or wireless technologies is included within the definition of the transmission medium.

Information, a signal, or the like, described in the present specification may be represented by using any one of various different technologies. For example, data, an instruction, a command, information, a signal, a bit, a symbol, a chip, or the like, described throughout the present application, may be represented by a voltage, an electric current, electromagnetic waves, magnetic fields, a magnetic particle, optical fields, a photon, or a combination thereof.

It should be noted that a term used in the present specification and/or a term required for understanding of the present specification may be replaced by a term having the same or similar meaning. For example, a channel and/or a symbol may be a signal (signaling). Further, a signal may be a message. Further, the component carrier (CC) may be referred to as a carrier frequency, cell, frequency carrier, or the like.

As used in the present disclosure, the terms "system" and "network" are used interchangeably.

Further, the information, parameters, and the like, described in the present disclosure may be expressed using absolute values, relative values from predetermined values, or they may be expressed using corresponding different information. For example, a radio resource may be what is indicated by an index.

The names used for the parameters described above are not used as limitations. Further, the mathematical equations using these parameters may differ from those explicitly disclosed in the present disclosure. Because the various channels (e.g., PUCCH, PDCCH) and information elements may be identified by any suitable names, the various names assigned to these various channels and information elements are not used as limitations.

In the present disclosure, the terms "BS: Base Station", "Radio Base Station", "Base Station", "Fixed Station", "NodeB", "eNodeB (eNB)", "gNodeB (gNB)", "Access Point", "Transmission Point", "Receiving Point", "Transmission/Receiving Point", "Cell", "Sector", "Cell Group", "Carrier", "Component Carrier", and the like, may be used interchangeably. The base station may be referred to as a macro-cell, a small cell, a femtocell, a picocell and the like.

The base station may accommodate (provide) one or more (e.g., three) cells. In the case where the base station accommodates a plurality of cells, the entire coverage area of the base station may be divided into a plurality of smaller areas, each smaller area may provide communication services by means of a base station subsystem (e.g., an indoor small base station or a remote Radio Head (RRH)). The term "cell" or "sector" refers to a part or all of the coverage area of at least one of the base station and base station subsystem that provides communication services at the coverage.

In the present disclosure, terms such as "mobile station (MS)", "user terminal", "user equipment (UE)", "terminal", and the like, may be used interchangeably.

There is a case in which the mobile station may be referred to, by a person skilled in the art, as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other appropriate terms.

At least one of the base station or the mobile station may be referred to as a transmission apparatus, receiving apparatus, communication apparatus, or the like. The at least one of the base station or the mobile station may be a device mounted on the mobile station, the mobile station itself, or the like. The mobile station may be a vehicle (e.g., a car, an airplane, etc.), an unmanned mobile body (e.g., a drone, an automated vehicle, etc.), or a robot (manned or unmanned). At least one of the base station or the mobile station may include an apparatus that does not necessarily move during communication operations. For example, at least one of the base station or the mobile station may be an IoT (Internet of Things) device such as a sensor.

Further, the base station in the present disclosure may be read as the user terminal. For example, each aspect/embodiment of the present disclosure may be applied to a configuration in which communications between the base station and the user terminal are replaced by communications between multiple terminals 20 (e.g., may be referred to as D2D (Device-to-Device), V2X (Vehicle-to-Everything), etc.). In this case, the function of the base station 10 described above may be provided by the terminal 20. Further, the phrases "up" and "down" may also be replaced by the phrases corresponding to terminal-to-terminal communication (e.g., "side"). For example, an uplink channel, a downlink channel, or the like, may be read as a sidelink channel.

Further, the user terminal in the present disclosure may be read as the base station. In this case, the function of the user terminal described above may be provided by the base station.

The term "determining" used in the present specification may include various actions or operations. The terms "determination" and "decision" may include "determination" and "decision" made with judging, calculating, computing, processing, deriving, investigating, searching (looking up, search, inquiry) (e.g., search in a table, a database, or another data structure), or ascertaining. Further, the "determining" may include "determining" made with receiving (e.g., receiving information), transmitting (e.g., transmitting information), inputting, outputting, or accessing (e.g., accessing data in a memory). Further, the "determining" may include a case in which "resolving", "selecting", "choosing", "establishing", "comparing", or the like is deemed as "determining". In other words, the "determining" may include a case in which a certain action or operation is deemed as "determining". Further, "decision" may be read as "assuming", "expecting", or "considering", etc.

The term "connected" or "coupled" or any variation thereof means any direct or indirect connection or connection between two or more elements and may include the presence of one or more intermediate elements between the two elements "connected" or "coupled" with each other. The coupling or connection between the elements may be physical, logical, or a combination thereof. For example, "connection" may be read as "access". As used in the present disclosure, the two elements may be thought of as being "connected" or "coupled" to each other using at least one of the one or more wires, cables, or printed electrical connections and, as a number of non-limiting and non-inclusive examples, electromagnetic energy having wavelengths in the radio frequency region, the microwave region, and the light (both visible and invisible) region.

The reference signal may be abbreviated as RS or may be referred to as a pilot, depending on the applied standards.

The description "based on" used in the present specification does not mean "based on only" unless otherwise specifically noted. In other words, the phrase "based on" means both "based on only" and "based on at least".

Any reference to an element using terms such as "first" or "second" as used in the present disclosure does not generally limit the amount or the order of those elements. These terms may be used in the present disclosure as a convenient way to distinguish between two or more elements. Therefore, references to the first and second elements do not imply that only two elements may be employed or that the first element must in some way precede the second element.

"Means" included in the configuration of each of the above apparatuses may be replaced by "parts", "circuits", "devices", etc.

In the case where the terms "include", "including" and variations thereof are used in the present disclosure, these terms are intended to be comprehensive in the same way as the term "comprising". Further, the term "or" used in the present specification is not intended to be an "exclusive or".

A radio frame may include one or more frames in the time domain. Each of the one or more frames in the time domain may be referred to as a subframe. The subframe may further include one or more slots in the time domain. The subframe may be a fixed length of time (e.g., 1 ms) independent from the numerology.

The numerology may be a communication parameter that is applied to at least one of the transmission or receiving of a signal or channel. The numerology may indicate at least one of, for example, subcarrier spacing (SCS), bandwidth, symbol length, cyclic prefix length, transmission time interval (TTI), number of symbols per TTI, radio frame configuration, specific filtering processing performed by the transceiver in the frequency domain, and specific windowing processing performed by the transceiver in the time domain.

The slot may include one or more symbols in the time domain (OFDM (Orthogonal Frequency Division Multiplexing) symbols, SC-FDMA (Single Carrier Frequency Division Multiple Access) symbols, and the like). The slot may be a time unit based on the numerology.

The slot may include a plurality of mini slots. Each mini slot may include one or more symbols in the time domain. Further, the mini slot may be referred to as a sub-slot. The mini slot may include fewer symbols than the slot. PDSCH (or PUSCH) transmitted in time units greater than a mini slot may be referred to as PDSCH (or PUSCH) mapping type A.

PDSCH (or PUSCH) transmitted using a mini slot may be referred to as PDSCH (or PUSCH) mapping type B.

A radio frame, a subframe, a slot, a mini slot and a symbol all represent time units for transmitting signals. Different terms may be used for referring to a radio frame, a subframe, a slot, a mini slot and a symbol, respectively.

For example, one subframe may be referred to as a transmission time interval (TTI), multiple consecutive subframes may be referred to as a TTI, and one slot or one mini slot may be referred to as a TTI. In other words, at least one of the subframe and the TTI may be a subframe (1 ms) in an existing LTE, a period shorter than 1 ms (e.g., 1-13 symbols), or a period longer than 1 ms. It should be noted that the unit representing the TTI may be referred to as a slot, a mini slot, or the like, rather than a subframe.

The TTI refers to, for example, the minimum time unit for scheduling in wireless communications. For example, in an LTE system, a base station schedules each terminal 20 to allocate radio resources (such as frequency bandwidth, transmission power, etc. that can be used in each terminal 20) in TTI units. The definition of TTI is not limited to the above.

The TTI may be a transmission time unit, such as a channel-encoded data packet (transport block), code block, codeword, or the like, or may be a processing unit, such as scheduling or link adaptation. It should be noted that, when a TTI is provided, the time interval (e.g., the number of symbols) during which the transport block, code block, codeword, or the like, is actually mapped may be shorter than the TTI.

It should be noted that, when one slot or one mini slot is referred to as a TTI, one or more TTIs (i.e., one or more slots or one or more mini slots) may be the minimum time unit for scheduling. Further, the number of slots (the number of mini slots) constituting the minimum time unit of the scheduling may be controlled.

A TTI having a time length of 1 ms may be referred to as a normal TTI (a TTI in LTE Rel. 8-12), a long TTI, a normal subframe, a long subframe, a slot, and the like. A TTI that is shorter than the normal TTI may be referred to as a shortened TTI, a short TTI, a partial TTI (or fractional TTI), a shortened subframe, a short subframe, a mini slot, a subslot, a slot, or the like.

It should be noted that the long TTI (e.g., normal TTI, subframe, etc.,) may be replaced with a TTI having a time length exceeding 1 ms, and the short TTI (e.g., shortened TTI, etc.,) may be replaced with a TTI having a TTI length less than the TTI length of the long TTI and a TTI length greater than 1 ms.

A resource block (RB) is a time domain and frequency domain resource allocation unit and may include one or more consecutive subcarriers in the frequency domain. The number of subcarriers included in an RB may be the same, regardless of the numerology, and may be 12, for example. The number of subcarriers included in an RB may be determined on the basis of numerology.

Further, the time domain of an RB may include one or more symbols, which may be 1 slot, 1 mini slot, 1 subframe, or 1 TTI in length. One TTI, one subframe, etc., may each include one or more resource blocks.

It should be noted that one or more RBs may be referred to as physical resource blocks (PRBs, Physical RBs), subcarrier groups (SCGs), resource element groups (REGs), PRB pairs, RB pairs, and the like.

Further, a resource block may include one or more resource elements (RE). For example, 1 RE may be a radio resource area of one sub-carrier and one symbol.

The bandwidth part (BWP) (which may also be referred to as a partial bandwidth, etc.) may represent a subset of consecutive common RBs (common resource blocks) for a given numerology in a carrier. Here, a common RB may be identified by an index of RB relative to the common reference point of the carrier. A PRB may be defined in a BWP and may be numbered within the BWP.

BWP may include BWP for UL (UL BWP) and BWP for DL (DL BWP). For a terminal 20, one or more BWPs may be configured in one carrier.

At least one of the configured BWPs may be activated, and the terminal 20 may assume that the terminal 20 will not transmit and receive signals/channels outside the activated BWP. It should be noted that the terms "cell" and "carrier" in this disclosure may be replaced by "BWP."

Structures of a radio frame, a subframe, a slot, a mini slot, and a symbol described above are exemplary only. For example, the number of subframes included in a radio frame, the number of slots per subframe or radio frame, the number of mini slots included in a slot, the number of symbols and RBs included in a slot or mini slot, the number of subcarriers included in an RB, the number of symbols in a TTI, the symbol length, the cyclic prefix (CP) length, and the like, may be changed in various ways.

In the present disclosure, where an article is added by translation, for example "a", "an", and "the", the disclosure may include that the noun following these articles is plural.

In this disclosure, the term "A and B are different" may mean "A and B are different from each other." It should be noted that the term "A and B are different" may mean "A and B are different from C." Terms such as "separated" or "combined" may be interpreted in the same way as the above-described "different".

Each aspect/embodiment described in the present specification may be used independently, may be used in combination, or may be used by switching according to operations. Further, notification (transmission/reporting) of predetermined information (e.g., notification (transmission/reporting) of "X") is not limited to an explicit notification (transmission/reporting), and may be performed by an implicit notification (transmission/reporting) (e.g., by not performing notification (transmission/reporting) of the predetermined information).

It is to be noted that, in the present disclosure, the variable unit 340 and the antenna unit 350 are examples of a relay unit.

As described above, the present invention has been described in detail. It is apparent to a person skilled in the art that the present invention is not limited to one or more embodiments of the present invention described in the present specification. Modifications, alternatives, replacements, etc., of the present invention may be possible without departing from the subject matter and the scope of the present invention defined by the descriptions of claims. Therefore, the descriptions of the present specification are for illustrative purposes only, and are not intended to be limitations to the present invention.

DESCRIPTION OF THE REFERENCE NUMERALS

10 Base station
110 Transmission unit
120 Receiver unit
130 Configuration unit
140 Control unit
20 Terminal

210 Transmission unit
220 Receiver unit
230 Configuration unit
240 Control unit
30 Wireless relay device
310 Transmission unit
320 Receiver unit
330 Control unit
340 Variable unit
350 Antenna unit
1001 Processor
1002 Storage device
1003 Auxiliary storage device
1004 Communication device
1005 Input device
1006 Output device
2001 Vehicle
2002 Drive unit
2003 Steering unit
2004 Accelerator pedal
2005 Brake pedal
2006 Shift lever
2007 Front wheel
2008 Rear wheel
2009 Axle
2010 Electronic control unit
2012 Information service unit
2013 Communication module
2021 Current sensor
2022 Revolution sensor
2023 Pneumatic sensor
2024 Vehicle speed sensor
2025 Acceleration sensor
2026 Brake pedal sensor
2027 Shift lever sensor
2028 Object detection sensor
2029 Accelerator pedal sensor
2030 Driving support system unit
2031 Microprocessor
2032 Memory (ROM, RAM)
2033 Communication port (IO port)

The invention claimed is:

1. A wireless relay device comprising:

a receiver configured to receive a signal from each of a plurality of base stations;

a processor configured to be connected to a base station for which a received quality of the signal is equal to or greater than a threshold value; and a relay antenna and phase shifter configured to perform relaying of a signal between the base station to be connected to and a terminal, wherein the receiver receives control information from the base station to be connected, the processor activates or deactivates a relay function of the relay antenna and phase shifter, based on the control information, the processor determines a wireless resource used by the relay antenna and phase shifter, based on the control information, and the processor does not assume that a signal between the base station to be connected to and the terminal is to be relayed by using a wireless resource other than the determined wireless resource.

2. The wireless relay device as claimed in claim 1, wherein the processor is connected to a plurality of base stations for which a received quality of the signal is equal to or greater than a threshold value or to all base stations for which a received quality of the signal is equal to or greater than a threshold value.

3. The wireless relay device as claimed in claim 1, wherein the processor reports information related to a received quality of the signal to a plurality of base stations for which a received quality of the signal is equal to or greater than a threshold value or to all base stations for which a received quality of the signal is equal to or greater than a threshold value.

4. The wireless relay device as claimed in claim 1, wherein in a case where there are a plurality of base stations to be connected to, the receiver receives the control information from each of the base stations to be connected to, and in a case where all of the control information indicates deactivation, the processor deactivates a relay function of the relay antenna and phase shifter.

5. A communication method performed by a wireless relay device, the communication method comprising:

receiving a signal from each of a plurality of base stations;

being connected to a base station for which a received quality of the signal is equal to or greater than a threshold value;

performing relaying of a signal between the base station to be connected to and a terminal;

receiving control information from the base station to be connected to;

activating or deactivating a relay function of a relay antenna and phase shifter, based on the control information; and determining a wireless resource used by the relay antenna and phase shifter, based on the control information, wherein the wireless relay device does not assume that a signal between the base station to be connected to and the terminal is to be relayed by using a wireless resource other than the determined wireless resource.

* * * * *